United States Patent
Yokoyama

(10) Patent No.: US 8,390,951 B2
(45) Date of Patent: Mar. 5, 2013

(54) VIBRATION DAMPING DEVICE AND DISC DEVICE HAVING VIBRATION DAMPING DEVICE

(75) Inventor: Eiji Yokoyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/393,229

(22) PCT Filed: Sep. 15, 2010

(86) PCT No.: PCT/JP2010/005623
§ 371 (c)(1),
(2), (4) Date: Feb. 29, 2012

(87) PCT Pub. No.: WO2011/033763
PCT Pub. Date: Mar. 24, 2011

(65) Prior Publication Data
US 2012/0155243 A1  Jun. 21, 2012

(30) Foreign Application Priority Data
Sep. 17, 2009  (JP) .................................. 2009-215649

(51) Int. Cl.
*G11B 33/14*  (2006.01)

(52) U.S. Cl. .................................................. 360/97.19

(58) Field of Classification Search ............... 360/97.19, 360/97.13, 97.14, 99.12, 97.12, 97.15, 99.15, 360/99.18, 97.16, 97.11, 97.2, 97.21; 720/651
See application file for complete search history.

(56) References Cited

U.S. PATENT DOCUMENTS

| 5,281,978 | A | 1/1994 | Kojima et al. | |
| 6,690,638 | B1 | 2/2004 | Kiyomiya et al. | |
| 2005/0094311 | A1* | 5/2005 | Boss et al. | 360/97.01 |
| 2005/0174896 | A1 | 8/2005 | Saito et al. | |
| 2006/0238914 | A1* | 10/2006 | Xu | 360/97.01 |
| 2007/0169130 | A1* | 7/2007 | Wu | 720/600 |
| 2007/0171568 | A1* | 7/2007 | Boss et al. | 360/97.02 |
| 2009/0207393 | A1 | 8/2009 | Butler et al. | |

FOREIGN PATENT DOCUMENTS

| JP | 60-60344 A | 4/1985 |
| JP | 4-272538 A | 9/1992 |
| JP | 11-328944 A | 11/1999 |
| JP | 2000-65128 A | 3/2000 |
| JP | 2001-332008 A | 11/2001 |
| JP | 2002-25128 A | 1/2002 |

(Continued)

OTHER PUBLICATIONS

Japanese Office Action for JP 2011-531786, dated Dec. 20, 2011.

*Primary Examiner* — Allen Cao
(74) *Attorney, Agent, or Firm* — Birch, Stewart, Kolasch & Birch, LLP

(57) ABSTRACT

As a measure against vibration caused by disturbance due to mass eccentricity of a disc, a conventional disc device has a means to add an auxiliary mass that passively operates. This method has no way to enhance vibration damping effect other than setting the auxiliary mass to be large, and therefore there is a problem that the device becomes large. An auxiliary mass 300 is actively driven by an auxiliary mass driving portion 360. The driving of the auxiliary mass 300 is performed by amplifying a signal corresponding to a force transmitted from a main frame portion 100 to the auxiliary mass 300. This achieves a vibration damping effect using the small auxiliary mass 300 to the same degree as that where the large auxiliary mass is mounted.

16 Claims, 52 Drawing Sheets

FOREIGN PATENT DOCUMENTS

| | | |
|---|---|---|
| JP | 2002-61703 A | 2/2002 |
| JP | 2004-171685 A | 6/2004 |
| JP | 2004-192781 A | 7/2004 |
| JP | 2004-332783 A | 11/2004 |
| JP | 2006-162024 A | 6/2006 |
| JP | 2009-127861 A | 6/2009 |

\* cited by examiner

FIG. 51
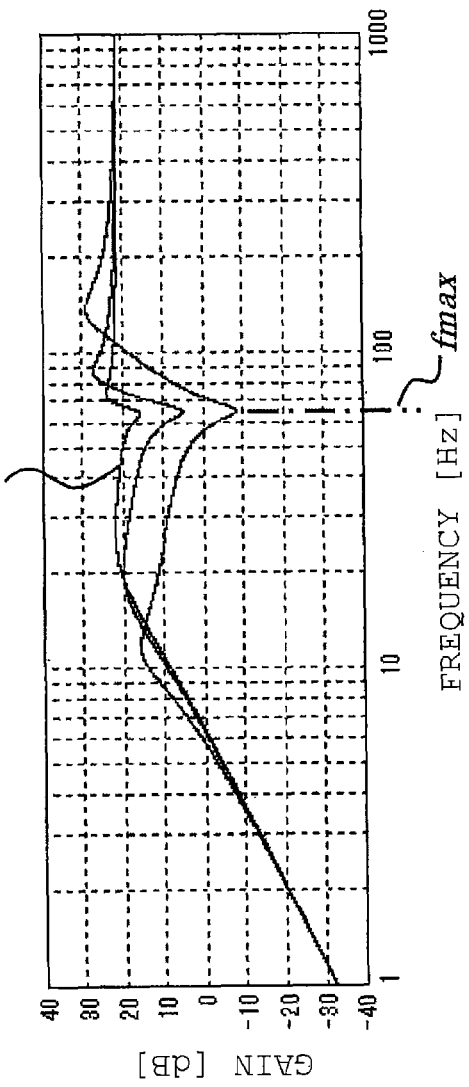
(A)
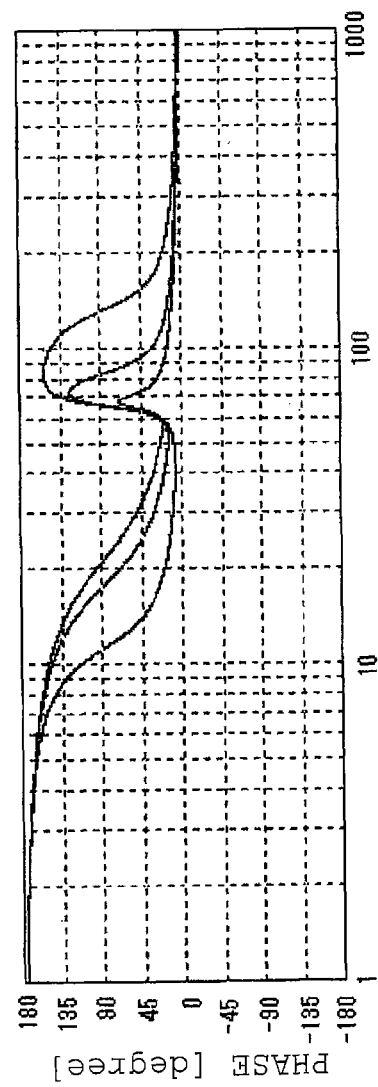
(B)

VIBRATION DAMPING DEVICE AND DISC DEVICE HAVING VIBRATION DAMPING DEVICE

TECHNICAL FIELD

The present invention relates to a vibration damping device which is used in a device performing recording or reproduction using a disc-shaped medium such as an optical disc or a magnetic disc, which has a compact size, and which effectively suppresses an effect of vibration generated when a disc is rotated at a high speed and unnecessary vibration applied from outside the device.

BACKGROUND ART

In information recording/reproducing devices and information reproducing devices of recent years, progress has been made in increasing a capacity for storing information has been increases, increasing an information transfer rate, and reducing a size and weight of the device. In a magnetic disc or an optical disc, a disc rotation speed when performing recording or reproduction increases with the increase in the information transfer rate. A rotation axis and a center of gravity of the disc do not coincide with each other, and there is a predetermined error. Generally, an amount of the error between the rotation axis and the center of gravity is defined as mass eccentricity. The mass eccentricity causes unnecessary centrifugal force when the disc rotates. The unnecessary centrifugal force is kinetic energy, and is proportional to a square of a rotation speed. Therefore, as the disc rotation speed increases, the unnecessary centrifugal force rapidly increases in a quadric curve. Further, as the device becomes compact and lightweight, an acceleration and a position of the disc device tend to fluctuate when vibration is applied from outside. Therefore, when recording or reproducing is performed on the disc with mass eccentricity, the entire device generates self-exited vibration in synchronization with the rotation of the disc, and there is a problem that the recording or reproducing of information becomes impossible.

As a measure to solve this problem in an optical disc device in which the disc is interchangeable, there is proposed a vibration damping mechanism using an auxiliary mass and a resilient member. A sub frame functioning as the auxiliary mass is coupled with a main frame via the resilient member, and the main frame houses a disc rotation mechanism. It is disclosed that an effective anti-vibration effect is obtained by setting a resonant frequency of the sub frame to be slightly higher than a rotation frequency of the disc (see, for example, Patent Document 1). The disclosed technology is based on a principle that, by adding a dynamic damper to a specific structural object, vibration of a structural object is topically suppressed with respect to vibration input whose frequency equals to a natural frequency of the dynamic damper.

Further, there is proposed a vibration damping mechanism in which a spring and an actuator are parallely provided in addition to the vibration damping mechanism using the auxiliary mass and the resilient member. The vibration damping mechanism is configured to detecting a relative displacement between a vibrating body and the auxiliary mass, and to control driving of the actuator. However, this vibration damping device uses a large auxiliary mass (a movable mass). The actuator is controlled so as to apply a force in a direction in which a spring coefficient decreases and with an amount which is proportional to an amount of displacement of the spring (see, for example, Patent Document 2). In this regard, the spring functions as a resilient member.

Patent Document 1: Japanese Laid-open Patent Publication No. H11-328944 (paragraphs 0021, 0042 and FIG. 3)
Patent Document 2: Japanese Laid-open Patent Publication No. S60-60344 (page 3 and FIG. 2)

DISCLOSURE OF THE INVENTION

Problems to be Solved by the Invention

The anti-vibration measure using a resonance system having the auxiliary mass is limited by a mass of the added auxiliary mass. In other words, it is necessary to set the auxiliary mass to be large in order to obtain a great vibration damping effect, and therefore there is a problem that this anti-vibration measure is unsuitable for reduction in weight of the vibration damping device.

Moreover, the anti-vibration measure in which the actuator is added to the resonance system by means of the auxiliary mass still uses a large auxiliary mass, and therefore has a problem that the weight of the vibration damping device cannot be reduced.

The present invention is intended to solve the above described problems, and an object of the present invention is to provide a vibration damping device that suppresses vibration due to a disc with mass eccentricity using a small auxiliary mass, achieves s vibration damping effect to the same degree as a large auxiliary mass, and is light in weight.

Means of Solving the Problems

A vibration damping device according to the present invention includes a main frame portion having a vibration source, and a dynamic vibration absorber having an auxiliary mass and a cushioning portion and being supported by the main frame portion via the cushioning portion, wherein a resonant frequency of the dynamic vibration absorber is a frequency of vibration of the vibration source, and further includes a transmission force detecting portion that detects a transmission force transmitted from the main frame portion to the auxiliary mass via the cushioning portion and an auxiliary mass driving portion that drives the auxiliary mass based on a result of detection by the transmission force detecting portion.

Effect of the Invention

According to the present invention, a vibration damping effect can be obtained using a small auxiliary mass to the same degree as a large auxiliary mass, and a lightweight vibration damping device can be obtained.

BRIEF DESCRIPTION OF THE DRAWINGS

FIG. 51 shows characteristic diagrams illustrating characteristic of the vibration damping device representing a basic configuration of the present invention in which an amplification coefficient of the transmission force is varied.

MODE FOR CARRYING OUT THE INVENTION

Before describing embodiments of the present invention, an anti-vibration measure using an auxiliary mass 300 which is a premise of the present invention will be first analyzed. That is, a vibration damping effect of the anti-vibration measure using a dynamic vibration absorber having the auxiliary mass 300 and a cushioning member 350 is limited to a size of the added auxiliary mass 300. In order for the anti-vibration measure to achieve a great vibration damping effect, it is necessary to set the auxiliary mass 300 to be large. A reason thereof will be described below.

Figure 41:
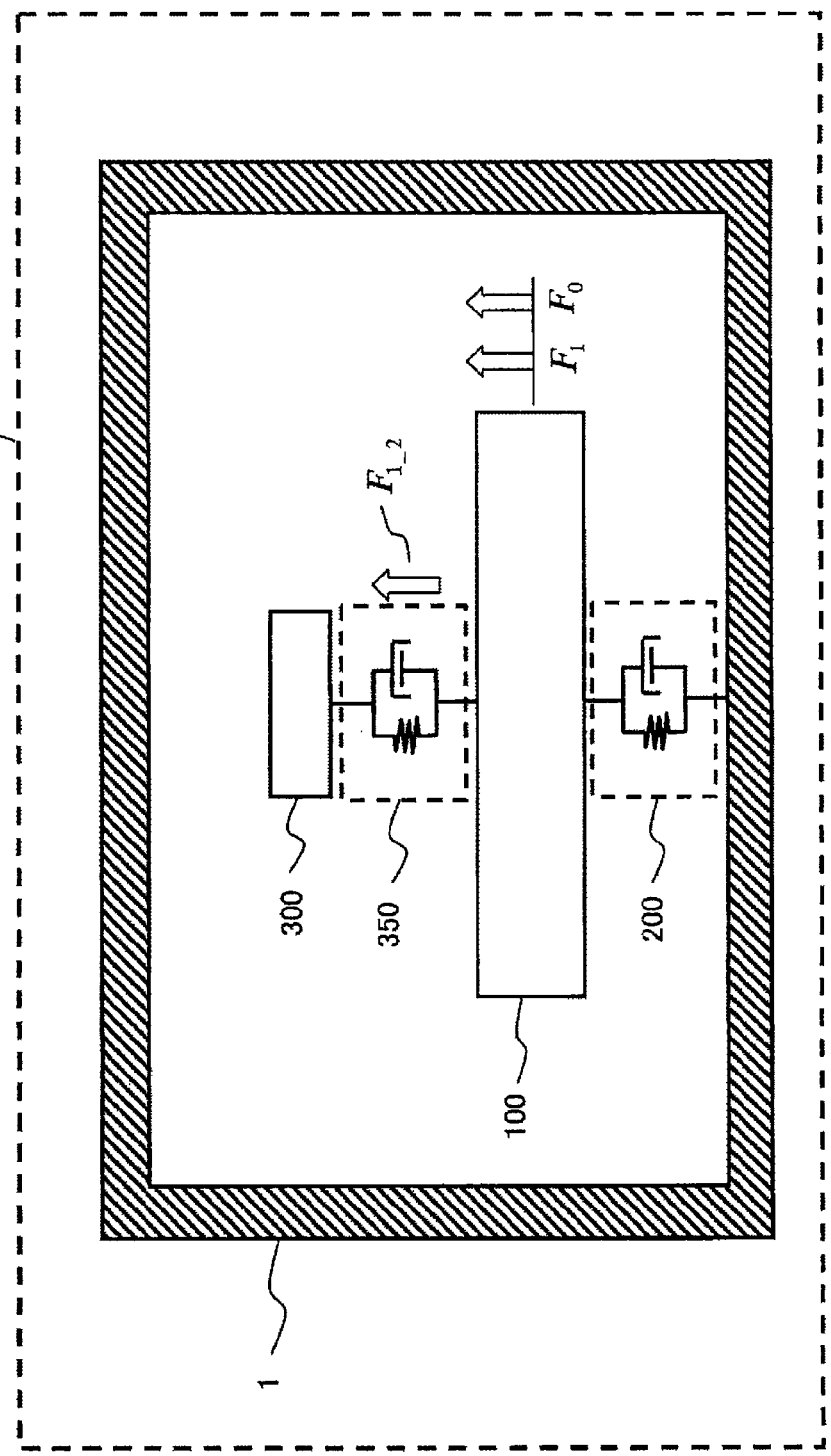
FIG. 41 is a model diagram showing a vibration damping device using an auxiliary mass and a cushioning member.

FIG. 41 is a model diagram of a vibration damping device 910 using an auxiliary mass 300. A casing 1 supports a main frame portion 100, a cushioning support member 200, the auxiliary mass 300 and the cushioning member 350. The main frame portion 100 is supported by the casing 1 via the cushioning support member 200. The auxiliary mass 300 is supported by the main frame portion 100 via the cushioning member 350. The cushioning support member 200 is a cushioning support portion, and the cushioning member 350 is a cushioning portion.

The main frame portion 100 is a portion unit provided with a spindle motor, an information pickup and frames, and a total weight of the main frame portion 100 is a mass $m_1$. The spindle motor has a function to rotate a disc. The information pickup has a function to record information on the disc, or read information of the disc. The frames have a function to hold the spindle motor, the information pickup and the like. Moreover, the main frame portion 100 is supported by the casing via the cushioning support member 200. The cushioning support member 200 has a function to cushion transmission of vibration applied to the casing 1 from outside to the main frame portion 100. Moreover, the auxiliary mass 300 is supported by the main frame portion 100 via the cushioning member 350. The cushioning member 350 has physical properties so as to have resonant characteristics described later.

Further, a force $F_0$ [N] is a force generated due to vibration from outside, and a force transmitted from the casing 1 to the main frame portion 100 via the cushioning support member 200. A force $F_1$ [N] is a force generated due to a rotation of a disc with mass eccentricity. A transmission force $F_{1\_2}$ [N] is a force transmitted from the main frame portion 100 to the auxiliary mass 300 via the cushioning member 350.

Figure 42:
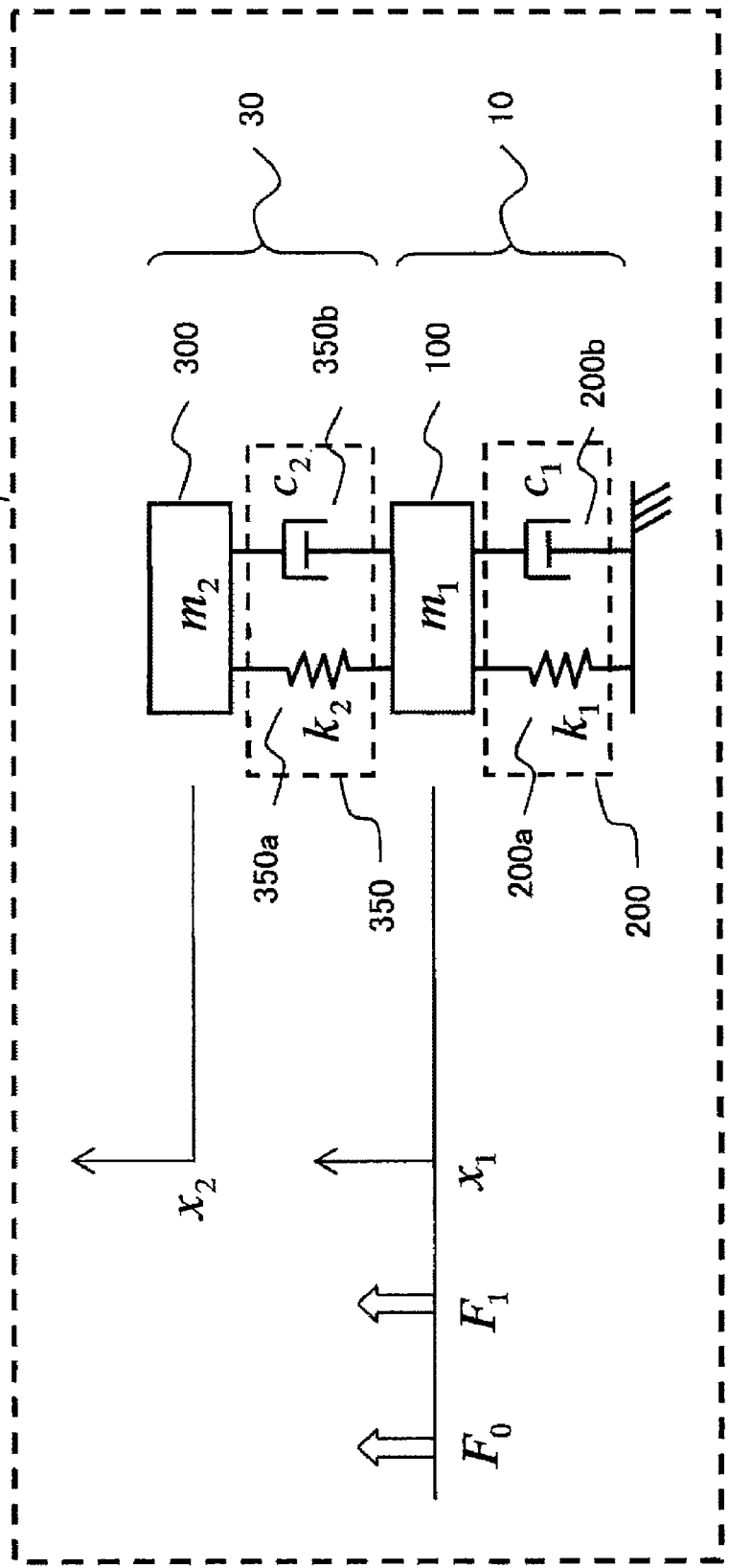
FIG. 42 is a diagram showing a mass point model of the vibration damping device using the auxiliary mass and the cushioning member.

FIG. 42 is a diagram expressing FIG. 41 as a mass point model. In FIG. 42, the main frame portion 100 is expressed by a mass $m_1$ [kg]. The cushioning support member 200 is expressed by a viscoelastic model. An elastic coefficient of a spring 200a of the cushioning support member 200 is $k_1$ [N/m], and a viscosity coefficient of an oil damper 200b of the cushioning support member 200 is $c_1$ [N·s/m]. The auxiliary mass 300 is expressed by a mass $m_2$ [kg]. The cushioning member 350 is expressed by a viscoelastic model. An elastic coefficient of a spring 350a of the cushioning member 350 is $k_2$ [N/m], and a viscosity coefficient of an oil damper 350b of the cushioning member 350 is $c_2$ [N·s/m].

A position $x_1$ [m] represents a position of the mass point $m_1$ with reference to the casing 1 in a direction of vibration when the main frame portion 100 is defined as the mass point $m_1$. A position $x_2$ [m] represents a position of the mass point $m_2$ with reference to the casing 1 in a direction of vibration when the auxiliary mass 300 is defined as the mass point $m_2$. The casing 1 is defined as GND. A force $F_0$ [N] is defined as a force applied to the main frame portion 100 via the cushioning support member 200. A force F1 [N] is a force applied to the main frame portion 100 due to the rotation of the disc with mass eccentricity.

With regard to a vibration model shown in FIG. 42, equations of motion of the respective mass points are expressed by the following equations (1) and (2).

$$m_1 \ddot{x}_1 + (c_1+c_2)\dot{x}_1 - c_2\dot{x}_2 + (k_1+k_2)x_1 - k_2 x_2 = F_0 + F_1 \quad (1)$$

$$m_2 \ddot{x}_2 + c_2\dot{x}_2 + k_2 x_2 - (c_2\dot{x}_1 + k_2 x_1) = 0 \quad (2)$$

Figure 43:
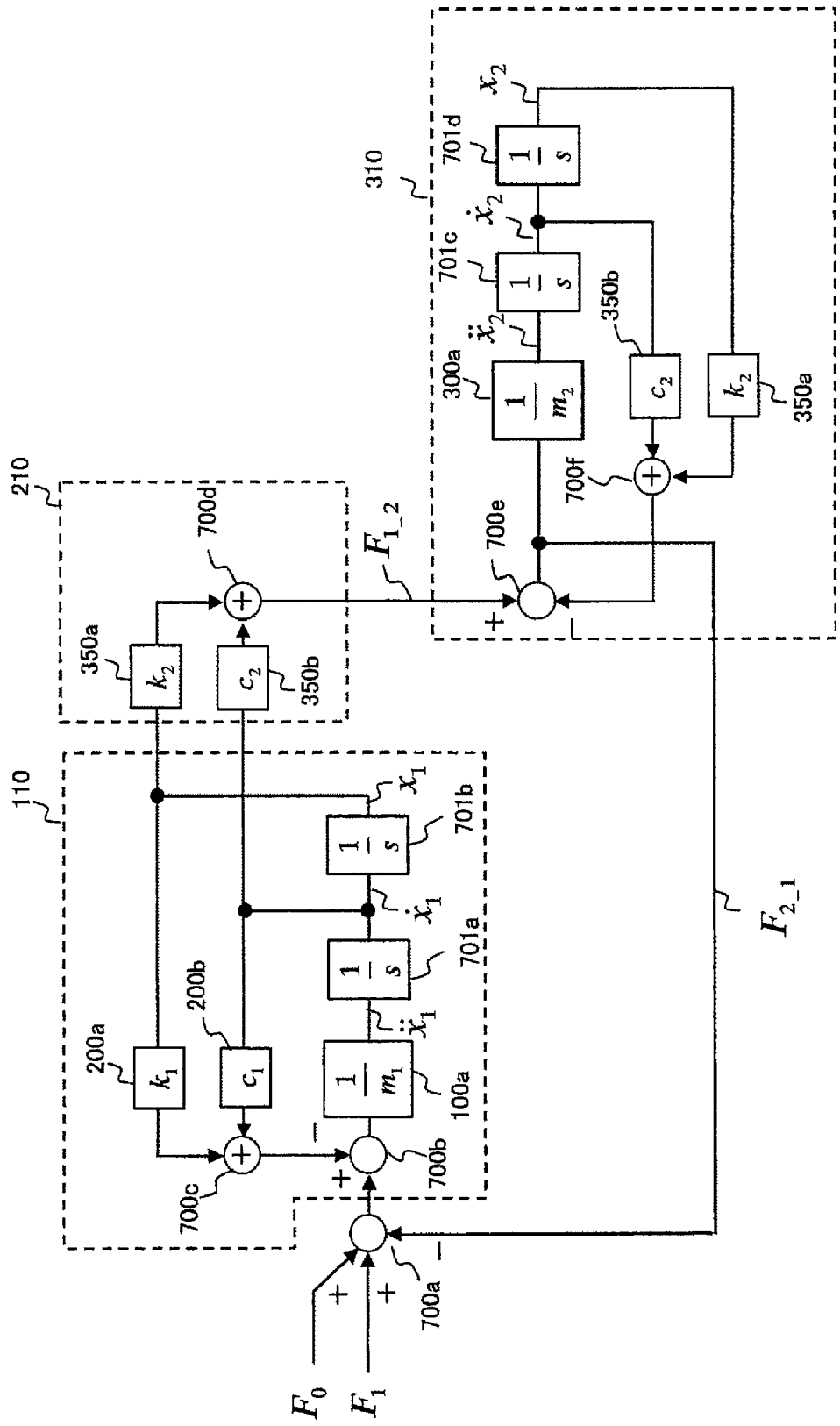
FIG. 43 is a block diagram showing the vibration damping device using the auxiliary mass and the cushioning member.

FIG. 43 is a block diagram representing the equations of motion (1) and (2). In FIG. 43, a function block 110 is a basic model of a resonance system of the main frame portion 100. The function block 110 is expressed by an adder-subtractor 700b, an adder 700c, a function block 100a, integrators 701a and 701b, a function block 200a and a function block 200b. The function block 100a is expressed by an inverse number of the mass $m_1$ of the main frame portion 100. The function block 200a is expressed by the elastic coefficient $k_1$ of the cushioning support member 200. The function block 200b is expressed by the viscosity coefficient $c_1$ of the cushioning support member 200.

A value of the force $F_0$ and a value of the force $F_1$ are added by an adder-subtractor 700a, and is outputted to the adder-subtractor 700b after a value of the transmission force $F_{2\_1}$ is subtracted therefrom. The value of the transmission force $F_{2\_1}$ is outputted from a function block 310. The function block 310 is a transmission characteristic model of a resonance system of the auxiliary mass 300. Here, the transmission force $F_{1\_2}$ is a sum of forces transmitted from the main frame portion 100 to the auxiliary mass 300. In contrast, the transmission force $F_{2\_1}$ is a force transmitted from the auxiliary mass 300 to the main frame portion 100. In other words, the force $F_{2\_1}$ is a sum of vibration damping forces applied to the main frame portion 100.

The adder 700c adds a value of the position $x_1$ multiplied by $k_1$ to a value of a speed $d(x_1)/dt$ of the main frame portion 100 multiplied by $c_1$. The position $x_1$ represents a position of the mass point $m_1$ with reference to the casing 1 when the main frame portion 100 is defined as the mass point $m_1$. The adder-subtractor 700b adds an output value from the adder 700c to an output value from the adder-subtractor 700a. An output value from the adder-subtractor 700b is multiplied by $1/m_1$ at the function block 100a, and is outputted to the integrator 701a. The function block 100a is expressed by the inverse number of the mass $m_1$ of the main frame portion 100. The integrator 701 integrates an inputted value, and outputs the speed $d(x_1)/dt$. The speed $d(x_1)/dt$ is inputted to the integrator 701b, and the integrator 701b outputs a value of the position $x_1$. The position $x_1$ represents a position of the mass point $m_1$ with reference to the casing 1 when the main frame portion 100 is defined as the mass point $m_1$.

A function block 210 converts a position and speed of the main frame portion 100 to a force transmitted to the auxiliary mass 300. The function block 210 is expressed by an adder 700d, a function block 350a and a function block 350b. The function block 350a is expressed by the elastic coefficient $k_2$ of the cushioning member 350. The function block 350b is expressed by the viscosity coefficient $c_2$ of the cushioning member 350. The adder 700d adds a value of the position $x_1$ multiplied by $k_2$ to a value of the speed $d(x_1)/dt$ multiplied by $c_2$. The position $x_1$ represents a position of the mass point $m_1$ with reference to the casing 1 when the main frame portion 100 is defined as the mass point $m_1$. An output value of the adder 700d is outputted to the adder 700e.

The function block 310 is the transmission characteristic model of the resonance system of the auxiliary mass 300. The function block 310 is expressed by an adder-subtractor 700e, an adder 700f, a function block 300a, integrators 701c and 701d, a function block 350a and a function block 350b. The function block 300a is expressed by an inverse number of the mass $m_2$ of the auxiliary mass 300. The function block 350a is expressed by the elastic coefficient $k_2$ of the cushioning member 350. The function block 350b is expressed by the viscosity coefficient $c_2$ of the cushioning member 350.

The adder 700f adds a value of the position $x_2$ multiplied by $k_2$ to a value of a speed $d(x_2)/dt$ of the auxiliary mass 300 multiplied by $c_2$. The position $x_2$ represents a position of the mass point $m_2$ with reference to the casing 1 when the auxiliary mass 300 is defined as the mass point $m_2$. An output value of the adder 700f is subjected to subtraction at the adder-subtractor 700e. The output value of the adder 700d is subjected to addition at the adder-subtractor 700e. An output value of the adder-subtractor 700e is multiplied by $1/m_2$ at the function block 300a, and is outputted to an integrator 701c. The function block 300a is expressed by the inverse number of the mass $m_2$ of the auxiliary mass 300. The integrator 701c integrates an inputted value, and outputs the speed speed $d(x_2)/dt$. The speed $d(x_2)/dt$ is inputted to the integrator 701d, and the integrator 701d outputs a value of the position $x_2$ with reference to the casing 1 when the auxiliary mass 300 is defined as a mass point. The position $x_2$ represents a position of the mass point $m_2$ with reference to the casing 1 when the auxiliary mass 300 is defined as the mass point $m_2$.

Here, the force $F_{1\_2}$ and the force $F_{2\_1}$ are expressed by the following equations (3) and (4).

$$F_{1\_2} = (c_2 s + k_2) x_1 \tag{3}$$

$$F_{2\_1} = F_{1\_2} - (c_2 s + k_2) x_2 \tag{4}$$

Here, the function block 110 is the basic model of the resonance system of the main frame portion 100. The function block 110 is a region encircled by a dashed line in FIG. 43 including the function block 100a. The function block 100a is expressed by the inverse number of the mass $m_1$ of the main frame portion 100. Further, the function block 310 is the transmission characteristic model of the resonance system of the auxiliary mass 300. The function block 300a is expressed by the inverse number of the mass $m_2$ of the auxiliary mass 300. The function block 310 represents the transmission characteristic model of the force applied to the main frame portion 100 due to the force applied to the resonance system of the auxiliary mass 300. The function block 210 represents conversion characteristics with which the cushioning member 350 converts the position and speed of the main frame portion 100 to the force transmitted to the auxiliary mass 300. An output value of the function block 210 is a value of the transmission force $F_{1\_2}$ [N]. The transmission force $F_{1\_2}$ [N] is a sum of forces transmitted from the function block 110 to the function block 310. The function block 110 is the basic model of the resonance system of the main frame portion 100. The function block 310 is the transmission characteristic model of the resonance system of the auxiliary mass 300. The transmission force $F_{2\_1}$ [N] is the force transmitted from the function block 310 to the function block 110. The function block 310 is the transmission characteristic model of the resonance system of the auxiliary mass 300. The function block 110 is the basic model of the resonance system of the main frame portion 100.

Figure 44:
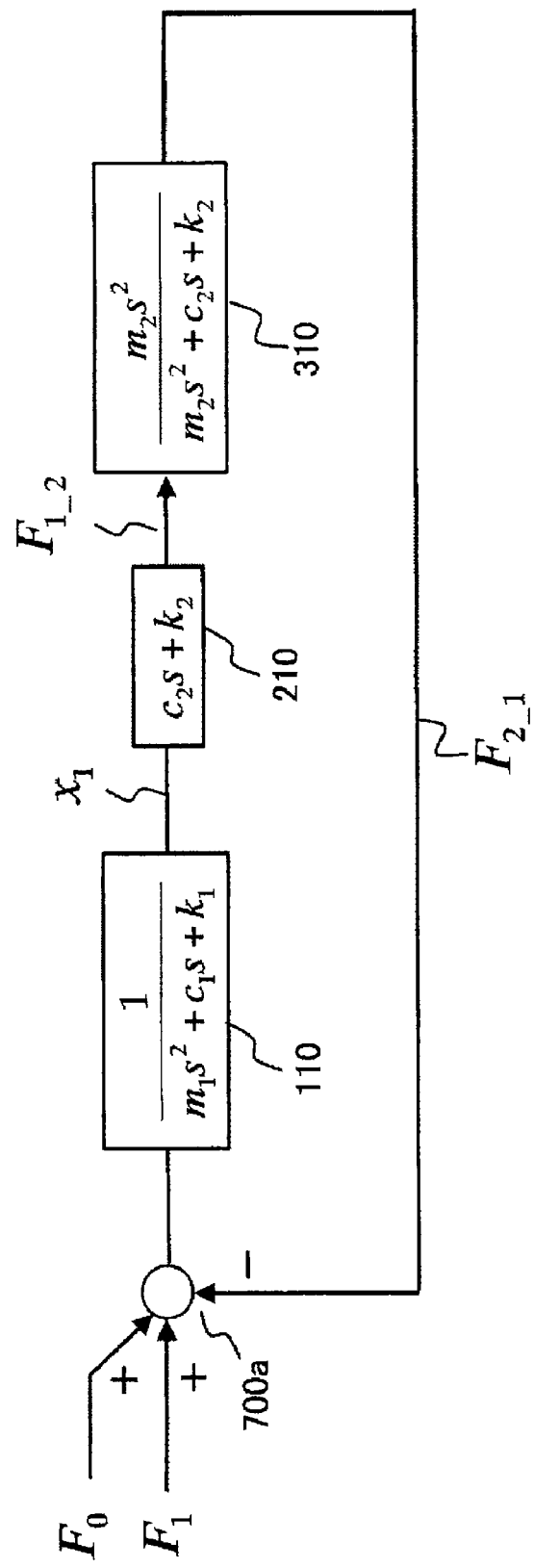
FIG. 44 is a block diagram showing the vibration damping device using the auxiliary mass and the cushioning member.

FIG. 44 is a block diagram equivalently converting FIG. 43 and using expressions of transfer functions. The force $F_0$ and the force $F_1$ are added at the adder-subtractor 700a, and the value of $F_{2\_1}$ is subtracted therefrom. An output value of the adder-subtractor 700a is multiplied by $1/(m_1 s^2 + c_1 s + K_1)$ at the function block 110, and an output value of the position $x_1$ is outputted. The function block 110 is the basic model of the resonance system of the main frame portion 100. The function block 210 outputs the value of the position $x_1$ multiplied by $(c_2 s + k_2)$, and a value of the transmission force $F_{1\_2}$ is outputted. The value of $x_1$ is an input value to the function block 210. The function block 310 multiplies the value of the transmission force $F_{1\_2}$ by $m_2 s^2/(m_2 s^2 + c_2 s + K_2)$, and a value of the transmission force $F_{2\_1}$ is outputted. The value of the transmission force $F_{1\_2}$ is an input value of to the function block 310. The function block 310 is the transmission characteristic model of the resonance system of the auxiliary mass 300.

Figure 45:
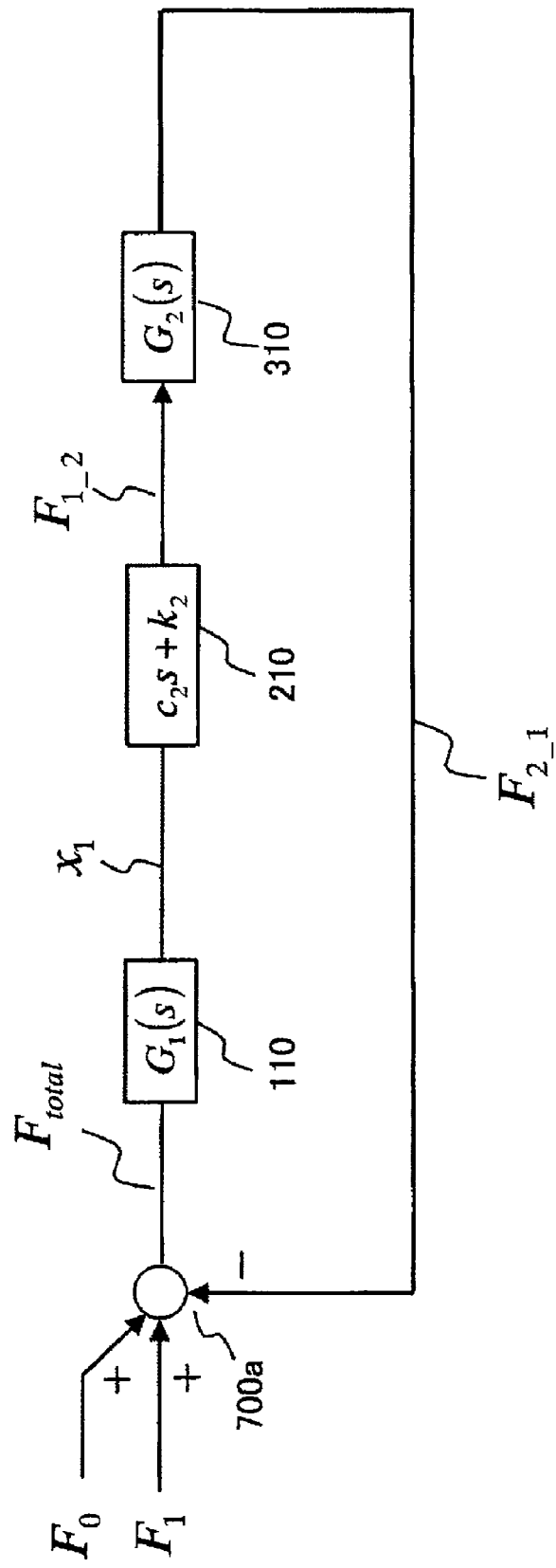
FIG. 45 is a block diagram showing the vibration damping device using the auxiliary mass and the cushioning member.

FIG. 45 is a block diagram in which the transmission characteristics of the function block 110 is expressed as $G_1(s)$ and the transmission characteristics of the function block 310 is expressed as $G_2(s)$ among the function blocks shown in FIG. 44. The function block 110 is the basic model of the resonance system of the main frame portion 100. The function block 310 is the basic model of the resonance system of the auxiliary mass 300.

The transmission characteristics $G_1(s)$ and $G_2(s)$ are expressed by the following equations (5) and (6).

$$G_1(s) = \frac{1}{m_1 s^2 + c_1 s + k_1} \tag{5}$$

$$G_2(s) = \frac{m_2 s^2}{m_2 s^2 + c_2 s + k_2} = \frac{F_{2\_1}}{F_{1\_2}} \tag{6}$$

Therefore, in FIG. 45, an input signal is multiplied by $G_1(s)$ at the function block 110, and an input signal is multiplied by $G_2(s)$ at the function block 310. The function block 110 is the basic model of the resonance system of the main frame portion 100. The function block 310 is the transmission characteristic model of the resonance system of auxiliary mass 300.

The function block 310 is the basic model of the resonance system of the auxiliary mass 300. The transmission characteristics $G_2(s)$ is the transmission characteristics of the function block 310. From FIG. 45 and the equation (6), the transmission characteristics $G_2(s)$ forms a transmission function model having dynamic characteristics in which an input value is the value of the transmission force $F_{1\_2}$ and an output value is the value of the transmission force $F_{2\_1}$. Moreover, an input to the function block 110 is defined as a force $F_{total}$. The function block 110 is the basic model of the resonance system of the main frame portion 100. The transmission characteristics $G_1(s)$ is the transmission characteristics of the function block 110. The force $F_{total}$ is expressed by the following equation (7).

$$F_{total}=F_1+F_2-F_{2\_1} \tag{7}$$

As described above, the transmission force $F_{2\_1}$ is a vibration damping force with respect to the main frame portion 100. Moreover, the function block 110 is the basic model of the resonance system of the main frame portion 100. Reviewing FIG. 45, as a result of the addition of the auxiliary mass 300 to the function block 110, the transmission force $F_{2\_1}$ as the vibration damping force functions with respect to application of the values the force $F_0$ and the force $F_1$. In other words, vibration of the main frame 100 can be suppressed by adding the auxiliary mass 300 to the function block 110. Therefore, in order to enhance vibration damping performance, it is necessary to at least set the value of the transmission force $F_{2\_1}$ to be large.

Here, a function of the function block 210 and the function block 310 is to reduce sensitivity to disturbance applied to the function block 110 at a predetermined frequency band. In this regard, the function block 310 is the basic model of the resonance system of the auxiliary mass 300. The function block 110 is the basic model of the resonance system of the main frame portion 100. The embodiment of the present invention is designed so as to effectively function with respect to the force $F_1$. The force $F_1$ is a centrifugal force generated when a disc having mass eccentricity rotates. As described above, the force $F_1$ is proportional to the square of a disc rotation speed, and shows its maximum at a maximum disc rotation number. In other words, $F_1$ shows its maximum at a maximum disc rotation frequency $f_{max}$ [Hz]. Therefore, if frequency characteristics of sensitivity to the disturbance applied to the function block 110 is set to exhibit low-sensitivity at the maximum disc rotation frequency $f_{max}$, the vibration damping effect can be enhanced. The function block 110 is the basic model of the resonance system of the main frame portion 100.

At a predetermined frequency, an optimum solution to obtain a maximum vibration damping characteristics with a minimum energy is obtained by designing such that the resonant frequency of the function block 310 has low sensitivity. The function block 310 is the basic model of the resonance system of the auxiliary mass 300. In this state, the resonant frequency $f_0$ [Hz] of the function block 310 is expressed by the following equation (8).

$$f_0=f_{max} \tag{8}$$

In contrast, the resonant frequency $f_0$ is expressed by the following equation (9).

$$f_0 = f_{max} = \frac{1}{2\pi}\sqrt{\frac{k_2}{m_2}} \tag{9}$$

From the equation (9), the elastic coefficient $k_2$ is expressed by the following equation (10).

$$k_2=m_2(2\pi f_{max})^2 \tag{10}$$

Moreover, when a Q value of the resonance of the function block 310 is expressed by $Q_2$, the viscosity coefficient $c_2$ is expressed by the following equation (11). The function block 310 is the basic model of the resonance system of the auxiliary mass 300. In this regard, the Q-value is a dimensionless quantity given as a ratio of a displacement amplitude at resonant frequency to a displacement under static weight.

$$C_2 = 10^{-\frac{Q_2}{20}}\sqrt{m_2 k_2} \tag{11}$$

When the equation (11) is substituted into the equation (10), the following equation (12) is obtained.

$$C_2 = 10^{-\frac{Q_2}{20}} 2\pi f_{max} m_2 \tag{12}$$

When the equation (10) and the equation (12) are substituted into the equation (6), the following equation (13) is obtained.

$$G_2(s) = \frac{F_{2\_1}}{F_{1\_2}} = \frac{m_2 s^2}{m_2\left[s^2 + 10^{-\frac{Q_2}{20}} 2\pi f_{max} s + (2\pi f_{max})^2\right]} = \frac{s^2}{s^2 + 10^{-\frac{Q_2}{20}} 2\pi f_{max} s + (2\pi f_{max})^2} \tag{13}$$

According to the equation (13), the transmission characteristics $G_2(s)$ is a function in which the maximum disc rotation frequency $f_{max}$ and the Q value $Q_2$ are parameters. $Q_2$ is the Q value of the basic model of the resonance system of the auxiliary mass 300. It is understood that the transmission characteristics $G_2(s)$ is uniquely determined only by these two parameters. The maximum disc rotation frequency $f_{max}$ is a parameter by which the resonance frequency of the transmission characteristics $G_2(s)$ is determined. $f_{max}$ is the maximum rotation frequency of the disc, and therefore is a constant determined by a specification of the device. Therefore, $f_{max}$ is characteristics that does not depend on the mass $m_2$ of the resonance system of the auxiliary mass 300.

The transmission force $F_{2\_1}$ functions as the vibration damping force. Therefore, in order to enhance an effect of the resonance system of the auxiliary mass 300, it is necessary to set the transmission force $F_{2\_1}$ to be large. However, the characteristics of the transmission characteristics $G_2(s)$ is not enhanced even if the mass $m_2$ of the auxiliary mass 300 is changed to be large. A value of the transmission force $F_{1\_2}$ is the input signal of the transmission characteristics $G_2(s)$. Therefore, it is understood that the only way to largely enhance the vibration damping effect of the resonance system of the auxiliary mass 300 is to set the value of the transmission force $F_{1\_2}$ to be large.

The value of the transmission force $F_{1\_2}$ is the input signal of the transmission characteristics $G_2(s)$. The definition of the transmission force $F_{1\_2}$ is as shown in the equation (3). That is, the transmission force $F_{1\_2}$ is defined by a sum of a value of the position $x_1$ multiplied by $k_2$ and the speed multiplied by $c_2$. The position $x_1$ is the position of the mass point $m_1$ with reference to the casing 1 when the main frame portion 100 is defined as the mass point $m_1$. When the equation (10) and the equation (12) are substituted into the equation (3) and taken together, the following equation (14) is obtained.

$$F_{1\_2} = 2\pi f_{max} m_2 \left(10^{-\frac{Q_2}{20}} s + 2\pi f_{max}\right) x_1 = m_2 H(s) \tag{14}$$

In this regard, H(s) is expressed by the following equation (15).

$$H(s) = 2\pi f_{max}\left(10^{-\frac{Q_2}{20}}s + 2\pi f_{max}\right)x_1 \quad (15)$$

Figure 46:
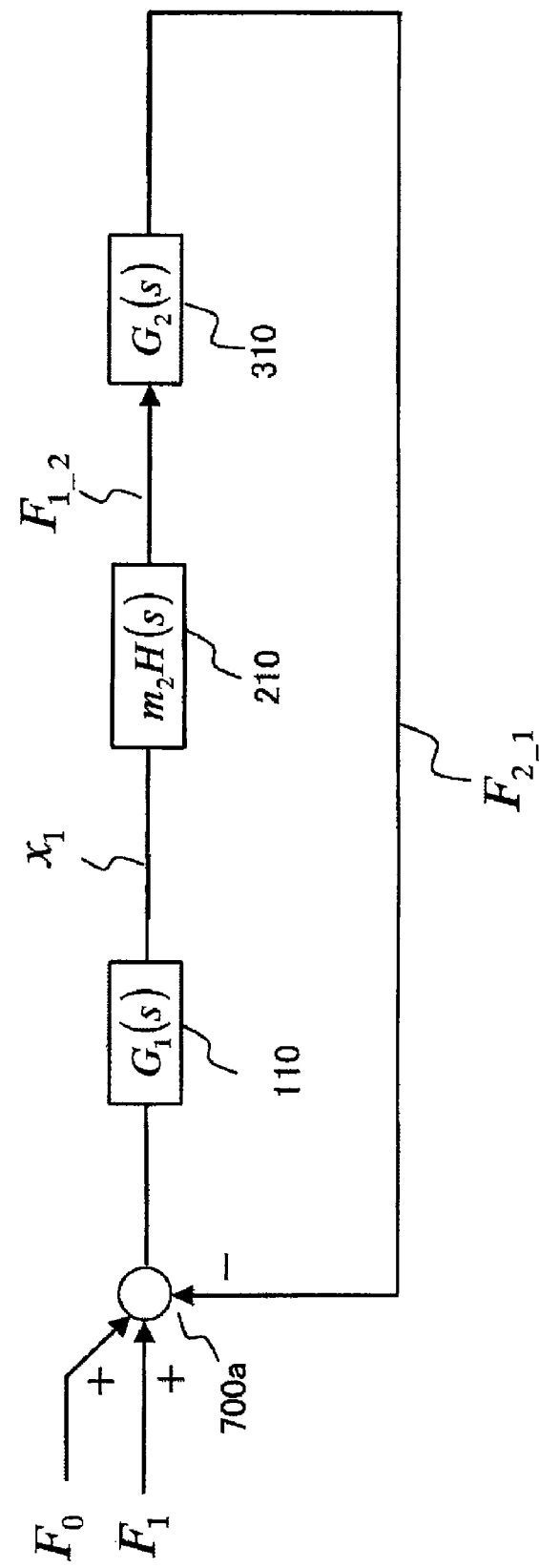
FIG. 46 is a block diagram showing the vibration damping device using the auxiliary mass and the cushioning member.

FIG. 46 is a block diagram converting FIG. 45 using the equation (14). As shown in FIG. 46, the value of the position $x_1$ is multiplied by $m_2 H(s)$ at the function block 210, and is outputted as the value of the transmission force $F_{1\_2}$. The position $x_1$ is a relative position of the main frame portion 100 with reference to the casing 1.

From the equation (14), the transmission force $F_{1\_2}$ is a product of the mass $m_2$ of the auxiliary mass 300 and H(s). As shown in the equation (15), H(s) has the maximum disc rotation frequency $f_{max}$ and the Q value $Q_2$ as parameters. In other words, H(s) is a function that does not depend on the mass $m_2$ of the auxiliary mass 300. Therefore, from the equation (14), the transmission force $F_{1\_2}$ is expressed by a quantity proportional to the mass $m_2$ of the auxiliary mass 300. In other words, in order to obtain a great vibration damping effect, it is necessary to at least set the mass $m_2$ of the auxiliary mass 300 to be large. Although the above description has been made referring the equations, validity of the above description will be hereinafter verified.

Figure 47:
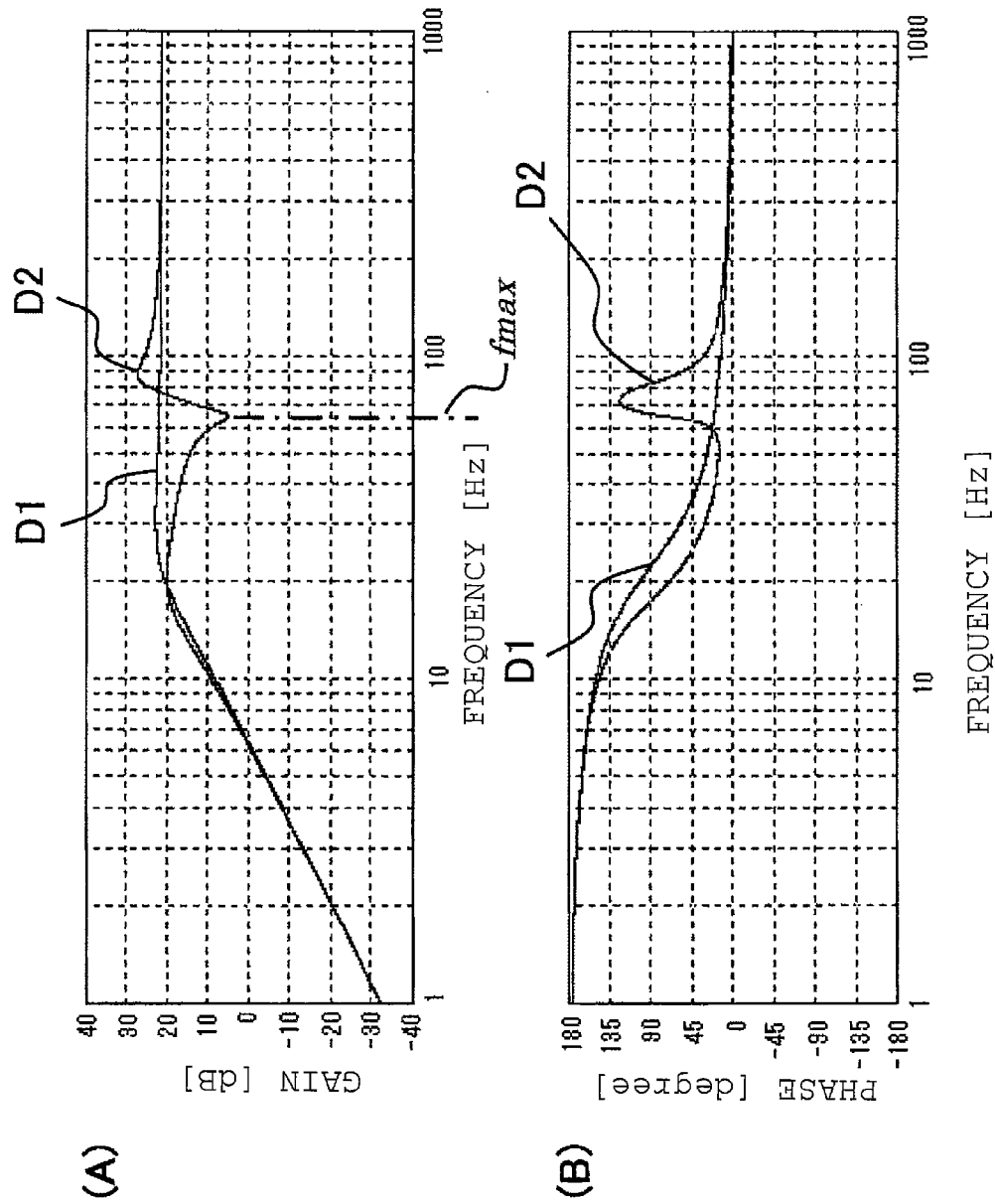
FIG. 47 shows characteristic diagrams illustrating frequency characteristics of an acceleration of a main frame in response to a disturbance to the vibration damping device using the auxiliary mass and the cushioning member.

FIG. 47 is a diagram showing an analysis result of frequency characteristics of an acceleration of the main frame portion 100 with respect to the force $F_1$ [N]. In FIG. 47(A), a horizontal axis represents the frequency [Hz], and a vertical axis represents a gain [dB]. In FIG. 47(B), a horizontal axis represents the frequency [Hz], and a vertical axis represents a phase [degree]. In FIG. 47, a curve D1 shows characteristics when the resonance system of the auxiliary mass 100 is not provided, and a curve D2 shows characteristics when the resonance system of the auxiliary mass 100 is provided. The force $F_1$ [N] is a disturbance input. The mass $m_1$ of the main frame portion 100 is 85 [g], the elastic coefficient $k_1$ is 168000 [N], the viscosity coefficient $c_1$ is 11.74 [N·s/m], the mass $m_2$ of the auxiliary mass 300 is 50 [g], a peak value of resonant amplitude at the resonant frequency $f_0$ is 20 [dB], and the maximum disc rotation frequency $f_{max}$ is 65 [Hz]. $f_0$ is the resonant frequency of the basic model of the resonance system of the auxiliary mass 300. In FIG. 47, the vertical axis represents the gain, and the horizontal axis represents the frequency. The gain shown on the vertical axis represents sensitivity of "the acceleration of the main frame portion 100" to "an external force applied to the main frame portion 100". When the gain is low, it indicates that the sensitivity is low. In other words, as the gain is lower, variation in acceleration of the main frame portion 100 is smaller, and therefore the characteristics is favorable to the device.

For comparison, FIG. 47 shows both characteristics when the resonance system of the auxiliary mass 300 is provided and is not provided. The force F1 is the force generated by the rotation of the disc having mass eccentricity. Both characteristics are compared at the maximum disc rotation frequency $f_{max}$ [Hz] with which the force F1 becomes its maximum. When the resonance system of the auxiliary mass 300 is not provided, the gain is approximately 22 dB. When the resonance system of the auxiliary mass 300 is provided, the gain is approximately 5 dB. That is, the sensitivity to the force due to disturbance is enhanced by approximately 17 dB.

Figure 48:
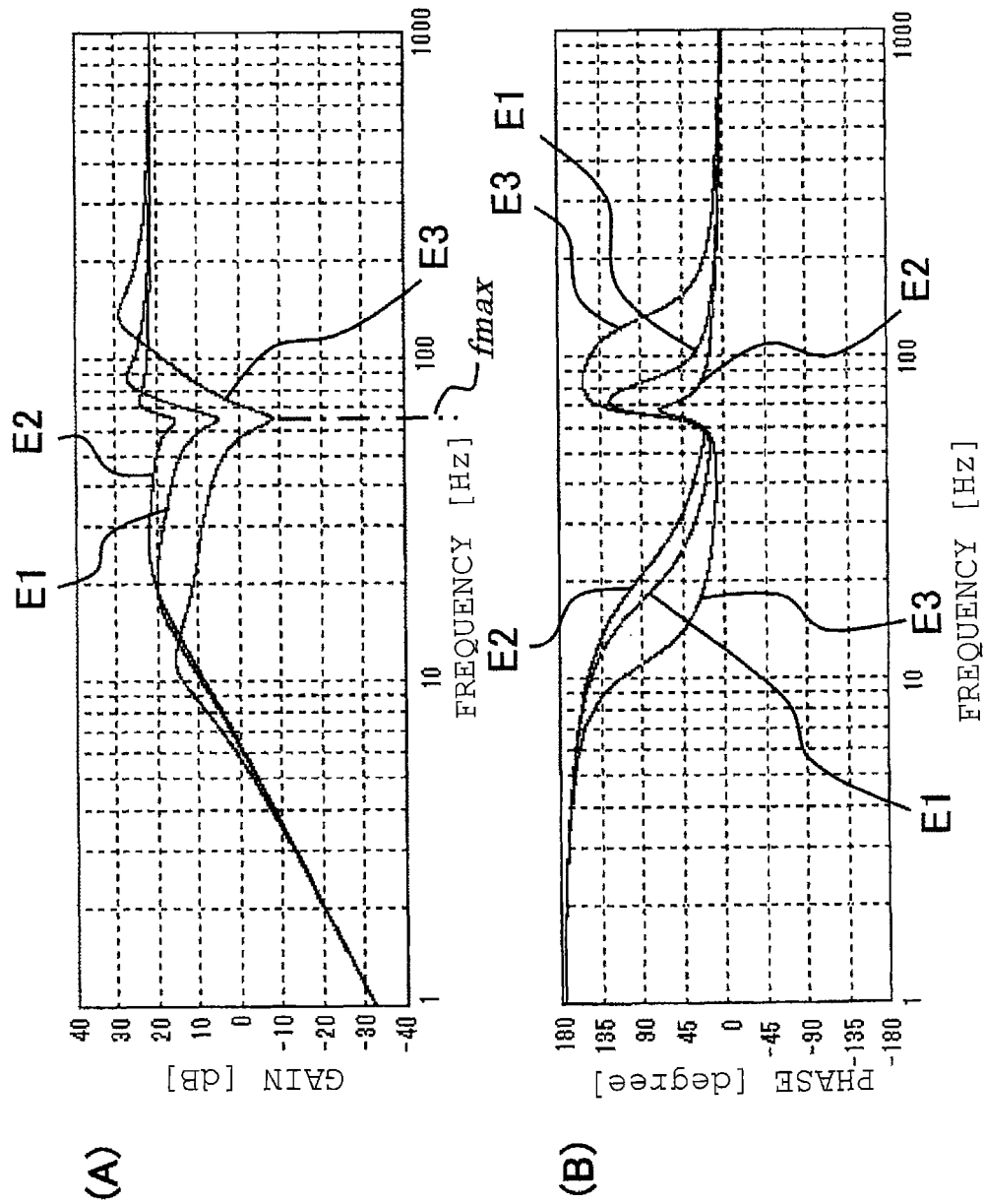
FIG. 48 shows characteristic diagrams illustrating frequency characteristics of an acceleration of the main frame in response to a disturbance to the vibration damping device when the auxiliary mass is varied.

FIG. 48 shows characteristics when the value of the mass $m_2$ of the auxiliary mass 300 is set to one-fifth and 5 times of a set value of FIG. 47 under the same conditions as that of FIG. 47. In FIG. 48(A), a horizontal axis represents the frequency [Hz], and a vertical axis represents the gain [dB]. In FIG. 48(B), a horizontal axis represents the frequency [Hz], and a vertical axis represents the phase [degree]. In FIG. 48, a curve E1 shows characteristics when the mass $m_2$ is not changed, a curve E2 shows characteristics when the mass $m_2$ becomes one-fifth, and a curve E3 shows characteristics when the mass $m_2$ becomes 5 times. The characteristics of FIG. 47 is also shown for comparison purpose. From FIG. 48, as the mass $m_2$ of the auxiliary mass 300 is smaller, an effect of reducing the sensitivity at the maximum disc rotation frequency $f_{max}$ [Hz] decreases. In contrast, as the mass $m_2$ of the auxiliary mass 300 is larger, the effect of reducing the sensitivity increases. This is the same result as that described with reference to the equations, and validity of consideration is verified by this analysis result.

From the above results, in order to obtain a great vibration damping effect, it is necessary to use at least the auxiliary mass 300 having a large mass. This contradicts a requirement for reducing a size and weight of the device. If a great vibration damping effect is given priority, there is a problem that the device becomes large, and the weight of the device becomes heavy.

The present invention is intended to solve the above described problems. Reviewing the equation (14), the transmission force $F_{1\_2}$ is proportional to the mass $m_2$ of the auxiliary mass 300, and therefore setting the transmission force $F_{1\_2}$ to be large is equivalent to setting the mass $m_2$ of the auxiliary mass 300 to be large. Therefore, detecting the value of the transmission force $F_{1\_2}$ and applying an amplified detection signal to the mass $m_2$ of the auxiliary mass 300 in force dimension is equivalent to setting the mass $m_2$ of the auxiliary mass 300 to be large. In other words, by amplifying the value of the transmission force $F_{1\_2}$ and applying the resulting value to the mass $m_2$ of the auxiliary mass 300, it becomes possible to obtain the same vibration damping effect as that when the mass $m_2$ of the auxiliary mass 300 is made large. This will hereinafter be reviewed with reference to block diagrams.

Figure 49:
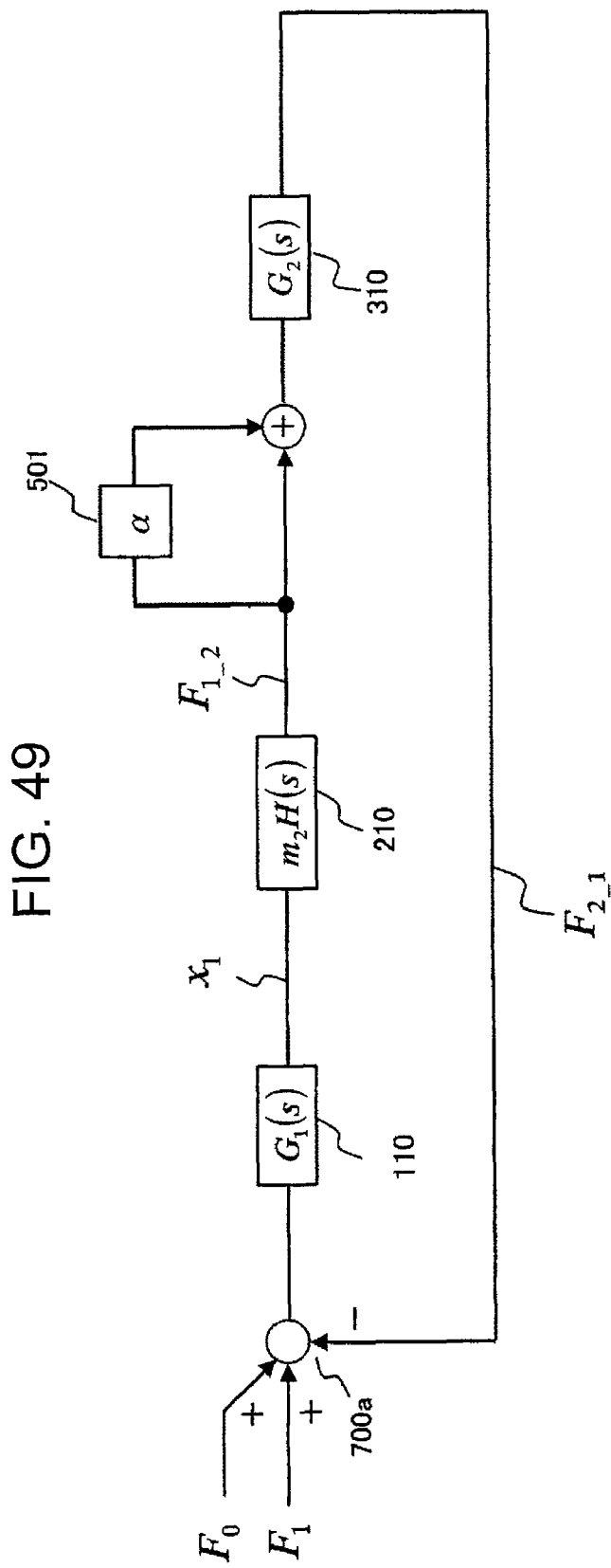
FIG. 49 is a block diagram showing a vibration damping device representing a basic configuration of the present invention in which a detection result of a transmission force multiplied by an amplification coefficient is added to an auxiliary mass in a force dimension.
Figure 50:
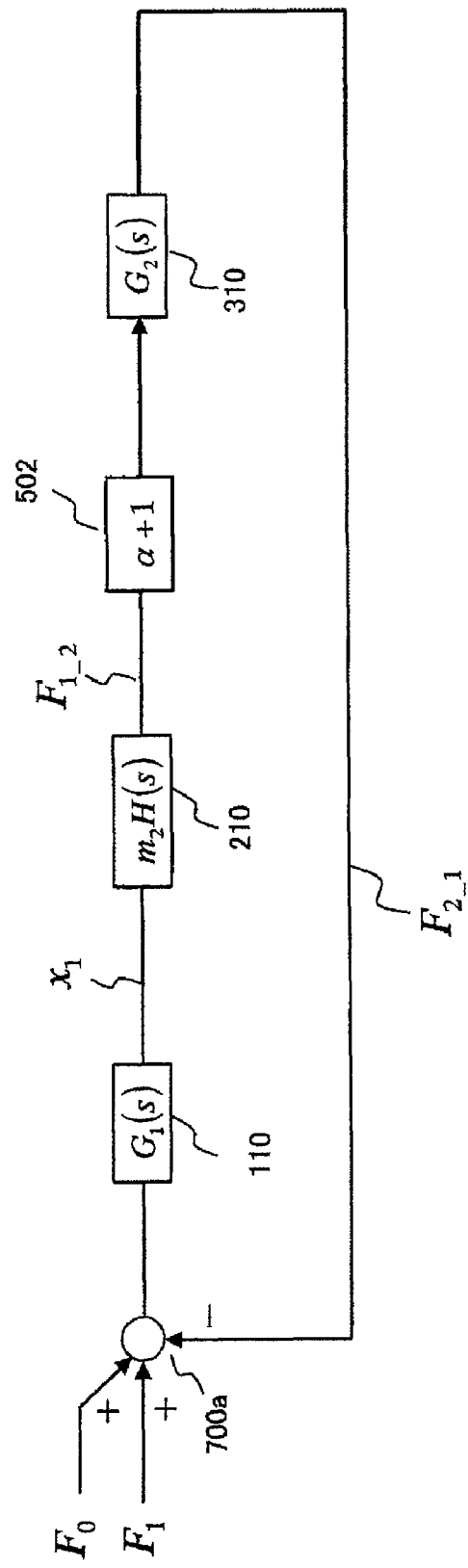
FIG. 50 is a block diagram showing the vibration damping device representing a basic configuration of the present invention in which the detection result of the transmission force is multiplied by the amplification coefficient is added to the auxiliary mass in force dimension.

FIG. 49 is a block diagram in which FIG. 46 is added with a function to detect the value of the transmission force $F_{1\_2}$, and a function to multiply the detected result of the transmission force $F_{1\_2}$ by α and to apply the resulting value to the mass $m_2$ of the auxiliary mass 300 in force dimension. In FIG. 49, a function block 501 amplifies the value of the transmission force $F_{1\_2}$. An amplification coefficient of the function block 501 is α. FIG. 50 is obtained by equivalently converting the function block 501. In FIG. 50, the value of the transmission force $F_{1\_2}$ is an input value to a function block 502. The function block 502 multiplies the value of the transmission force $F_{1\_2}$ by (α+1), and outputs a resultant value.

FIG. 50 indicates that detecting the value of the transmission force $F_{1\_2}$, multiplying the detected signal by α, and applying the multiplied value to the mass $m_2$ of the auxiliary mass 300 in force dimension is equivalent to changing the mass $m_2$ of the auxiliary mass 300 to become (α+1) times. Ideally, the amplification coefficient α can be set to arbitrary value, and therefore, when the amplification coefficient α is set to be large, a great vibration damping effect can be obtained irrespective of the value of the mass $m_2$ of the auxiliary mass 300.

An analysis result shown in FIG. 51 adds a condition of detecting the value of the transmission force $F_{1\_2}$, multiplying the value of the transmission force $F_{1\_2}$ by α, and applying the resulting value to the mass $m_2$ of the auxiliary mass 300 in force dimension to the same condition as that of FIG. 47. In FIG. 51(A), a horizontal axis represents the frequency

[Hz], and a vertical axis represents the gain [dB]. In FIG. 51(B), a horizontal axis represents the frequency [Hz], and a vertical axis represents the phase [degree]. In FIG. 51, a curve B4 is a curve when the amplification coefficient α is set to −0.8. The value of the amplification coefficient α is set to −0.8, 0 and 4. In this regard, these values of the amplification coefficient α were determined so that the values of (α+1) are 0.2, 1 and 5 which equal to magnification ratios of the mass $m_2$ of the auxiliary mass 300 of FIG. 47. In other words, the case where the amplification coefficient α is −0.8 corresponds to the case where the mass $m_2$ of the auxiliary mass 300 becomes 0.2 times. The case where the amplification coefficient α is 0 corresponds to the case where the mass $m_2$ of the auxiliary mass 300 is not changed (i.e., 1 time). The case where the amplification coefficient α is 4 corresponds to the case where the mass $m_2$ of the auxiliary mass 300 becomes 5 times. When FIG. 47 and FIG. 51 are compared, the characteristics when the mass $m_2$ of the auxiliary mass 300 of FIG. 47 becomes one-fifth is exactly the same as the characteristics when the amplification coefficient α is set to −0.8 in FIG. 51. Moreover, as is obvious, the characteristics when the mass $m_2$ of the auxiliary mass 300 of FIG. 47 is not changed is exactly the same as the characteristics when the amplification coefficient α is set to 0 in FIG. 51. Moreover, the characteristics when the mass $m_2$ of the auxiliary mass 300 of FIG. 47 becomes 5 times is exactly the same as the characteristics when the amplification coefficient α is set to 4 in FIG. 51. From this, it is analytically-verified that detecting the value of the transmission force $F_{1\_2}$, multiplying the detected signal by the amplification coefficient α, and applying the resulting value to the mass $m_2$ of the auxiliary mass 300 in force dimension is equivalent to increasing the mass $m_2$ of the auxiliary mass 300 by (α+1) times.

From above description, even when the resonance system of the auxiliary mass 300 is compact in size and the auxiliary mass 300 is light in weight, a great vibration damping performance is obtained by the following two functional means. The first one is a functional means capable of actively driving the auxiliary mass 300. The second one is a functional means that detects the value of the transmission force $F_{1\_2}$ transmitted from the main frame portion 100 to the auxiliary mass 300.

Here, a basic principle of the present invention will be summarized. A disc device has a vibration source. In the case of the disc device according to the present invention, the vibration source is an unnecessary centrifugal force $F_1$ generated when the disc having mass eccentricity rotates on the main frame portion 100. The centrifugal force $F_1$ is proportional to a square of a disc rotation number. Therefore, the centrifugal force $F_1$ reaches its maximum when the disc rotation number is the maximum. Therefore, the disc device needs a function to effectively suppress the unnecessary centrifugal force $F_1$ generated at the maximum disc rotation frequency.

For a DVD (Digital Versatile Disc) or the like, an information pickup detects a signal with a constant track linear speed. Therefore, the rotation number is smaller at an outer periphery of the disc, and is larger at an inner periphery of the disc. The centrifugal force $F_1$ is proportional to a square of the rotation number of the disc, and therefore a tracking error of the information pickup occurs when reading information from the inner periphery of the disc or when writing information on the inner periphery of the disc. In other words, the tracking error of the information pickup occurs less frequently and poses no serious problem except at the inner periphery of the disc. For this reason, the purpose of the present invention is to reduce tracking error at the inner periphery of the disc.

A dynamic vibration absorber is conventionally known as a mechanistic measure against disturbance vibration of a specific frequency band. A vibration damping effect of the dynamic vibration absorber is the largest when a resonant frequency of the dynamic vibration absorber is set to a frequency at which vibration is intended to be suppressed. In the case of the disc device, the frequency at which vibration is intended to be suppressed is the maximum disc rotation frequency. When the resonant frequency of the dynamic vibration absorber is fixed, the vibration damping performance is proportional to the size of the auxiliary mass 300. Therefore, in order that the device using the dynamic vibration absorber may obtain a great vibration damping effect, it is necessary to set the auxiliary mass 300 to be large.

An active dynamic vibration absorber includes a dynamic vibration absorber added with a controller and an actuator so as to enhance vibration damping performance. In other words, the active dynamic vibration absorber is a vibration damping device that actively drives the auxiliary mass 300 of the dynamic vibration absorber. The active dynamic vibration absorber can obtain a great vibration damping effect using the small auxiliary mass 300 by driving the auxiliary mass 300 using a signal equivalent to the large auxiliary mass 300. As described above, the signal for driving the auxiliary mass 300 is a signal obtained by multiplying the value of the transmission force $F_{1\_2}$ transmitted from the main frame 100 to the auxiliary mass 300.

The equation (3) indicates that the transmission force $F_{1\_2}$ is a function in which the relative position $x_1$ of the main frame 100 and the casing 1 is multiplied by the frequency characteristics of the resonance system of the dynamic vibration absorber. Therefore, the value of the transmission force $F_{1\_2}$ can be determined by measuring the relative position $x_1$ of the main frame 100 and the casing 1 and electrically making a filter having the transmission characteristics in parentheses on the right side of the equation (3). By amplifying the value of the transmission force $F_{1\_2}$ and driving the auxiliary mass 300, the auxiliary mass 300 becomes equivalent to the large auxiliary mass, and therefore the vibration damping device can provide a great vibration damping effect. In the following embodiments, specific examples of determination of the transmission force $F_{1\_2}$ will be described.

Embodiment 1

Figure 1:
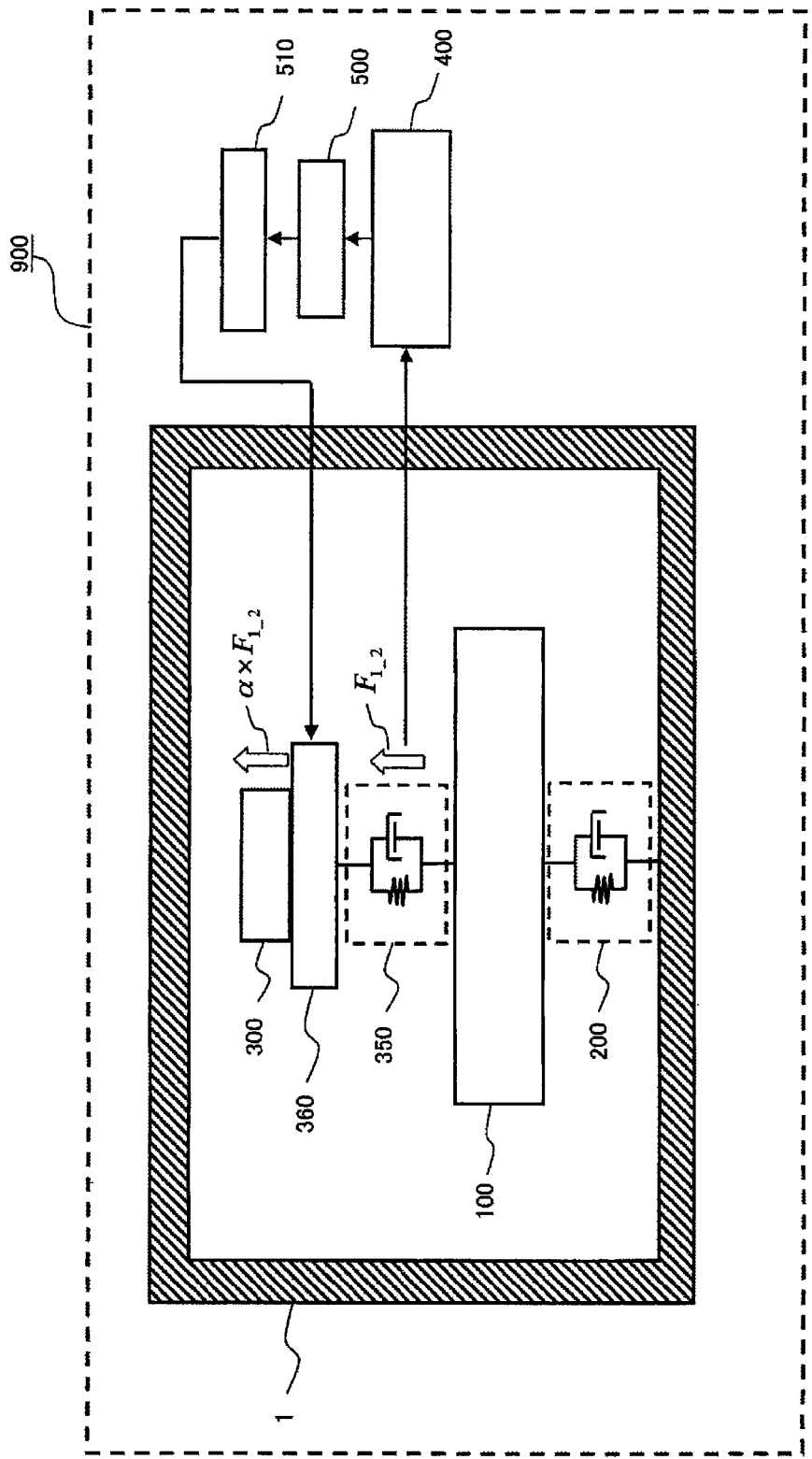
FIG. 1 is a model diagram showing a vibration damping device according to Embodiment 1 of the present invention.

FIG. 1 is a model diagram of a vibration damping device 900 according to Embodiment 1 using an auxiliary mass 300 that actively operates. In FIG. 1, a transmission force detecting portion 400 has a function to detect the value of the transmission force $F_{1\_2}$. The transmission force $F_{1\_2}$ is a force transmitted from the main frame portion 100 to the auxiliary mass 300. An amplifier 500 has a function to amplify an output value detected by the transmission force detecting portion 400 using an amplification coefficient α described later. An auxiliary mass driving portion 360 is provided on the main frame portion 100, and has a movable part connected to the auxiliary mass 300. The auxiliary mass driving portion 360 is driven by a driver 510 based on an output signal of the amplifier 500. An amplification factor of the amplifier 500 is determined so that a total gain of the transmission force detecting portion 400, the amplifier 500, the driver 510 and the auxiliary mass driving portion 360 equals to the amplification coefficient α. α×$F_{1\_2}$ is a force generated by the auxiliary mass driving portion 360 to the auxiliary mass 100.

In this regard, FIG. 1 is functionally illustrated, and therefore the auxiliary mass 300, the auxiliary mass driving portion 360, and a cushioning member 350 are expressed as separate elements. However, in practice, a part of a stationary part of the auxiliary mass driving portion 360 is a part of the main frame portion 100. Moreover, the cushioning member 350 is an element that connects the movable part and the stationary part of the auxiliary mass driving portion 360. Moreover, a mass of the movable part of the auxiliary mass driving portion 360 is a part of the auxiliary mass 300.

Figure 2:
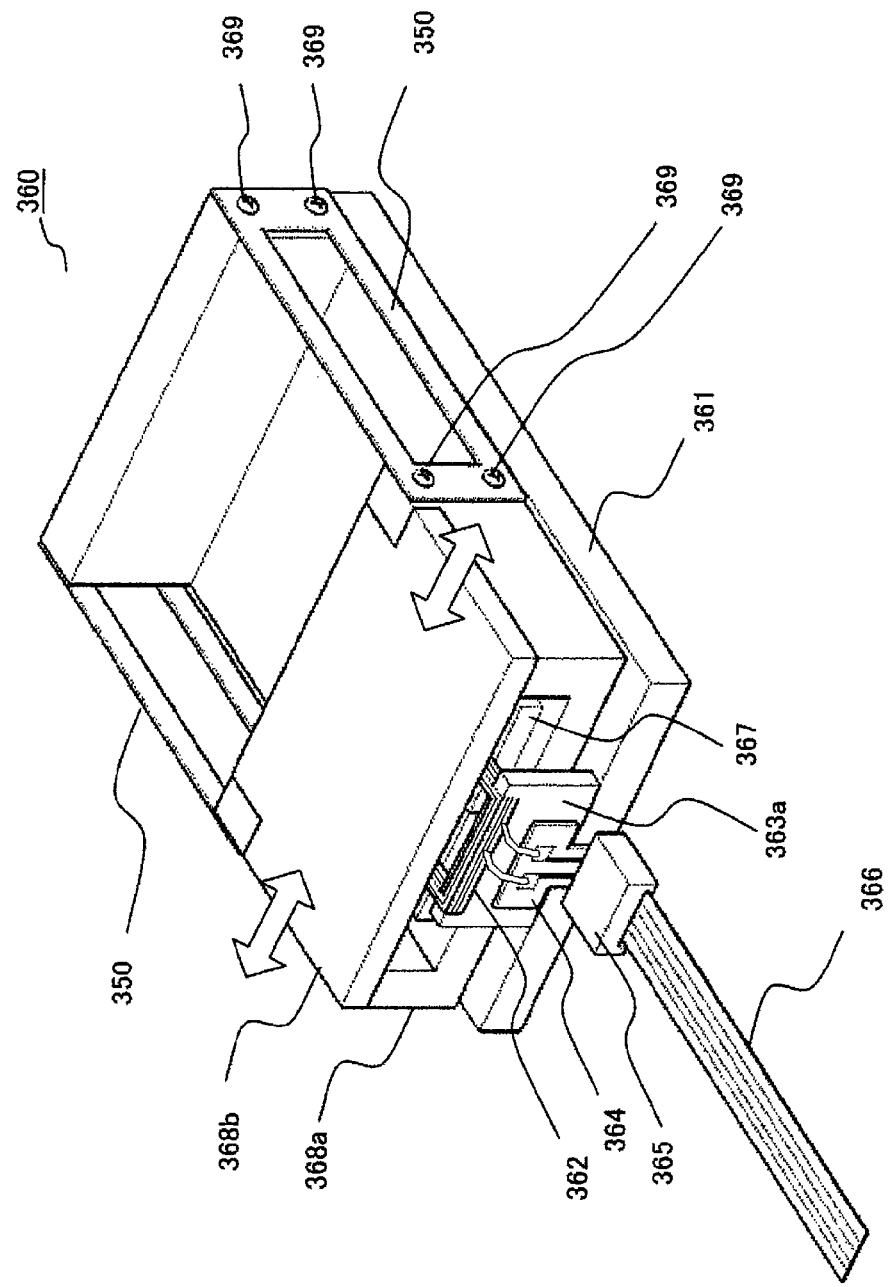
FIG. 2 is a perspective view showing an auxiliary mass driving portion according to Embodiment 1 of the present invention.
Figure 3:
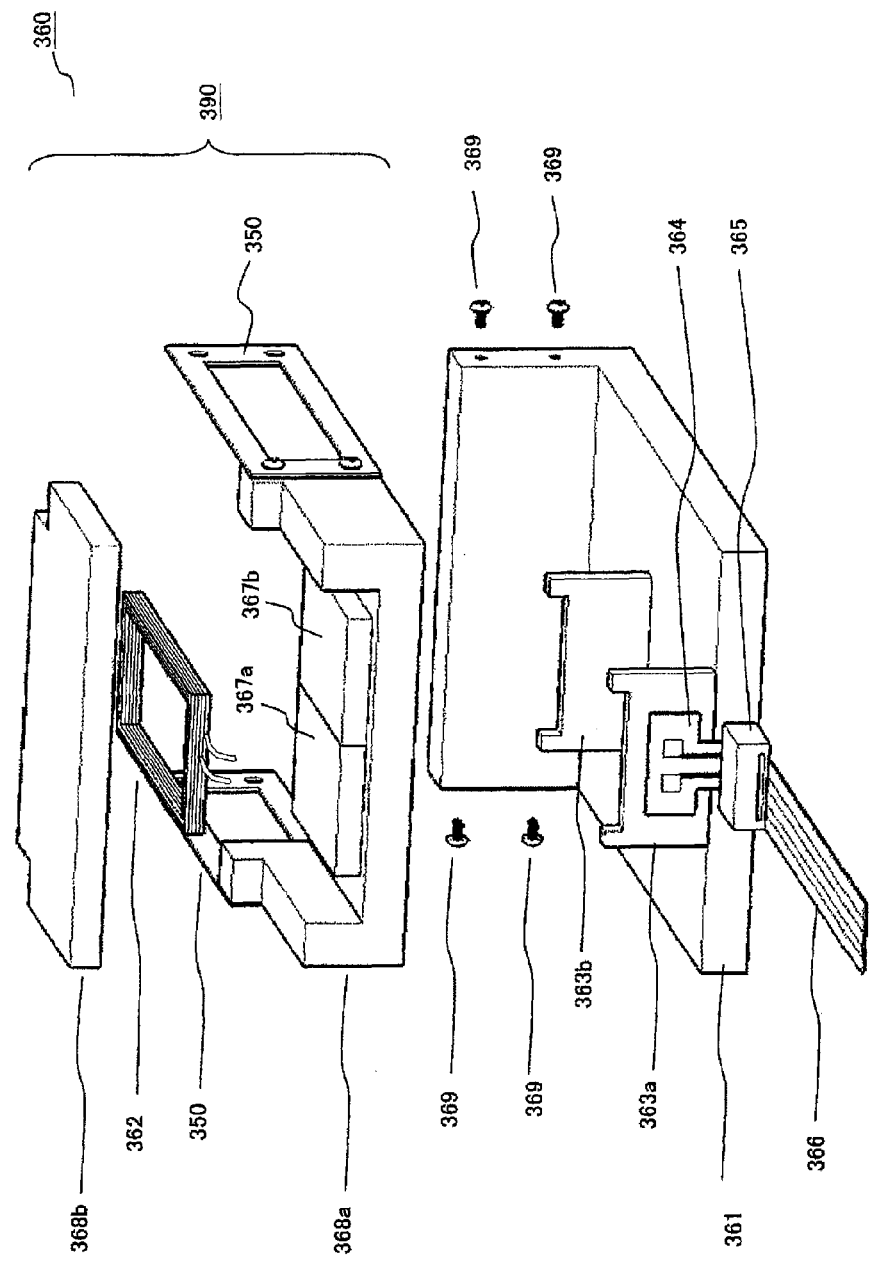
FIG. 3 is an exploded perspective view showing the auxiliary mass driving portion according to Embodiment 1 of the present invention.
Figure 6:
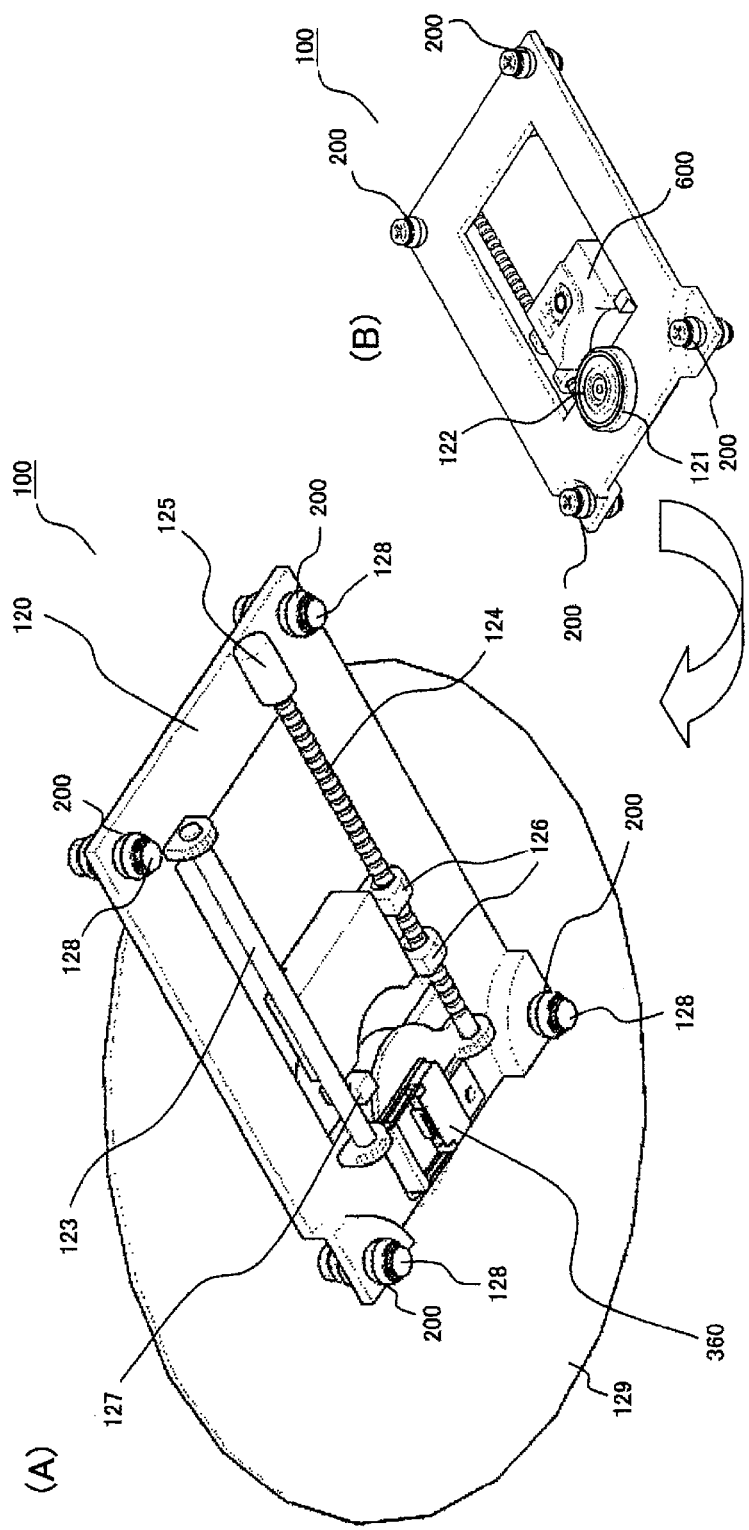
FIG. 6 is a perspective view showing a main frame portion according to Embodiment 1 of the present invention.

FIG. 2 is a perspective view showing a specific embodiment for achieving a function of the auxiliary mass driving portion 360. FIG. 3 is an exploded perspective view showing a structure of the auxiliary mass driving portion 360. FIG. 6 is a perspective view showing a specific embodiment in which the auxiliary mass driving portion 360 is mounted to the main frame portion 100. In this regard, the disc device is made by placing the main frame portion 100 shown in FIG. 6 with known components such as a power source and a circuit board in the casing 1.

In FIGS. 2 and 3, a base member 361 of the auxiliary mass driving portion 360 is fixed to the not shown main frame portion 100. A driving coil 362 is held by two driving coil holding members 363a and 363b. The driving coil holding members 363a and 363b are fixed to the base member 361 of the auxiliary mass driving portion 360. Therefore, the driving coil 362 is positioned and fixed to the base member 361 of the auxiliary mass driving portion 360.

Further, the driving coil 362 is wired to a wiring terminal 364 of the driving coil 362. The driving coil 362 is electrically connected to a flexible cable 366 via a flexible cable connector 365. A driving signal from the driver 510 is sent to the flexible cable 366. The above-described base member 361, the driving coil 362, the driving coil holding members 363a and 363b, the wiring terminal 364, the flexible cable connector 365 and the flexible cable 366 are connected to each other and are integrated, and have no movable part.

A permanent magnet 367 has two regions whose magnetizing directions are opposite to each other, and the two regions are integrally formed. In FIG. 3, 367a and 367b are distinctly shown for facilitating understanding. The permanent magnet 367 is fixed to a yoke 368a so as to face a yoke 368b. The permanent magnet 367 and the yokes 368a and 368b function as a magnetic circuit as a whole. Hereinafter, an element integrating the permanent magnet 367 and the yokes 368a and 368b will be simply referred to as a movable magnetic circuit 390.

In FIG. 2, the cushioning member 350 shown in FIG. 1 is made of a plate spring. An end of the plate spring 350 is connected to the movable magnetic circuit 390. The other end of the plate spring 350 is connected to the base member 361 of the auxiliary mass driving portion 360. In Embodiment 1, the cushioning member 350 made of the plate spring is fixed to the yoke 368a and the base member 361 using joint screws 369. The movable magnetic circuit 390 is swingably supported by the base member 361 of the auxiliary mass driving portion 360 via two plate springs (the cushioning member 350) which are parally provided. Therefore, as a moving direction of the movable magnetic circuit 390 is shown by white arrows in FIG. 2, the movable magnetic circuit 390 is movable in a direction of deflection of the plate springs (the cushioning member 350).

Figure 4:
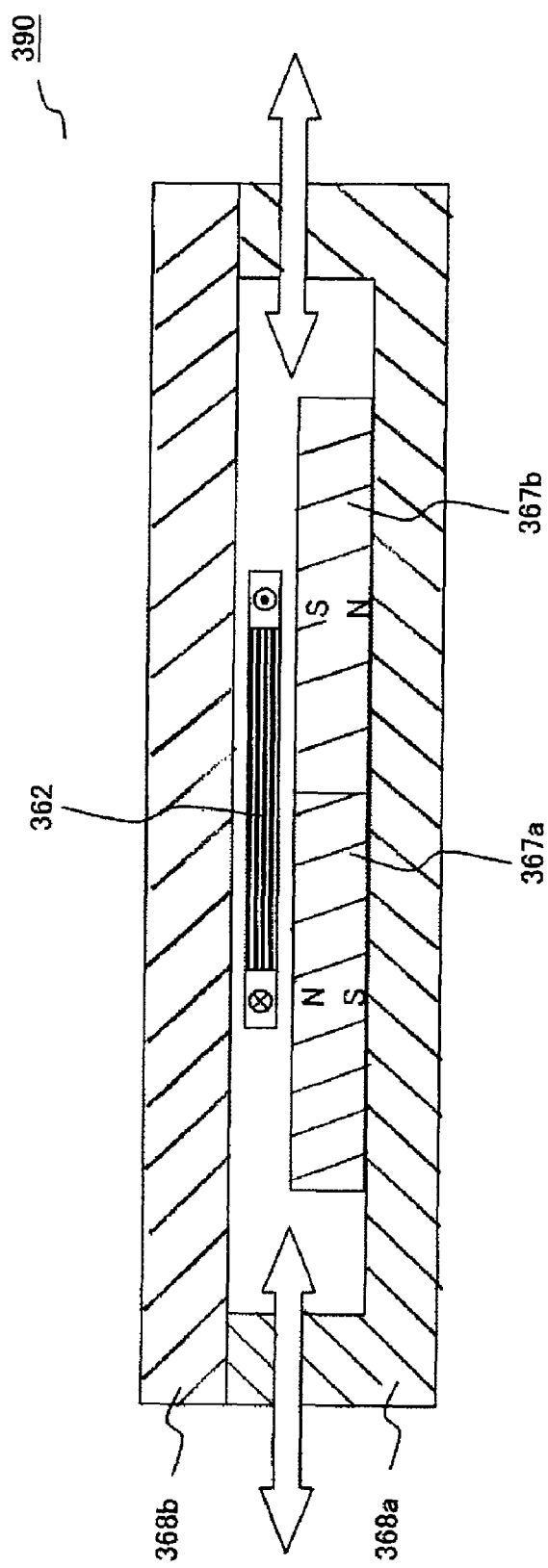
FIG. 4 is a sectional view showing a magnetic circuit according to Embodiment 1 of the present invention.
Figure 5:
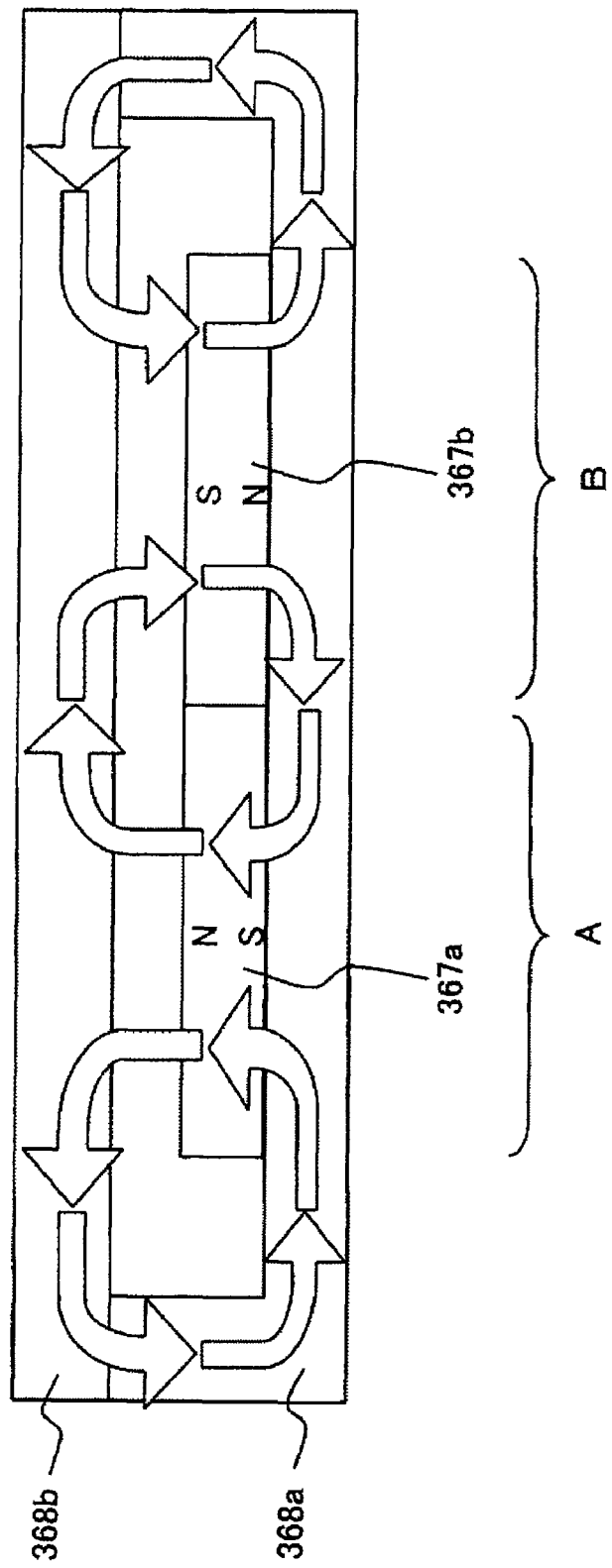
FIG. 5 is an explanatory view showing a direction of magnetic flux of the auxiliary mass driving portion according to Embodiment 1 of the present invention

FIG. 4 is a sectional view of the movable magnetic circuit 390. The yoke 368a side of the permanent magnet 367a is magnetized to an S-pole, and the yoke 368b side of the permanent magnet 367a is magnetized to an N-pole. The yoke 368a side of the permanent magnet 367b is magnetized to an N-pole, and the yoke 368b side of the permanent magnet 367b is magnetized to an S-pole. The permanent magnet 367 is fixed to the yoke 368a. The permanent magnet 367 faces the yoke 368b via a magnetic gap. The driving coil 362 is disposed in the magnetic gap. FIG. 5 is an explanatory view showing a flow of magnetic flux of the movable magnetic circuit 390 shown in FIG. 4. Arrows in FIG. 5 indicate the flow of the magnetic flux.

In the magnetic gap, in a region (referred to as a region A) on the permanent magnet 367a side, the magnetic flux flows from the yoke 368a side toward the yoke 368b side. In contrast, in a region (referred to as a region B) on the permanent magnet 367b side, the magnetic flux flows from the yoke 368b side toward the yoke 368a side. Directions of magnetic flux are opposite in the region A and in the region B.

As shown in FIG. 4, the driving coil 362 is disposed in the magnetic gap at the region A and the region B. When electric current flows through the driving coil 362, a force is generated in accordance with Fleming's left-hand rule. Its direction is a direction shown by arrows in FIG. 4. The direction shown by the arrows is left-right direction in FIG. 4, and is a direction in which the permanent magnet 367a and the permanent magnet 367b are arranged. In FIG. 4, electric current flows through the driving coil 362 on the permanent magnet 367a side from a front side to a back side in FIG. 4. Electric current flows through the driving coil 362 on the permanent magnet 367b side from the back side to the front side in FIG. 4. Therefore, the driving coil 362 is applied with a force toward the right side in FIG. 4. Since the driving coil 362 is positioned and fixed to the auxiliary mass driving portion 360, the movable magnetic circuit 390 moves toward the left side in FIG. 4.

Next, a specific mounting method of the auxiliary mass driving portion 360 to the main frame portion 100 will be described. In FIG. 6, FIG. 6(A) is a bottom perspective view of the main frame portion 100. FIG. 6(B) is a top perspective view of the main frame portion 100.

A main frame 120 is positioned and fixed to the not shown casing 1 by columns 128 disposed on four corners via cushioning support members 200. A spindle motor 121 is mounted to the main frame 120. The spindle motor 121 has a turntable 122 for rotating a disc 129.

The spindle motor 121 is mounted so that the spindle motor 121 is fitted into a not shown hole provided on the main frame 120. The spindle motor is fixed to the main frame 120 by fixing a flange portion provided on the spindle motor 121 to the main frame 120 using screws. Therefore, in a state where the spindle motor 121 is fixed to the main frame 120, the turntable 122 is located on an upper side of the main frame 120. The turntable 122 is a rotational component of the spindle motor 121. Moreover, a case is disposed on a lower side of the main frame 120. The case is a stationary component of the spindle motor 121.

An information pickup 600 has a function to write information on the disc 129 or to read information from the disc 129. The information pickup 600 is mounted to a shaft 123 and a lead screw 124. The information pickup 600 is movable by being guided by the shaft 123. The shaft 123 and the lead screw 124 are mounted to the main frame 120. A stepping motor 125 is mounted to an end portion of the lead screw 124. The stepping motor 125 has a function to rotate the lead screw 124.

An internal thread portion 126 provided on the information pickup 600 engages the lead screw 124 as an external thread. By the rotation of the lead screw 124, the information pickup 600 moves in a direction to perform tracking control. The direction to perform tracking control is a radial direction of the disc 129. Moreover, a convex portion 127 having U-shape provided on the information pickup 600 sandwiches the shaft 124 at its convex portion. With such a structure, the information pickup 600 is movable by being guided by the shaft 123.

The auxiliary mass 360 is mounted to the case. The case is a stationary side of the spindle motor 121. This is to directly suppress vibration of the spindle motor 122 holding the disc 129. Moreover, the direction shown by arrows in FIG. 2 is a radial direction of the disc 129, and is a direction in which the information pickup 600 performs the tracking control. This is to align the moving direction of the movable magnetic circuit 39 with the direction in which the information pickup 600 performs the tracking control. This is because the force generated by the disc having mass eccentricity results in adverse effect in a direction in which the information pickup 600 performs the tracking control. Moreover, the movable magnetic circuit 390 functions as the auxiliary mass 300.

With the above configuration, a function to actively drive the auxiliary mass 300 by electric signal is implemented.

With the above configuration, the auxiliary mass driving portion 360 is configured as a general magnetically-driven type actuator, and therefore the auxiliary mass driving portion 360 can be implemented in small size and at low cost. The auxiliary mass driving portion 360 is not limited to the above described magnetically-driven type. That is, the auxiliary mass driving portion 360 can be of piezoelectrically-driven type or other types. The spring member is not limited to the plate spring, and a coil spring or other system can be used.

Figure 7:
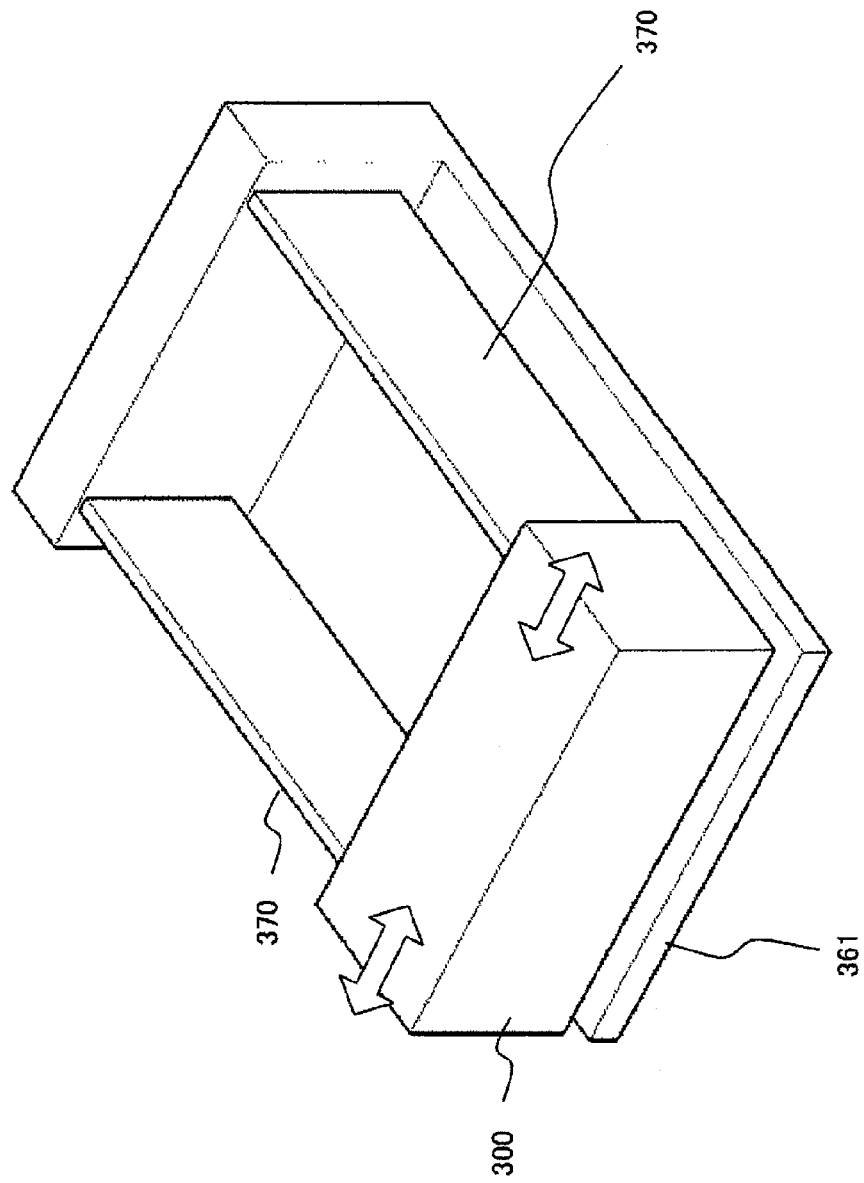
FIG. 7 is a perspective view showing the auxiliary mass driving portion according to Embodiment 1 of the present invention.

For example, FIG. 7 shows a configuration example of the auxiliary mass driving portion 360 using a bimorph element. The bimorph element is a piezoelectric transducer using two thin piezoelectric elements. When one thin piezoelectric element contracts, the other thin piezoelectric element expands. In FIG. 7, the bimorph 370 connects the auxiliary mass 300 and the base member 361. The bimorph 370 has both functions of the auxiliary mass driving portion 360 and the cushioning member 350. Therefore, this configuration is a simpler and more compact than that of magnetically-driven type.

Hereinafter, a specific embodiment to implement a means to detect the value of the transmission force $F_{1\_2}$ will be described. The transmission force $F_{1\_2}$ is the force transmitted from the main frame portion 100 to the auxiliary mass 300.

In Embodiment 1, the transmission force detecting portion 400 includes a relative position detector and a part that calculates the value of the transmission force $F_{1\_2}$ based on a signal detected by the relative position detector. The transmission force detecting portion 400 detects the value of the transmission force $F_{1\_2}$ transmitted from the main frame portion 100 to the auxiliary mass 300. The relative position detector detects a signal representing a relative position of the casing 1 and the main frame portion 100 in a direction of vibration.

Figure 8:
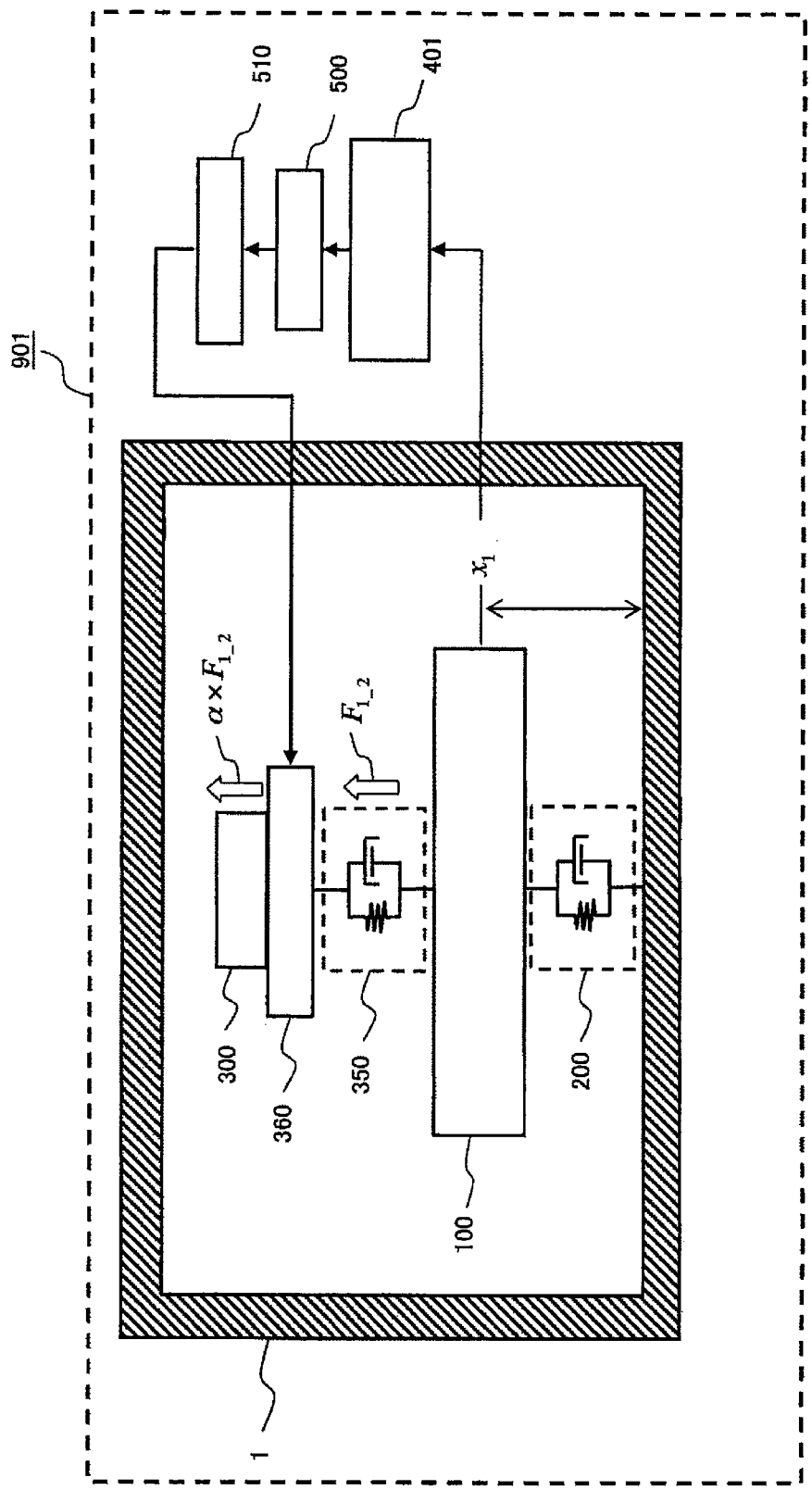
FIG. 8 is a model diagram showing the vibration damping device according to Embodiment 1 of the present invention.

FIG. 8 is a model diagram showing a vibration damping device 901 using the auxiliary mass 300 that actively operates. In FIG. 8, elements which are the same as those of the vibration damping device 900 described with reference to FIG. 1 are assigned the same reference numerals, and description thereof will be omitted. The position $x_1$ is a relative position of the casing 1 and the main frame portion 100. A transmission force detecting portion 401 has a feature such that an input signal is the position $x_1$. The transmission force $F_{1\_2}$ is the force transmitted from the main frame portion 100 to the auxiliary mass 300. $\alpha \times F_{1\_2}$ is the force generated by the auxiliary mass driving portion 360 to the auxiliary mass 100. $\alpha$ is the amplification coefficient.

The transmission force detecting portion 401 based on the position $x_1$, which is a feature of Embodiment 1, will be described below. The position $x_1$ is a relative position of the casing 1 and the main frame portion 100 in the direction of vibration. The definition of the transmission force $F_{1\_2}$ is as shown in the equation (3). Here, consideration will be made to the value of the viscosity coefficient $c_2$ which is a coefficient of a first term on the right side of the equation (3). When the mass $m_2$ of the auxiliary mass 300 is set to 5 [g] which is one-tenth of the value considered with reference to FIG. 47, and other conditions are the same, the value of the elastic coefficient $k_2$ is expressed by the following equation (16) from the equation (10), and the value of the viscosity coefficient $c_2$ is expressed by the following equation (17) from the equation (12).

$$k_2 = 833.98 \tag{16}$$

$$c_2 = 0.204 \tag{17}$$

Here, the mass $m_1$ of the main frame portion 100 is 85 [g], and the elastic coefficient $k_1$ is 168000 [N/m], and the viscosity coefficient $c_2$ is 11.74 [N·s/m]. A peak value of resonant amplitude at the resonant frequency $f_0$ is 20 [dB], and the maximum disc rotation frequency $f_{max}$ is 65 [Hz]. The resonant frequency $f_0$ is the resonant frequency of the basic model of the resonance system of the auxiliary mass 300.

When the equation (16) and the equation (17) are compared, the viscosity coefficient $c_2$ is smaller than the elastic coefficient $k_2$. In the equation (3) as a definition equation of the transmission force $F_{1\_2}$, the viscosity coefficient $c_2$ is the coefficient of the speed of the main frame 100 with reference to the casing 1. A Laplace operator s indicates derivation, and 1/s indicates integration. Therefore, in the equation (3), $sx_1$ indicates the speed determined by differentiating the value of the position $x_1$. For this reason, $c_2$ is a coefficient of the speed. Therefore, the viscosity coefficient $c_2$ is not negligible at a high frequency band since the speed increases, but is negligible at a low frequency band. In this case, the definition equation of the transmission force $F_{1\_2}$ shown as the equation (3) is expressed as the following equation (18).

$$F_{1\_2} = k_2 x_1 \tag{18}$$

Figure 9:
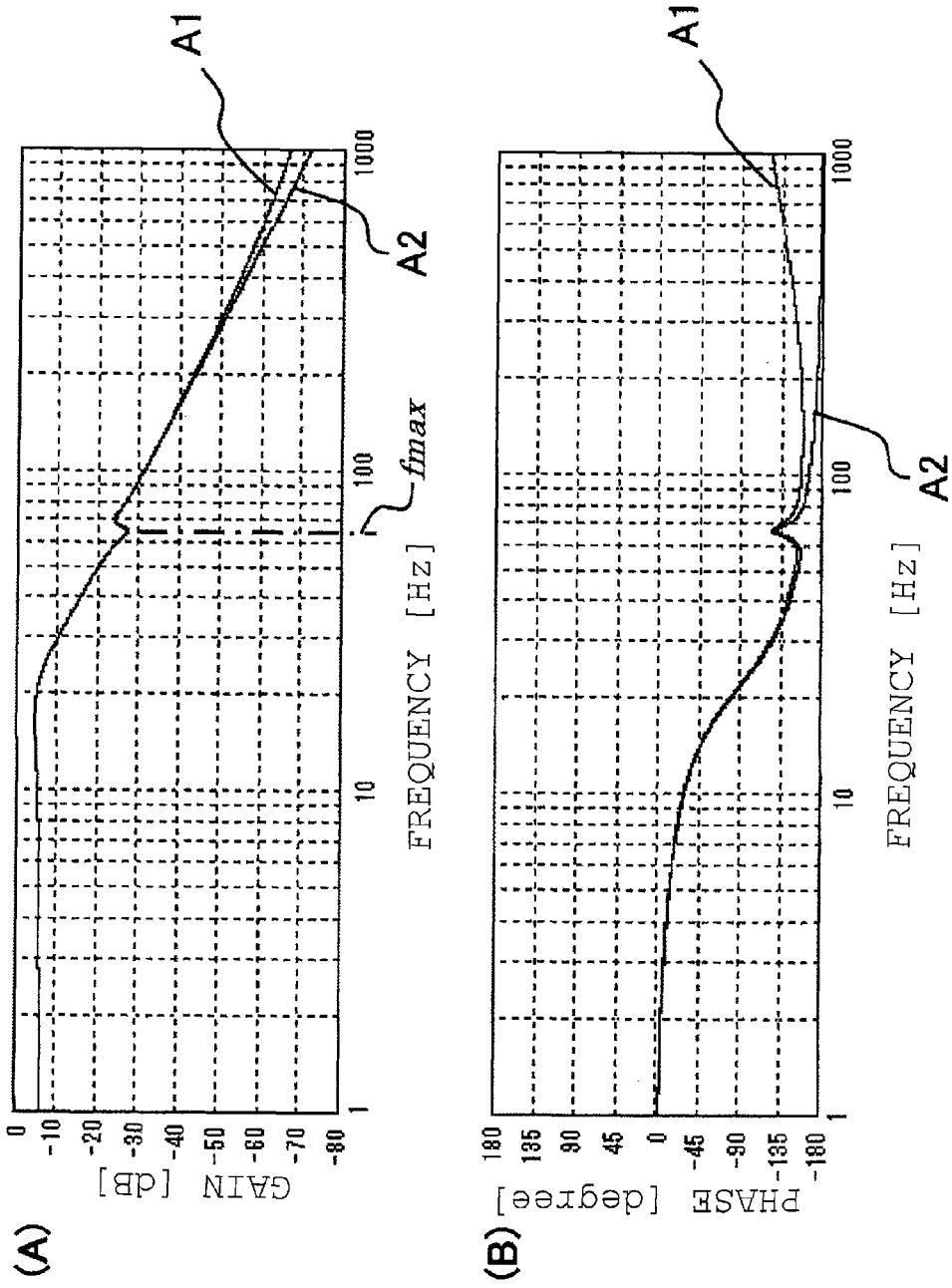
FIG. 9 shows characteristic diagrams illustrating detection characteristics of a transmission force transmitted to the auxiliary mass in response to a disturbance to the vibration damping device according to Embodiment 1 of the present invention.

FIG. 9 shows diagrams illustrating detection characteristics of the transmission force $F_{1\_2}$ with respect to the force $F_1$ [N]. In FIG. 9(A), a horizontal axis represents the frequency [Hz], and a vertical axis represents the gain [dB]. In FIG. 9(B), a horizontal axis represents the frequency [Hz], and a vertical axis represents the phase [degree]. In FIG. 9, a curve A1 shows detection characteristics of the value of the transmission force $F_{1\_2}$ under an ideal condition. A curve A2 shows detection characteristics of the value of the transmission force $F_{1\_2}$ based on the value of the position $x_1$. The transmission force $F_{1\_2}$ is the force transmitted from the main frame portion 100 to the auxiliary mass 300. In FIG. 9, two case examples are plotted. One of the case examples is detection characteristics under the ideal condition where the transmission force detecting portion 401 is assumed to be able to precisely perform detection with no error throughout an entire frequency band. The other of the case examples is detection characteristics of the value of the transmission force $F_{1\_2}$ obtained by neglecting the viscosity coefficient $c_2$ under the set conditions of Embodiment 1 and based only on the value of the relative position $x_1$ of the casing 1 and the main frame portion 100. In other words, this is detection characteristics of the transmission force $F_{1\_2}$ based on the equation (18).

The detection characteristics of the transmission force $F_{1\_2}$ is second order low-pass characteristics from a macroscopic viewpoint. A cutoff frequency equals to the resonant frequency of the resonance system constituted by the main frame portion 100 and the cushioning support member 200. At the maximum disc rotation frequency $f_{max}$ [Hz], an effect of the resonance system constituted by the auxiliary mass 300 and the cushioning member 350 is found. When the characteristics under the ideal condition and the detection characteristics based on the equation (18) are compared, the characteristics under the ideal condition has a slight phase lead with respect to the detection characteristics based on the equation (18) at a high frequency band higher than or equal to 100 Hz.

The reason is as follows. Since the transmission force $F_{1\_2}$ follows the equation (3) under the normal condition, the relative position $x_1$ of the casing 1 and the main frame portion 100 is dominant at the low frequency band. In contrast, the relative speed $d(x_1)/dt$ of the casing 1 and the main frame portion 100 is dominant at the high frequency band. Therefore, at the high frequency band, the detection characteristics of the transmission force $F_{1\_2}$ has a phase lead. It is found that the characteristics under the ideal condition and the detection characteristics based on the equation (18) of Embodiment 1 are almost the same at a frequency band lower than or equal to the maximum disc rotation frequency $f_{max}$ [Hz] which is a frequency band where control is intended to be made.

Figure 10:
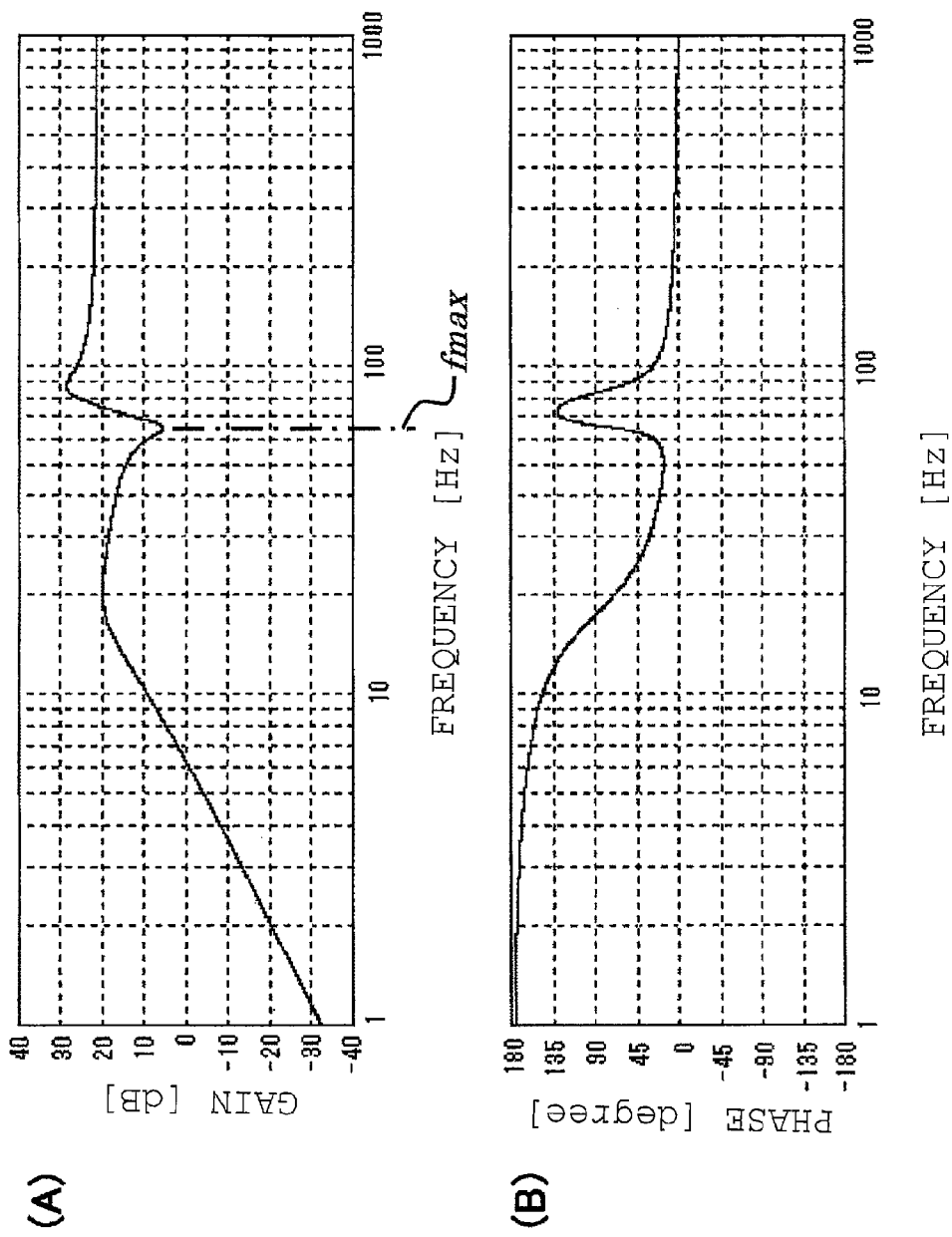
FIG. 10 shows characteristic diagrams illustrating frequency characteristics of an acceleration of the main frame portion in response to a disturbance to the vibration damping device according to Embodiment 1 of the present invention.

FIG. 10 shows diagrams illustrating an analysis result of frequency characteristics of the acceleration of the main frame portion 100 with respect to the force F1 [N]. In FIG. 10(A), a horizontal axis represents the frequency [Hz], and a vertical axis represents the gain [dB]. In FIG. 10(B), a horizontal axis represents the frequency [Hz], and a vertical axis represents the phase [degree]. The detection characteristics is based on the equation (18) of this embodiment shown in FIG. 9. The value of the amplification coefficient $\alpha$ is set to 9.

The characteristics of FIG. 10 is characteristics when the value of the auxiliary mass 300 is 5 [g]. The characteristics of FIG. 10 is equal to the characteristics of FIG. 47 (the characteristics with the resonance system of the auxiliary mass), none the less because the auxiliary mass 300 of FIG. 10 is as small as one-tenth (5 [g]) of the conventional auxiliary mass 300. In this regard, the characteristics of FIG. 47 (the characteristics with the resonance system of the auxiliary mass) is the characteristics when only the conventional auxiliary mass 300 is provided. Particularly, the gain at the maximum disc rotation frequency $f_{max}$ [Hz] is almost the same as that of the above described FIG. 47. That is, the vibration damping device 901 can provide a great vibration damping effect using the smaller and lightweight auxiliary mass 300. The maximum disc rotation frequency $f_{max}$ [Hz] is the frequency at which disturbance acceleration due to mass eccentricity of the disc shows its maximum.

Figure 11:
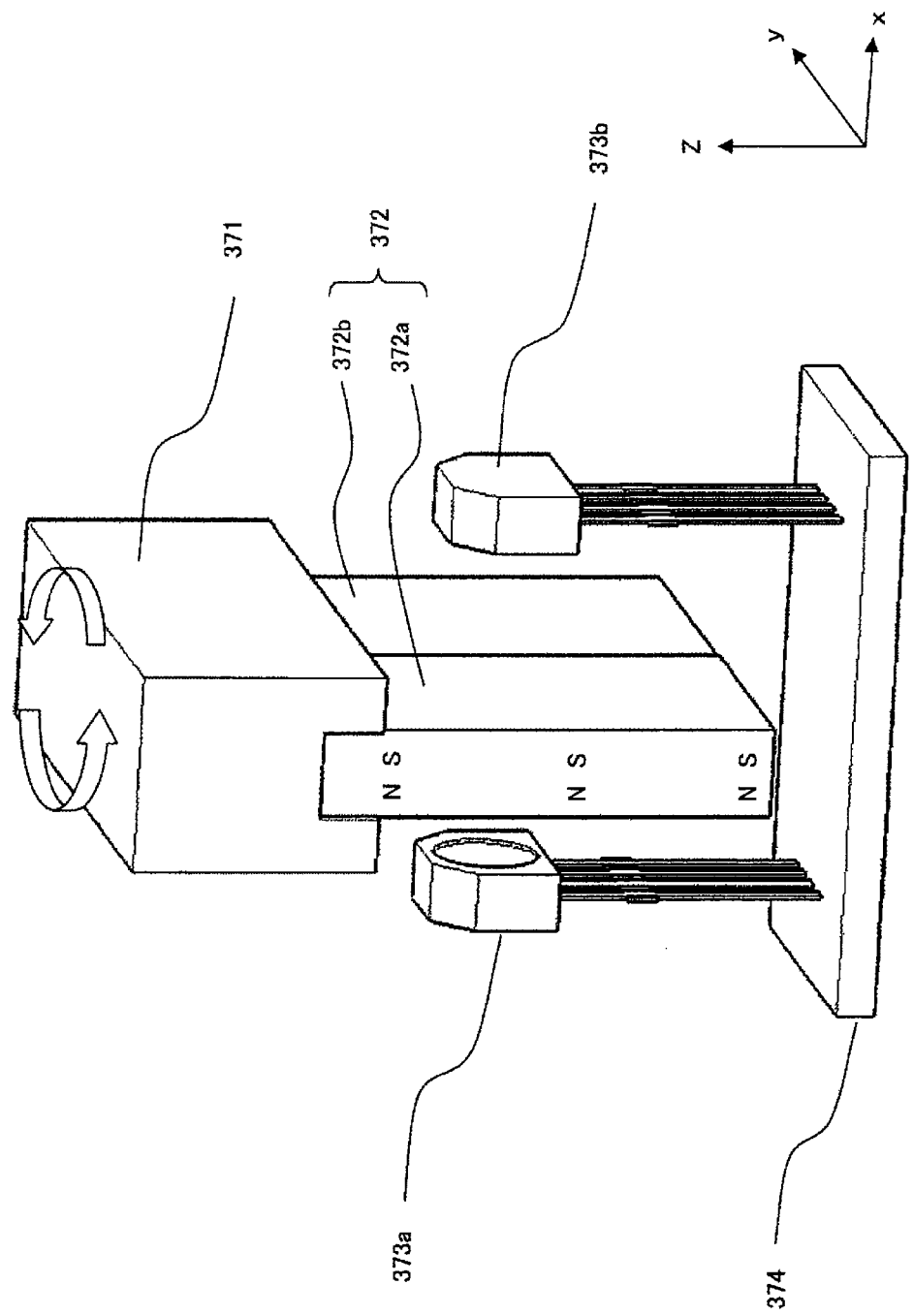
FIG. 11 is a perspective view showing a relative position detector for detecting a relative position of a casing and the main frame portion of the vibration damping device according to Embodiment 1 of the present invention.

FIG. 11 shows a specific example of a function of the relative position detector for detecting the value of the position $x_1$. The position $x_1$ is a relative position of the casing 1 and the main frame portion 100 in the direction of vibration. In FIG. 11, a coordinate is shown in a lower right portion of FIG. 11. An x-axis direction is a tangential direction of the disc, a y-axis direction is a radial direction of the disc, and a z-axis direction is a focusing direction (a direction perpendicular to a surface of the disc). The relative position detector has a function to detect the relative position of the casing 1 and the main frame portion 100 in the radial direction of the disc (the y-axis direction of FIG. 10). In contrast, the relative position detector does not have sensitivity with regard to a movement of the main frame portion 100 in the z-axis direction component. The radial direction of the disc is a direction in which the information pickup 600 performs tracking control.

First, a configuration of the relative position detector will be described. A permanent magnet 372 is positioned and fixed to a magnet holder 371. The magnet holder 371 is positioned and fixed to the main frame portion 100. That is, the magnet 372 is positioned and fixed to the main frame portion 100. Hall elements 373a and 373b are positioned and fixed to a Hall element holding portion 374 made of a circuit board and the like. The Hall element holding member 374 is positioned and fixed to the casing 1. That is, the Hall elements 373a and 373b are positioned and fixed to the casing 1.

The permanent magnet 372 is positioned and fixed to the main frame portion 100. The Hall elements 373a and 373b are positioned and fixed to the casing 1. In this example, the relative position detector is configured to detect a moving amount of the permanent magnet 372 as a change in magnetic flux density using Hall elements 373a and 373b. For example, as shown in FIG. 11, the permanent magnet 372 is magnetized in the x-axis direction, and a magnetizing direction reveres at a center position in the y-axis direction. The permanent magnet 372 is integrally formed, but a difference in the magnetizing directions is distinctly shown by 372a and 372b in FIG. 10 in order to facilitate understanding. The Hall elements 373a and 373b are located at a position in the y-axis direction where the magnetizing direction of the permanent magnet 372 reverses.

Next, an operation of the relative position detector will be described. First, in order to describe a change in output of the Hall elements with respect to a positional relationship between the permanent magnet and the Hall elements, the permanent magnet 372 and the Hall element 373a will be described as an example. The permanent magnet 372 and the Hall element 373a are disposed so as to face each other with a constant gap therebetween in the x-axis direction. The center of the Hall element 373a is located at the position in the y-axis direction where the magnetizing direction of the permanent magnet 372 reverses.

With a configuration of the permanent magnet 372 and the Hall element 373, when the permanent magnet 372 moves in the y-axis direction, a strength of the magnetic flux at the position of the hall element 373a changes substantially linearly corresponding to a change in the position of the Hall element 373a relative to the permanent magnet 372. Therefore, an output value of the Hall element 373a changes linearly. In contrast, the magnetic flux at the position of the Hall element 373a does not change even when the permanent magnet 372 moves in the z-axis direction component. That is, the Hall element 373a does not have sensitivity with respect to the movement of the permanent magnet 372 in the z-axis direction, and the output value of the Hall element 373a does not change. Therefore, the output value of the Hall element 373a detecting the magnetic flux can be treated as a displacement of the permanent magnet 372 in the y-axis direction component. Moreover, the Hall element 373a does not have sensitivity with respect to the movement in the z-axis direction component. The z-axis direction is a focusing direction of the information pickup.

Consideration will be made to a displacement of the position of the main frame portion 100 generated by the disturbance due to the rotation of the disc having mass eccentricity. The disturbance generated by the rotation of the disc with mass eccentricity is a centrifugal force. Therefore, the displacement of the position of the main frame portion 100 becomes a circular movement as shown by arrows in an upper part of FIG. 11. Therefore, the permanent magnet 372 does not only moves in the y-axis direction, but also moves in the x-axis direction. If a single Hall element 373a is provided, the magnetic flux density at the position of the Hall element 373a changes due to the movement of the permanent magnet 372 in the x-axis direction component, and therefore detection sensitivity characteristics in the y direction varies.

For example, when the Hall element 373a moves closer to the permanent magnet 372, the detection sensitivity in the y-direction increases. In contrast, when the Hall element 373a moves apart from the permanent magnet 372, the detection sensitivity in the y-direction decreases. In order to suppress such a variation in the detection sensitivity in the Y-direction due to the displacement in the x-axis direction component, the relative position detector has the pair of Hall elements 373a and 373b parallely disposed and facing each other via a predetermined gap therebetween, and the permanent magnet 372 is inserted between the Hall element 373a and the Hall element 373b as shown in FIG. 11.

In this configuration, for example, when the permanent magnet 372 moves in the x-axis direction toward the Hall element 373a, a distance between the Hall element 373a and the permanent magnet 372 in the x-axis direction component decreases, and the detection sensitivity in the y-axis direction component increases. Conversely, since a distance between the Hall element 373b and the permanent magnet 372 in the x-axis direction component increases, the detection sensitivity in the y-axis direction component decreases. Therefore, by taking an average of the detection outputs of the Hall elements 373a and 373b, the variation in the detection sensitivity due to the movement of the permanent magnet 372 in the x-axis direction component can be almost eliminated. The average of the detection output values of the Hall elements 373a and 373b can be obtained by a method of diving both detection signals respectively into halves and add the two halves, or other methods.

Figure 12:
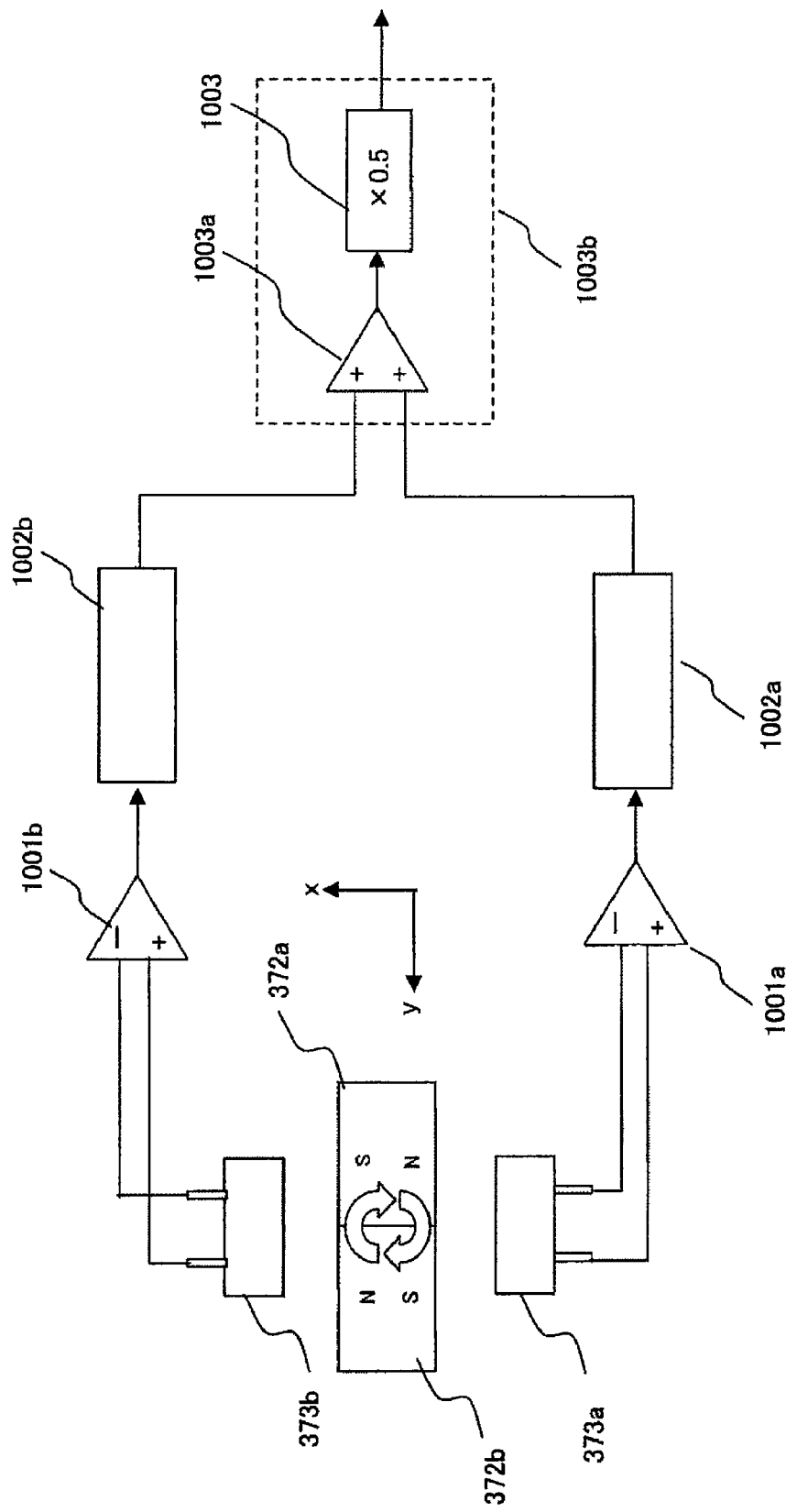
FIG. 12 is a block diagram showing a circuit construction of the relative position detector of the vibration damping device according to Embodiment 1 of the present invention.

Next, a circuit configuration for operating the relative position detector will be described. FIG. 12 is a block diagram showing the circuit configuration of the relative position detector. Of the two terminals of the Hall element 373a, a negative output is connected to a negative side of an input terminal of a difference amplifier 1001a, and a positive output is connected to a positive side of the input terminal of the difference amplifier 1001a. An output terminal of the difference amplifier 1001a is connected to a direct-current component removing filter 1002a. Similarly, of the two terminals of the Hall element 373b, a positive output is connected to a negative side of an input terminal of a difference amplifier 1001b, and a negative output is connected to a positive side of the input terminal of the difference amplifier 1001b. An output terminal of the difference amplifier 1001b is connected to a direct-current component removing filter 1002b. A signal detected by the Hall element 373a is outputted to the direct-current component removing filter 1002a. A signal detected by the Hall element 373b is outputted to the direct-current component removing filter 1002b.

The direct-current component removing filters 373a and 373b are used to remove offset of the direct-current component since the offset of the direct-current causes a negative effect on the control. The other terminals of the direct-current component removing filters 1002a and 1002b are connected to input terminals of a summing amplifier 1003a. An output terminal of the summing amplifier 1003a is connected to an attenuator 1003. The summing amplifier 1003a and the attenuator 1003 constitute an average circuit 1003b. The attenuator 1003 multiplies an input value by 0.5 and outputs the resulting value as a displacement signal of the permanent magnet 372 in the y-axis direction component.

Figure 13:
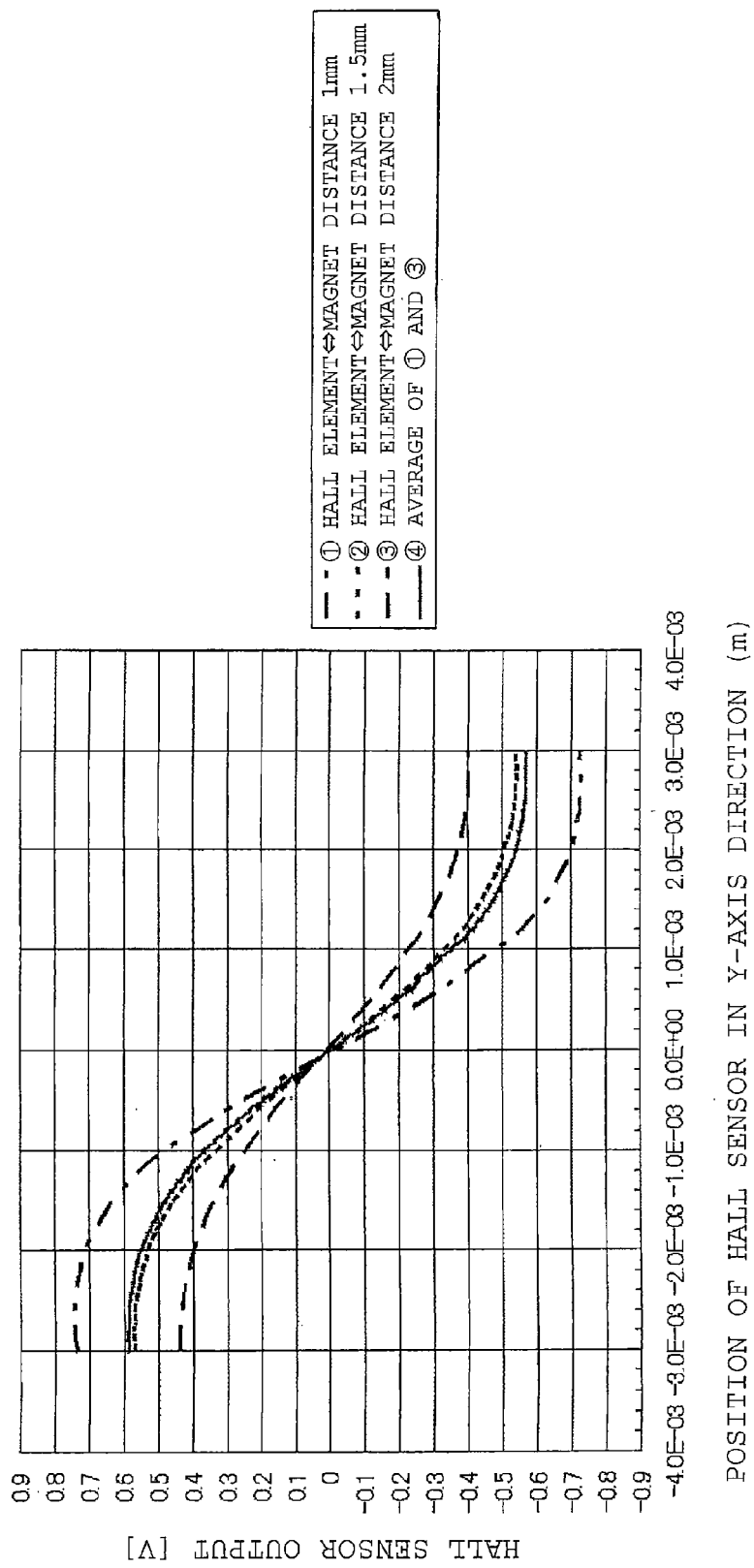
FIG. 13 is a characteristic diagram showing output characteristics of the relative position detector of the vibration damping device according to Embodiment 1 of the present invention.

FIG. 13 is a characteristic diagram showing output characteristics of the relative position detector. A horizontal axis represents the position in the y-axis direction component, and a vertical axis represents an output value of the Hall element. A dashed-dotted line (1) corresponds to a case where a distance between the Hall element and the permanent magnet is 1 mm, a dotted line (2) corresponds to a case where the distance between the Hall element and the permanent magnet is 1.5 mm, and a broken line (3) corresponds to a case where the distance between the Hall element and the permanent magnet is 2.0 mm. A solid line shows values obtained by averaging the dashed-dotted line (1) and the broken line (3).

In the characteristic diagram of FIG. 13, the solid line shows almost the same values as the dotted line (2) showing the output values when the distance between the Hall element and the permanent magnet is 1.5 mm. From this result, it is understood that the relative position detector can almost eliminate the variation in the detection sensitivity based on the displacement of the permanent magnet in the x-axis direction component. The solid line shows values obtained by averaging the dashed-dotted line (1) and the broken line (3).

With above configuration, the relative position detector can detect the displacement of the relative position of the casing 1 and the main frame portion 100 only in a single-axis direction component (in this example, the y-axis direction component). The permanent magnet 372 and the Hall elements 373a and 373b are inexpensive elements, and therefore the relative position detector of this detection system is inexpensive and can provide high performance.

In this regard, the relative position detector using the pair of Hall elements 373a and 373b and the permanent magnet 372 can be widely used as a detector for detecting a displacing amount of the relative position in the single-axis direction component. That is, in Embodiment 1, the relative position detector using the pair of Hall elements 373a and 373b is used to detect the relative position of the casing 1 and the main frame portion 100, but also can be used to detect the relative position of the main frame portion 100 and the auxiliary mass 300.

As described above, the vibration damping devices 900 and 901 according to Embodiment 1 has the auxiliary mass 300 provided on the main frame portion 100 via the cushioning member 350. The transmission force detecting portion 400 of the vibration damping device 900 detects the value of the transmission force $F_{1\_2}$ transmitted from the main frame portion 100 to the auxiliary mass 300. The transmission force detecting portion 400 outputs the value of the transmission force $F_{1\_2}$ to the amplifier 500. The amplifier 500 amplifies the value of the transmission force $F_{1\_2}$ and outputs the resulting value to the driver 510. The driver 510 drives the auxiliary mass driving portion 360 to apply the force obtained by amplifying the value of the transmission force $F_{1\_2}$ to the auxiliary mass 300. In this way, the vibration damping device 900 can provide a vibration damping effect with the small auxiliary mass 300 to the same degree as the large auxiliary mass 300.

Moreover, the transmission force detecting portion 401 of the vibration damping device 901 detects the value of the position $x_1$. The position $x_1$ is the relative position of the casing 1 and the main frame portion 100 in the direction of vibration. The transmission force $F_{1\_2}$ is obtained by multiplying the value of the position $x_1$ by the elastic coefficient $k_1$ of the cushioning member 350. The value of the transmission force $F_{1\_2}$ is amplified by the amplification coefficient α at the amplifier 500, and is outputted to the driver 510. The driver 510 drives the auxiliary mass driving portion 360 to apply the force $αF_{1\_2}$ to the auxiliary mass 300. Since the transmission force $F_{1\_2}$ is determined only by the value of the position x1, the calculation of the transmission force $F_{1\_2}$ can be easily performed. The position $x_1$ is the relative position of the casing 1 and the main frame portion 100 in the direction of vibration.

The relative position detector detects the relative position $x_1$ of the casing 1 and the main frame portion 100 in the direction of vibration. The relative position detector has the pair of Hall elements 373a and 373b parallely provided so as to face each other. The permanent magnet 372 is disposed between the Hall elements 373a and 373b. Therefore, the relative position detector does not have sensitivity with respect to the displacement in the focus direction component. Moreover, the relative position detector can detect a displacement signal in the radial direction component of the disc 129 by cancelling a signal in the tangential direction component of the disc 129.

In the auxiliary mass driving portion 360 shown in FIGS. 2 and 3, the wirings of the driving coils 362 are mounted to the driving coil holding member 363a as a stationary part, and therefore it becomes possible to prevent damage on coil wires due to repeated bending. Moreover, in the relative position detector shown in FIG. 11, the Hall element holding member that holds the Hall elements 373 is mounted to the casing 1 as a stationary part, and therefore it becomes possible to prevent damage on connection wires due to repeated bending.

As described above, the transmission force detecting portions 400 and 401 have high detection accuracy, and also have simple and compact structure. In the vibration damping devices 900 and 901, the auxiliary mass driving portion 360 drives the small and lightweight auxiliary mass 300 based on the detection signal detected by the transmission force detecting portion 400 and 401. Therefore, the vibration damping devices 900 and 901 are inexpensive, compact and lightweight, and can achieve high vibration damping performance.

Embodiment 2

The transmission force detecting portion 401 according to Embodiment 1 obtains the value of the transmission force $F_{1\_2}$ based on the value of the relative position $x_1$ of the casing 1 and the main frame portion 100. The transmission force detecting portion 402 according to Embodiment 2 estimates the value of the transmission force $F_{1\_2}$ based on two signals: the value of the relative position ($x_2-x_1$) of the auxiliary mass 300 and the main frame portion 100, and the driving signal of the auxiliary mass driving portion 360.

Figure 14:
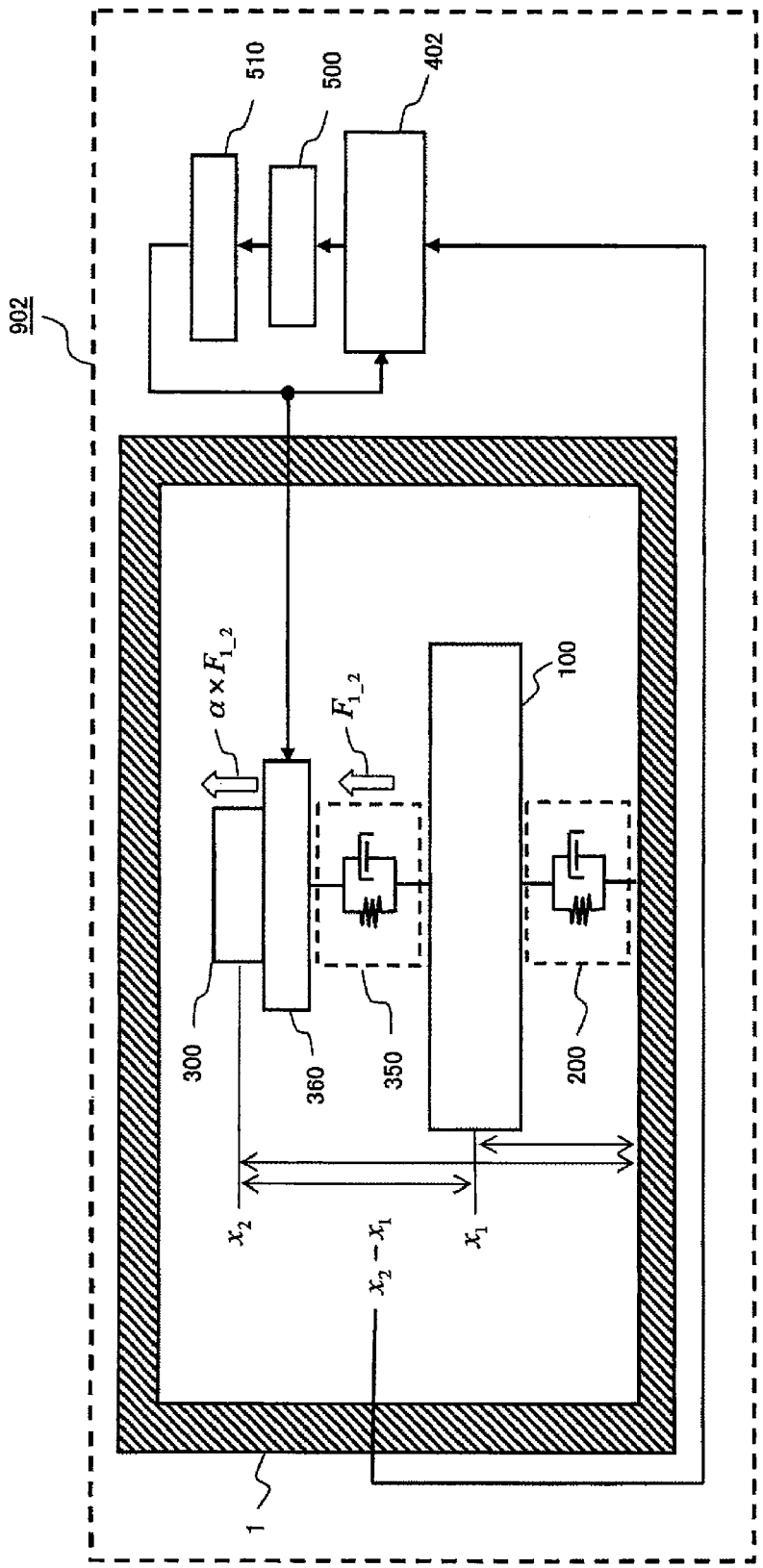
FIG. 14 is a model diagram showing a vibration damping device according to Embodiment 2 of the present invention.

FIG. 14 is a model diagram showing a vibration damping device 902 using the auxiliary mass 300 that actively operates. In FIG. 14, elements which are the same as those of the vibration damping devices 900 and 901 described with reference to FIGS. 1 and 8 are assigned the same reference numerals, and description thereof will be omitted.

The position $x_1$ is the relative position of the casing 1 and the main frame portion 100. The position $x_2$ is the relative position of the casing 1 and the auxiliary mass 300. The transmission force $F_{1\_2}$ is the force transmitted from the main frame 100 to the auxiliary mass 300. $\alpha \times F_{1\_2}$ is the force generated by the auxiliary mass driving portion 360 to the auxiliary mass 100. $\alpha$ is the amplification coefficient. The position ($x_2-x_1$) is the relative position of the main frame portion 100 and the auxiliary mass 300 in the direction of vibration. Unlike Embodiment 1, input signals to the transmission force detecting portion 402 are two signals: the signal representing the relative position of the main frame portion 100 and the auxiliary mass 300, and the driving signal of the auxiliary mass driving portion 360.

Figure 15:
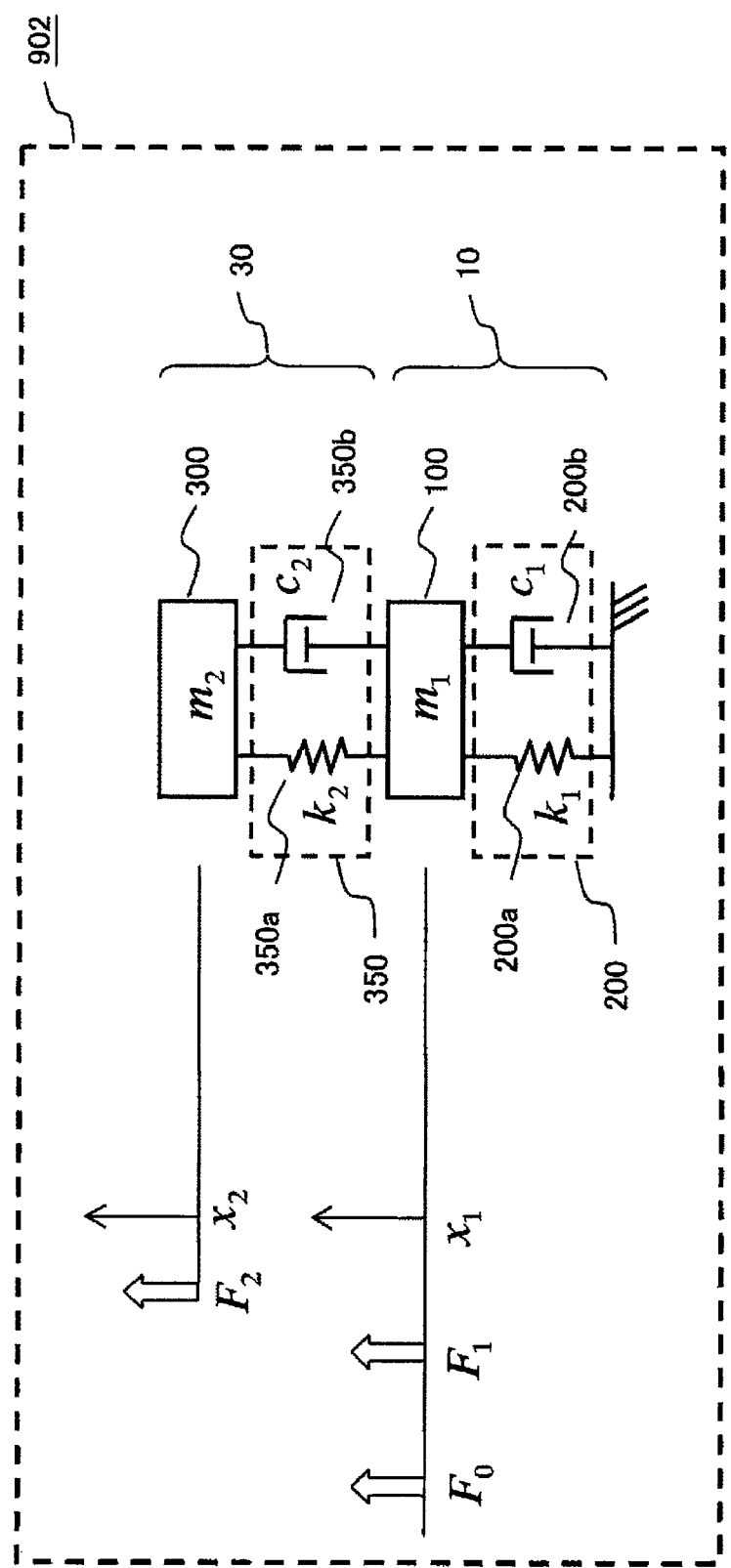
FIG. 15 is a diagram showing a mass point model of the vibration damping device according to Embodiment 2 of the present invention.

The transmission force detecting portion 402, which is a feature of Embodiment 2, will be described below. FIG. 15 is a diagram converting FIG. 14 as mass point model. An auxiliary mass resonance system 30 is constituted by the auxiliary mass 300 and the cushioning member 350. A main frame portion resonance system 10 is constituted by the main frame portion 100 and the cushioning support member 200. In FIG. 15, elements which are the same as those of the vibration damping device 910 described with reference to FIG. 42 are assigned the same reference numerals, and description thereof will be omitted.

The force $F_0$ [N] is the force caused by disturbance applied to the main frame portion 100 due to external vibration. The force $F_1$ [N] is the force caused by disturbance due to the rotation of the disc having mass eccentricity. The force $F_2$ [N] is the force generated by the auxiliary mass driving portion 360. The force $F_2$ is defined as a correction amount generated by the auxiliary mass driving portion 360. Because of this, the value of the force $F_2$ corresponds to an output value of the function block 501 that amplifies the value of the detected transmission force $F_{1\_2}$ in FIG. 49, and is defined by the following equation (19).

$$F_2 = \alpha \times F_{1\_2} \tag{19}$$

Figure 16:
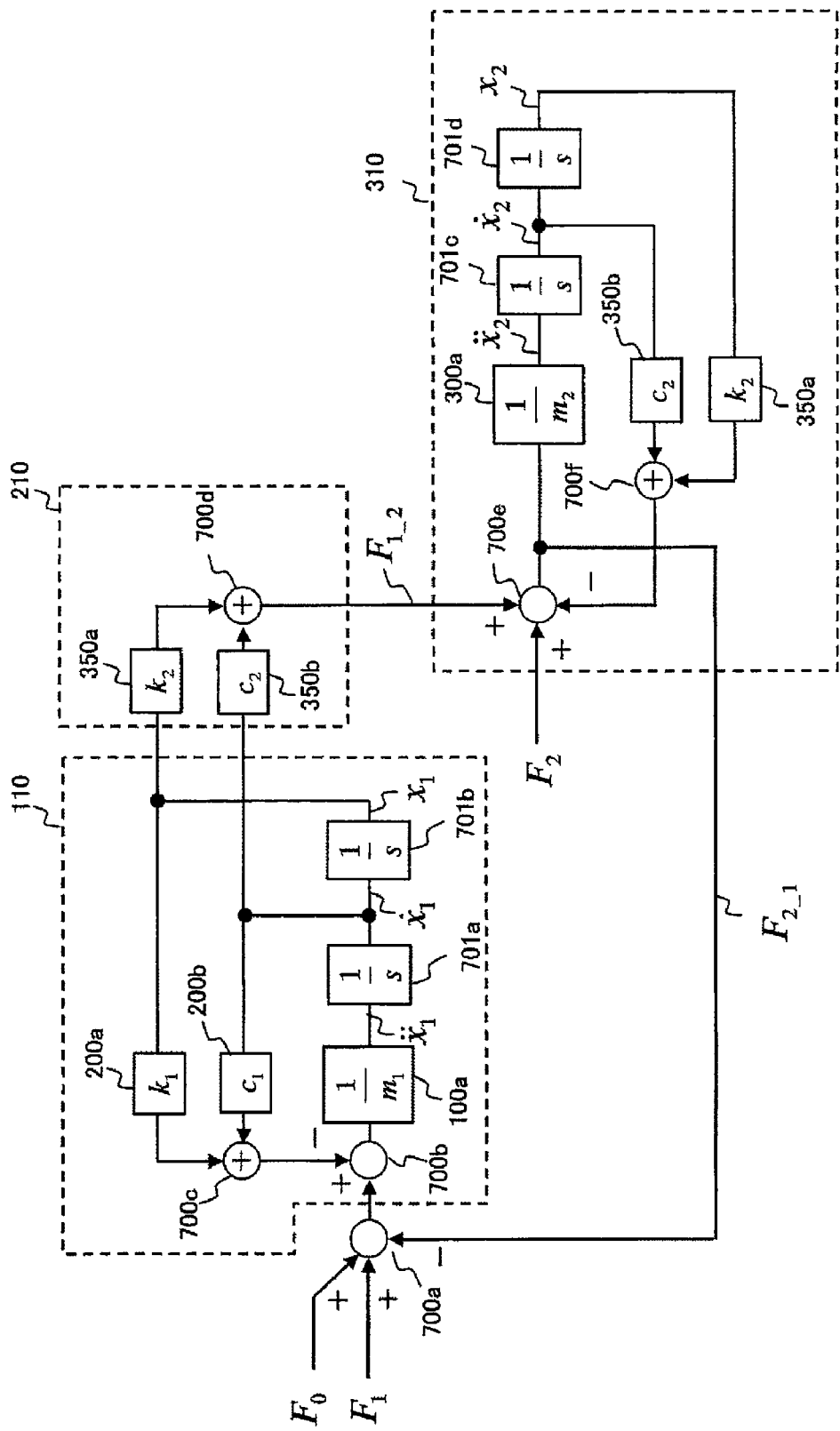
FIG. 16 is a block diagram showing the vibration damping device according to Embodiment 2 of the present invention.

FIG. 15 is expressed as a block diagram as shown in FIG. 16. In FIG. 16, elements which are the same as those described with reference to FIG. 43 are assigned the same reference numerals, and description thereof will be omitted. FIG. 16 is different from FIG. 43 in that the value of the force $F_2$ is added to the adder-subtractor 700e as an input value to the function block 310. The force $F_2$ is the force applied so as to cause the auxiliary mass 300 to actively perform correction operation. Moreover, the function block 310 is the transmission characteristic model of the resonance system of the auxiliary mass 300.

Figure 17:
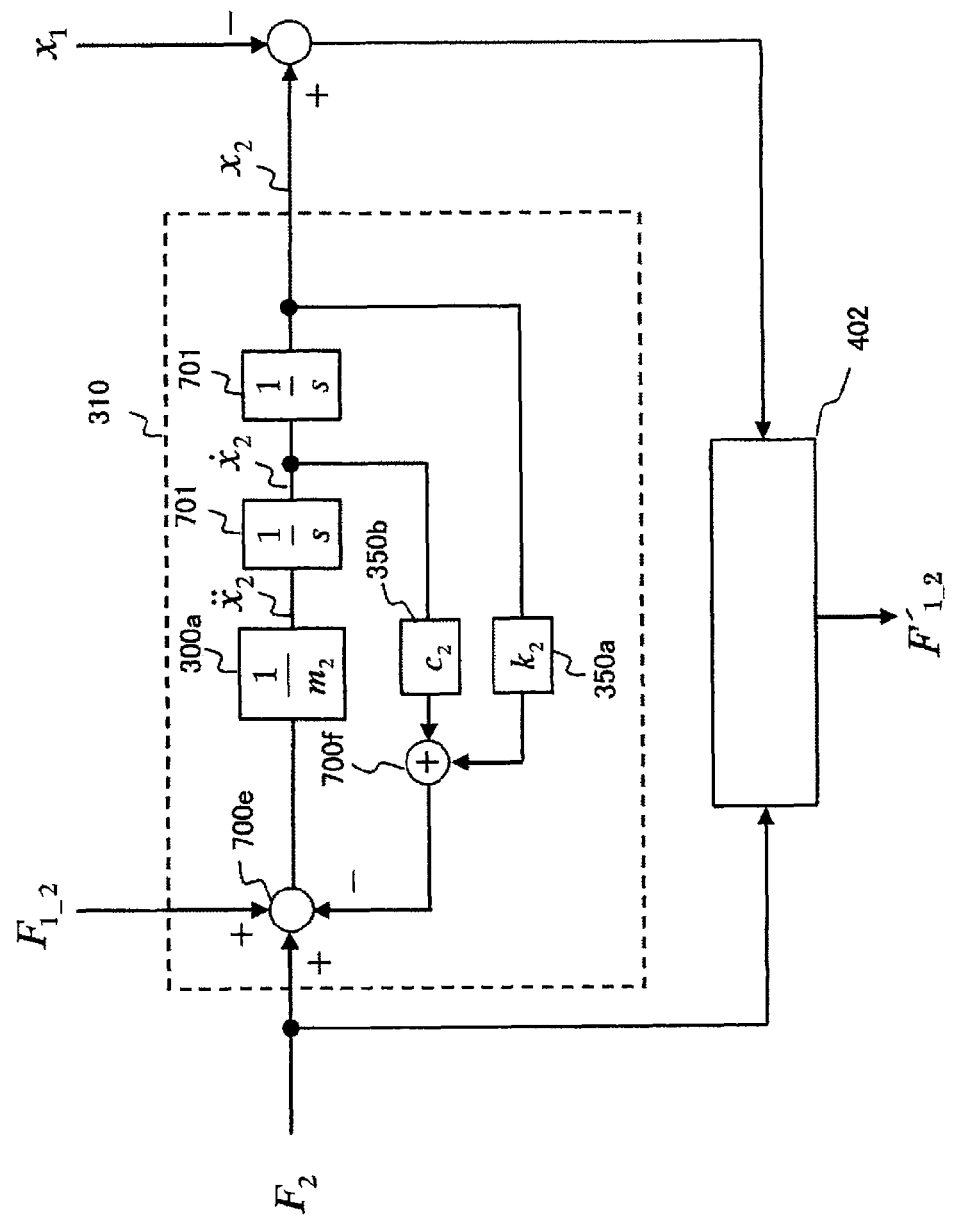
FIG. 17 is a block diagram showing a disturbance estimator of the vibration damping device according to Embodiment 2 of the present invention.

FIG. 17 is a block diagram extracting the function block 310 from FIG. 16, and virtually grounding the main frame portion 100. In FIG. 17, the transmission force detecting portion 402 is a disturbance estimator. The function block 310 is the transmission characteristic model of the resonance system of the auxiliary mass 300.

In FIG. 17, the transmission force detecting portion 402 is the disturbance estimator. The disturbance estimator is inputted with the value of the transmission force $F_2$ and the value of the position ($x_2-x_1$), and outputs an estimate value $F'_{1\_2}$ of the transmission force $F_{1\_2}$. In this regard, $F_2$ is the correction amount generated by the auxiliary mass driving portion 360. The function block 310 is the transmission characteristic model of the resonance system of the auxiliary mass 300. The position ($x_2-x_1$) is the relative position of the main frame portion 100 and the auxiliary mass 300 in the direction of vibration, which is the output value of the function block 310.

As seen from the function block 310, a control signal outputted by the driver 510 is defined as the force $F_2$, and the transmission force $F_{1\_2}$ is defined as disturbance. In this regard, the function block 310 is the transmission characteristic model of the resonance system of the auxiliary mass 300. The force $F_2$ is defined as the correction amount generated by the auxiliary mass driving portion 360. The transmission force $F_{1\_2}$ is the force transmitted from the main frame portion 100 to the auxiliary mass 300 via the cushioning member 350.

As shown in FIG. 17, the function block 310 is a general resonance system of single degree of freedom. When the resonance system of single degree of freedom is a controlled object, the value of the transmission force $F_{1\_2}$ is estimated by calculating the control signal to be supplied to the controlled object and the position signal which is a status quantity of the controlled object. The transmission force $F_{1\_2}$ is the disturbance applied to the controlled object. This mechanism is generally referred to as a disturbance estimator. The function block 310 is the transmission characteristic model of the resonance system of the auxiliary mass 300.

In Embodiment 2, two control signals exist. One of the control signals is the value of the force $F_2$ as the correction amount generated by the auxiliary mass driving portion 360. Another of the control signals is the value of $(x_2-x_1)$ of the auxiliary mass 300 and the main frame portion 100 in the direction of vibration. The transmission force detecting portion estimates the disturbance based on these two control signals. The disturbance is the transmission force $F_{1\_2}$. The transmission force detecting portion 402 as the disturbance estimator estimates the value of the transmission force $F_{1\_2}$ and outputs the value. By defining the value of the transmission force $F_{1\_2}$ outputted as the estimate value $F'_{1\_2}$ as a detected value, the transmission force detecting portion 402 can provide a function to detect the value of the transmission force $F_{1\_2}$.

The disturbance estimator is of a general concept, and therefore description thereof will be herein omitted. There are two types of the disturbance estimators: a full-order type and a minimum-order type. Either of the two types can be selected. Here, the minimum-order type is selected, which has a light calculation load.

Figure 18:
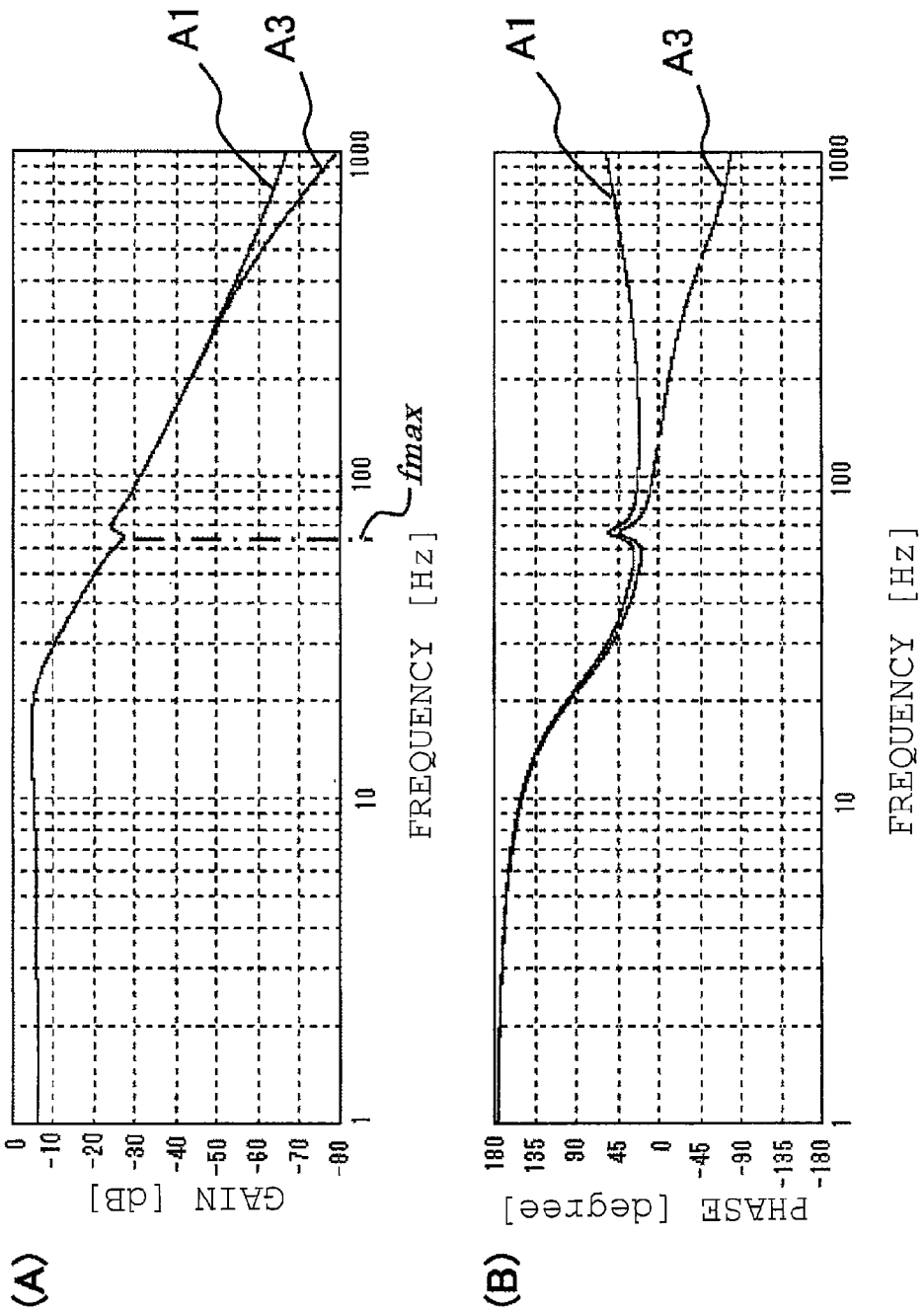
FIG. 18 shows characteristic diagrams illustrating detection characteristics of a transmission force transmitted to an auxiliary mass in response to a disturbance to the vibration damping device according to Embodiment 2 of the present invention.

FIG. 18 shows detection characteristics of the value of the transmission force $F_{1\_2}$ with respect to the force $F_1$ [N]. In FIG. 18(A), a horizontal axis represents the frequency [Hz], and a vertical axis represents the gain [dB]. In FIG. 18(B), a horizontal axis represents the frequency [Hz], and a vertical axis represents the phase [degree]. In FIG. 18, a curve A1 shows detection characteristics of the value of the transmission force $F_{1\_2}$ under the ideal condition. A curve A3 is shows detection characteristics of the value of the transmission force $F_{1\_2}$ based on the estimate value of the disturbance estimator. The force $F_1$ [N] is disturbance input. Here, the transmission force detecting portion 402 is implemented by the minimum-type disturbance estimator. A pole location of the minimum-type disturbance estimator is a second-order Butterworth pole location with a frequency band of 1 kHz. In FIG. 18, two case examples are plotted. One of the case examples is detection characteristics under the ideal condition where the transmission force detecting portion 402 is assumed to be able to precisely perform detection with no error throughout an entire frequency band. The other of the case example is detection characteristics of the value of the transmission force $F_{1\_2}$ according to Embodiment 2.

The characteristics under the ideal condition and the detection characteristics of Embodiment 2 are compared. The characteristics under the ideal condition has a slight phase lead with respect to the detection characteristics of Embodiment 2 at a high frequency band higher than or equal to 100 Hz. However, it is found that the characteristics under the ideal condition and the detection characteristics of Embodiment 2 are almost the same at a frequency band lower than or equal to the maximum disc rotation frequency $f_{max}$ [Hz]. The frequency band lower than or equal to the maximum disc rotation frequency $f_{max}$ [Hz] is a frequency band where control is intended to be made.

Figure 19:
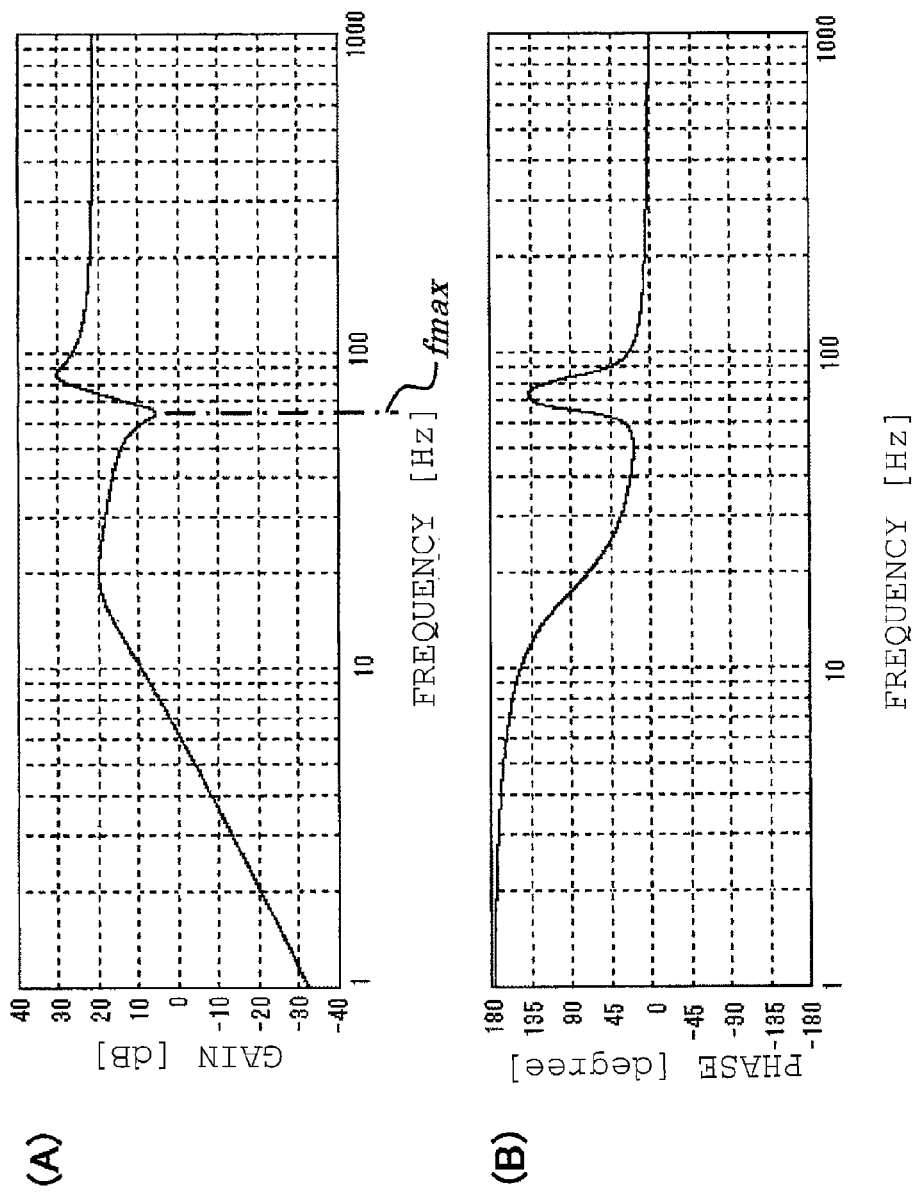
FIG. 19 shows characteristic diagrams illustrating frequency characteristics of an acceleration of the main frame portion in response to a disturbance to the vibration damping device according to Embodiment 2 of the present invention.

FIG. 19 shows analysis result of the frequency characteristics of the acceleration of the main frame portion 100 with respect to the force $F_1$ [N]. In FIG. 19(A), a horizontal axis represents the frequency [Hz], and a vertical axis represents the gain [dB]. In FIG. 19(B), a horizontal axis represents the frequency [Hz], and a vertical axis represents the phase [degree]. The detection characteristics of the transmission force detecting portion 402 is according to Embodiment 2 shown in FIG. 18, and the value of the amplification coefficient α of the amplifier 500 is set to 9. The fourth F1 [N] is disturbance input.

The characteristics of FIG. 19 is equal to the characteristics of FIG. 47 (the characteristics with the resonance system of the auxiliary mass) which is the characteristics with only the auxiliary mass 300, none the less because the auxiliary mass 300 of FIG. 19 is as small as one-tenth (5 [g]) of the conventional auxiliary mass 300. In this regard, the characteristics of FIG. 47 (the characteristics with the resonance system of the auxiliary mass) is the characteristics when only the conventional auxiliary mass 300 is provided. Particularly, the gain at the maximum disc rotation frequency $f_{max}$ [Hz] is almost the same as that of the above described FIG. 47. In other words, the vibration damping device 902 can provide a great vibration damping effect with the smaller and lightweight auxiliary mass 300. The maximum disc rotation frequency $f_{max}$ [Hz] is the frequency at which disturbance acceleration due to the mass eccentricity of the disc is the maximum.

Figure 20:
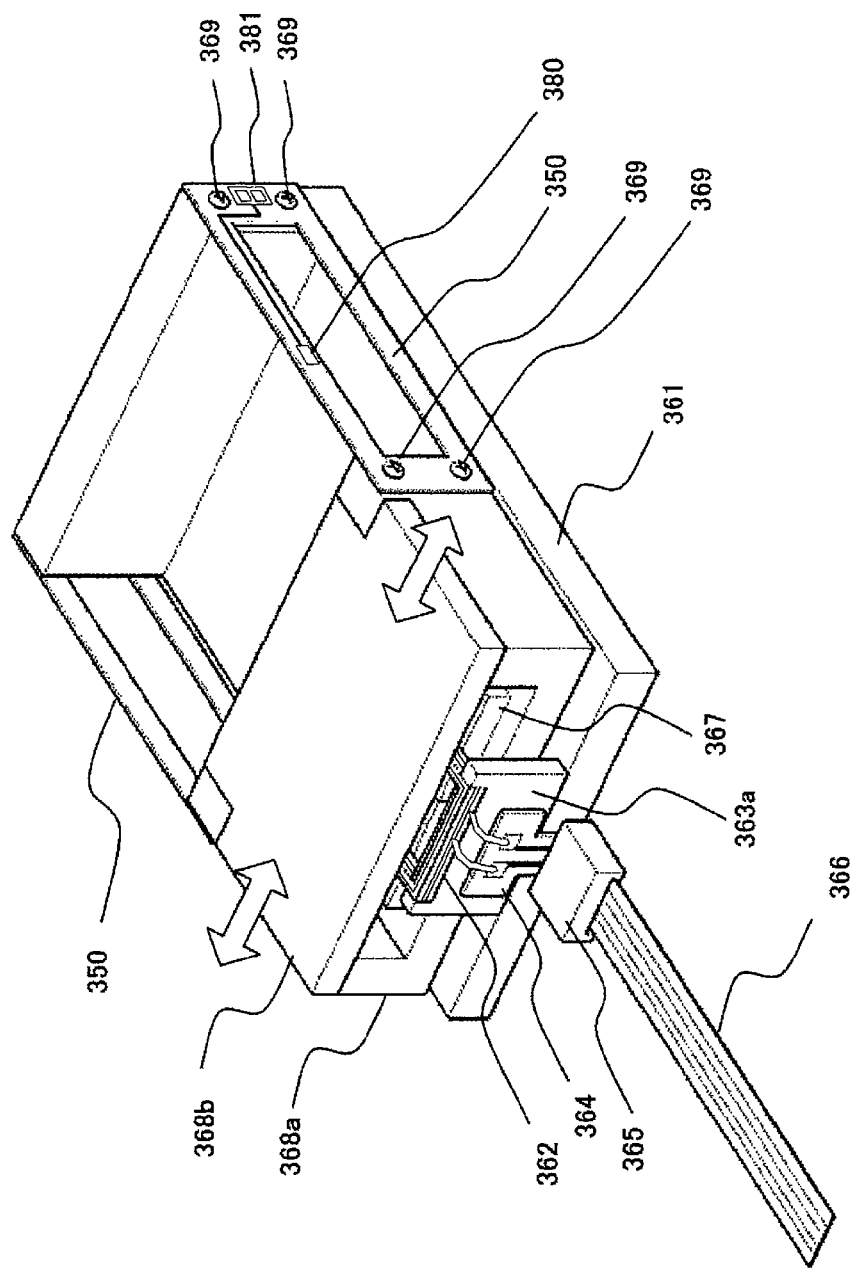
FIG. 20 is a perspective view showing a relative position detector for detecting a relative position between the auxiliary mass and the main frame portion of the vibration damping device according to Embodiment 2 of the present invention.

FIG. 20 is a perspective view of the relative position detector that detects a relative position signal of the transmission force detecting portion 402 according to Embodiment 2. The relative position detector has a function to detect the value of the relative position $(x_2-x_1)$ of the auxiliary mass 300 and the main frame portion 100. In a configuration shown in FIG. 20, a function to detect the value of the relative position $(x_2-x_1)$ of the auxiliary mass 300 and the main frame portion 100 is added to the configuration of FIG. 2.

In FIG. 20, the relative position detector has a plate spring (the cushioning member 350) to which a strain gauge 380 is bonded. The strain gauge 380 detects a strain of the plate spring (the cushioning member 350) in a bending direction component. In this regard, the relative position detector detects the value of the relative position $(x_2-x_1)$ in the direction of vibration. The value of the relative position $(x_2-x_1)$ of the auxiliary mass 300 and the main frame portion 100 is proportional to a deflection amount of the cushioning member 350 constituted by the plate spring. The strain gauge 380 bonded to the plate spring (the cushioning member 350) can detect the deflection amount of the plate spring (the cushioning member 350). An amount of strain due to the deflection can be detected as a change in resistance value of the strain gauge 380. Although the change in resistance value is small, detection can be performed using a bridge circuit or the like. A terminal of the strain gauge 380 is connected to a wiring terminal 381.

With the above described configuration, the relative position detector having high detection accuracy can be implemented in small size and at low cost. The relative position detector detects the value of the relative position $(x_2-x_1)$ of the auxiliary mass 300 and the main frame portion 100.

In this regard, the relative position detector can be implemented using an actuator of a piezoelectrically-driven type using a bimorph as shown in FIG. 7. That is, the relative position detector using the bimorph can provide the same function as the configuration having the strain gauge to detect the relative position $(x_2-x_1)$ of the auxiliary mass 300 and the main frame portion 100. Further, the actuator having the configuration of FIG. 7 can be configured as an integrated body that provides both of a driving function and a position detecting function, by providing a region where a part of the bimorph is used as an angular sensor. Reference is made to, for example, an actuator disclosed in Japanese Laid-open Patent Publication No. 2001-156352 (Pages 3-4 and FIG. 1).

As described above, the transmission force detecting portion 402 has a simple and compact structure, and also has high detection accuracy. The vibration damping device 902 is configured so that the auxiliary mass driving portion 360 drives the small and lightweight auxiliary mass 300 based on the detection signal detected by the transmission force detecting portion 402. Therefore, the vibration damping device 902 is inexpensive, compact and lightweight, and can achieve high damping performance.

Embodiment 3

Figure 21:
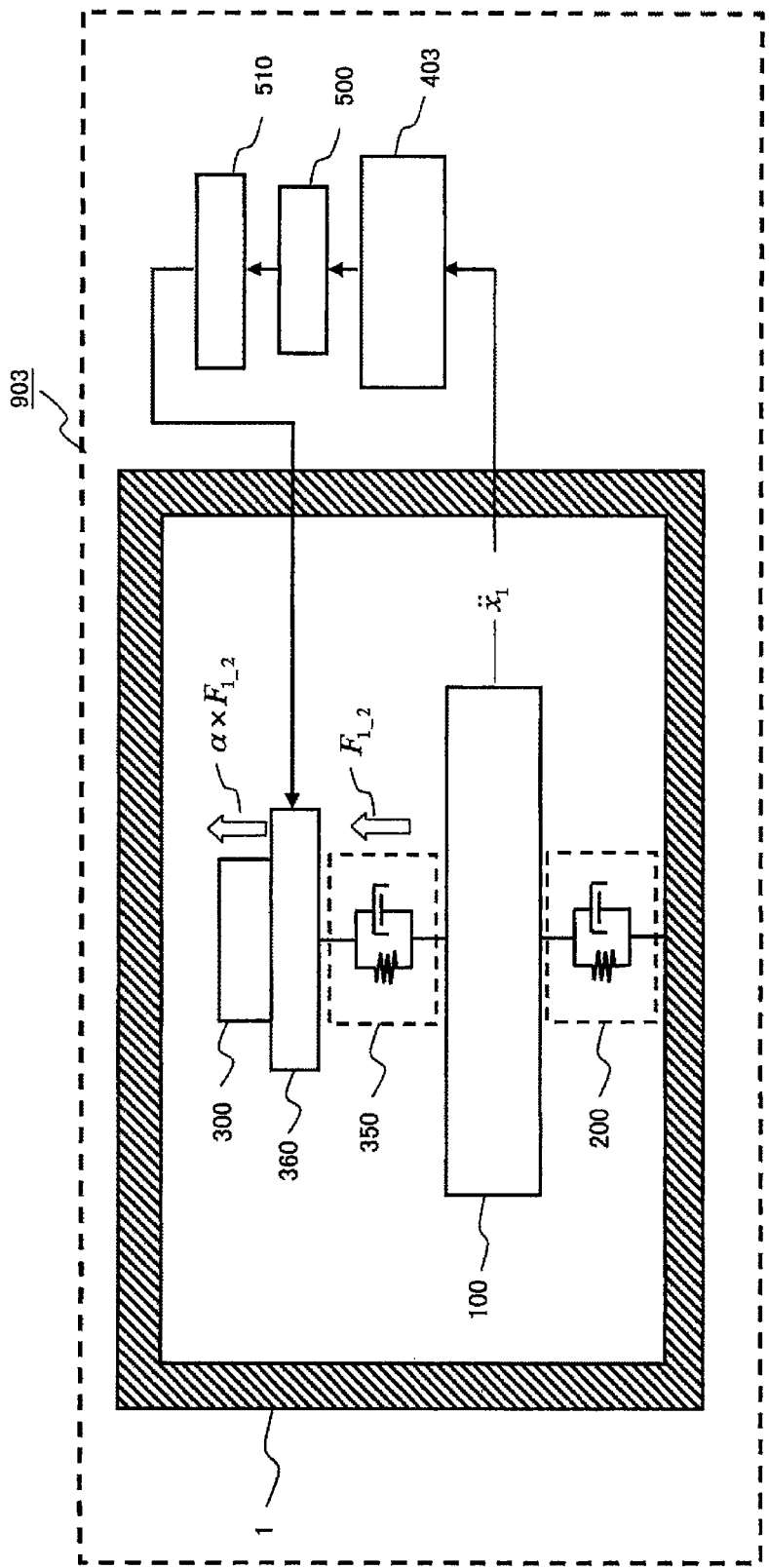
FIG. 21 is a model diagram showing a vibration damping device according to Embodiment 3 of the present invention.

A transmission force detecting portion 403 according to Embodiment 3 is configured to estimate the value of the transmission force $F_{1\_2}$ based on information of acceleration of the main frame portion 100. FIG. 21 is a model diagram of a vibration damping device 903 using the auxiliary mass 300 that actively operates according to Embodiment 3. In FIG. 21, an input signal to the transmission force detecting portion 403 is the acceleration signal of the main frame portion 100. Elements which are the same as those of the vibration damping device 900, 901 and 902 described with reference to FIGS. 1, 8 and 14 are assigned the same reference numerals, and description thereof will be omitted. The transmission force $F_{1\_2}$ is the force transmitted from the main frame portion 100 to the auxiliary mass 300. $\alpha \times F_{1\_2}$ is the force generated by the auxiliary mass driving portion 360 to the auxiliary mass 100. $\alpha$ is the amplification coefficient.

The acceleration of the main frame portion 100 is expressed by the equation (2).

$$\ddot{x}_1 \tag{20}$$

Figure 22:
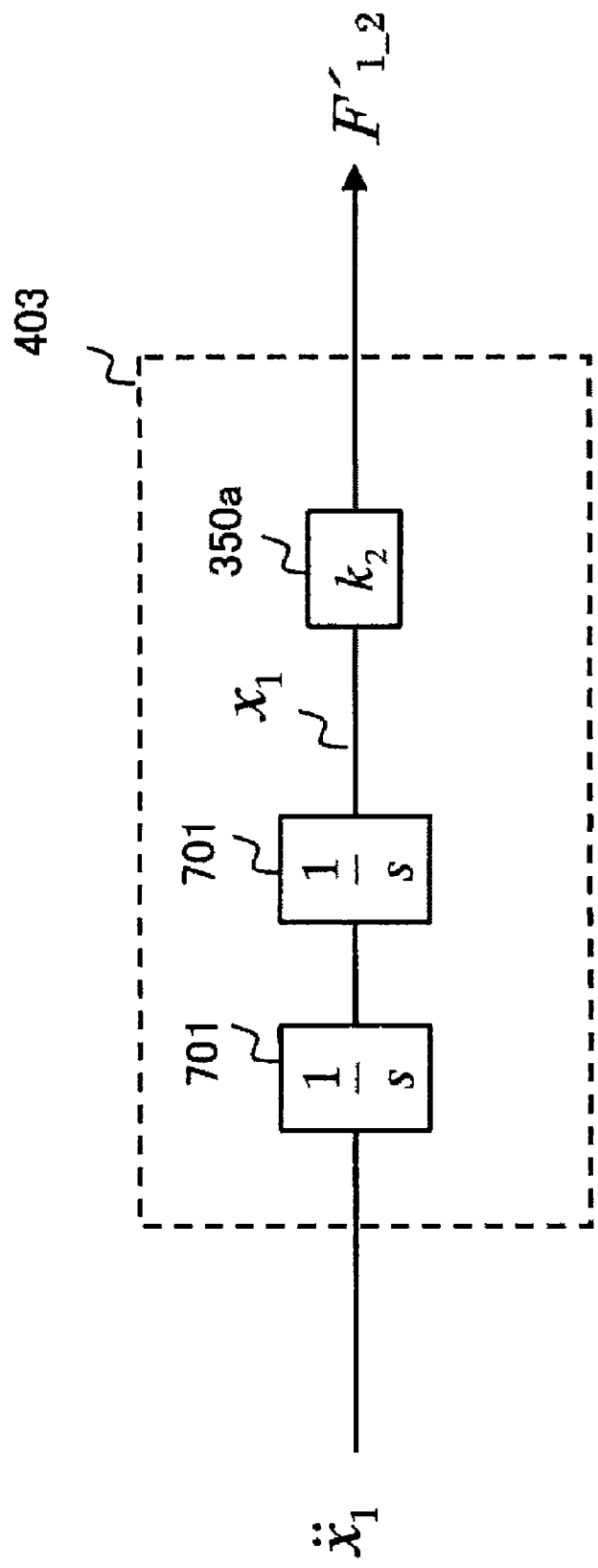
FIG. 22 is a block diagram showing a transmission force detecting portion of the vibration damping device according to Embodiment 3 of the present invention.

The transmission force detecting portion 403, which is a feature of the vibration damping device 903 according to Embodiment 3, will be described below. FIG. 22 is a diagram converting the transmission force detecting portion 403 into a block diagram. In FIG. 22, the transmission force detecting portion 403 is inputted with a value of the acceleration of the main frame portion 100, and integrates the value twice so as to obtains the value of the position $x_1$. The transmission force detecting portion 403 multiplies the value of the position $x_1$ by $k_2$, and outputs the value of the transmission force $F_{1\_2}$. The function block 350a represents the elastic coefficient $k_2$ of the cushioning member 350.

That is, when the acceleration signal of the main frame portion 100 as the input value is integrated, the speed is obtained. When the speed is integrated, the value of the position is obtained. Therefore, the signal that has passed through an integrator 701 twice corresponds to the value of the position $x_1$ of the main frame portion 100.

When the value of the position $x_1$ of the main frame portion 100 with reference to the casing 1 is detected, the system described in Embodiment 1 can be applied. That is, by causing the signal representing the value of the position $x_1$ to pass through the function block 350a, the value of the transmission force $F_{1\_2}$ can be obtained as the detected value. The function block 350a represents the elastic coefficient $k_2$ of the cushioning member 350. The transmission force $F_{1\_2}$ is an amount of the value of the position $x_1$ with reference to the casing 1 multiplied by $k_2$ as shown in the equation (18).

In this regard, the value of the position $x_1$ is the output value of the integrator 701. However, since an initial value of the integrator 701 is indeterminate, a value of an absolute position is also indeterminate. Therefore, although not shown in the figure, in the transmission force detecting portion 403, a function to remove direct-current component is provided in a signal path, and the estimate value of the transmission force $F_{1\_2}$ from which the direct-current component is removed is used. The transmission force detecting portion 403 does not necessarily have two integrators, and can obtain the same function by using a second-order integration means having a limited direct-current component.

Figure 23:
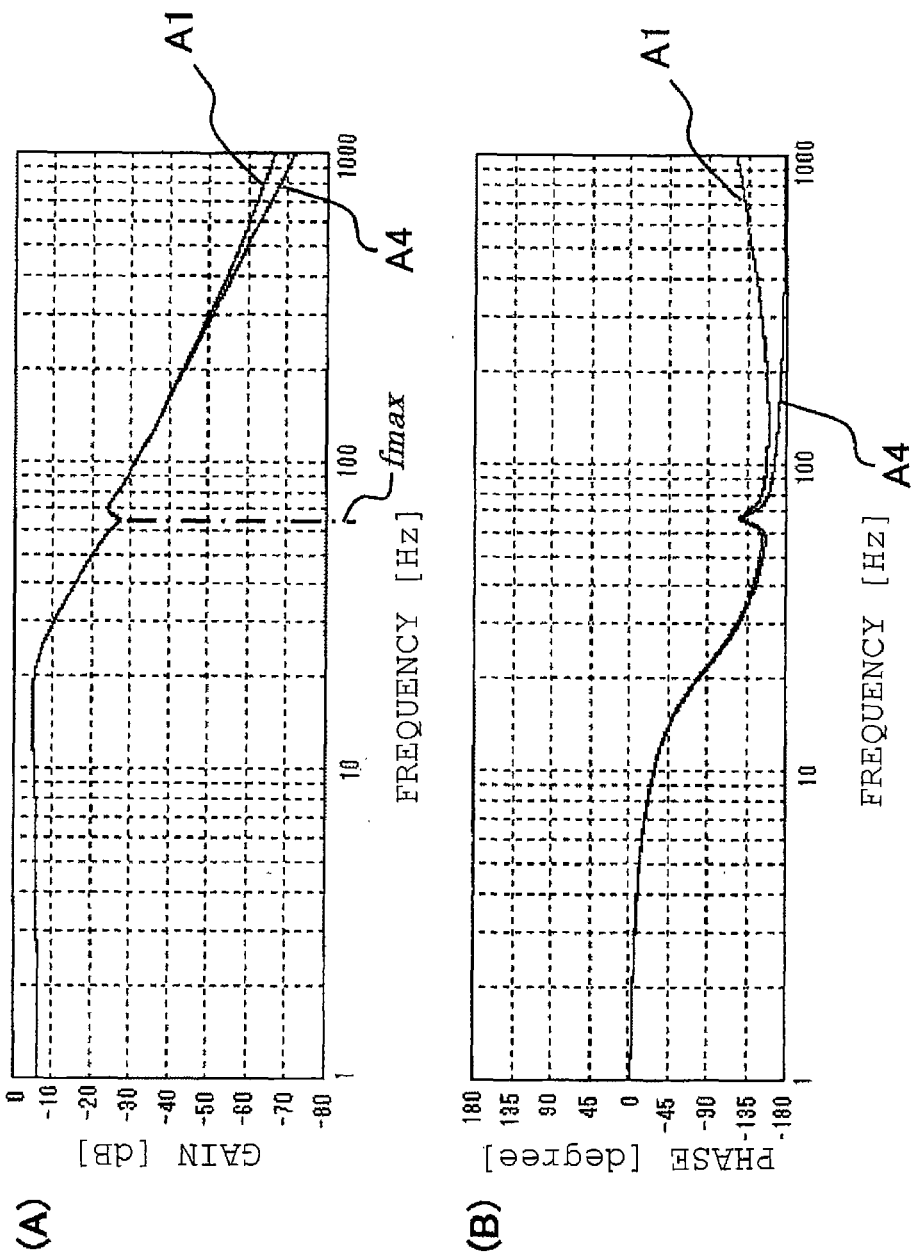
FIG. 23 shows characteristic diagrams illustrating detection characteristics of a transmission force transmitted to an auxiliary mass in response to a disturbance to the vibration damping device according to Embodiment 3 of the present invention.

FIG. 23 shows diagrams illustrating detection characteristics of the transmission force $F_{1\_2}$ with respect to the force $F_1$ [N], when the transmission force detecting portion 403 is implemented by the function blocks shown in FIG. 22. In FIG. 23(A), a horizontal axis indicates the frequency [Hz], and a vertical axis indicates the gain [dB]. In FIG. 23(B), a horizontal axis indicates the frequency [Hz], and a vertical axis indicates the phase [degree]. In FIG. 23, a curve A1 shows detection characteristics of the value of the transmission force $F_{1\_2}$ under an ideal condition. A curve A4 shows detection characteristics of the value of the transmission force $F_{1\_2}$ based on the acceleration information. The force $F_1$ [N] is disturbance input. In FIG. 23, two case examples are plotted. One of the case examples is detection characteristics under the ideal condition where the transmission force detecting portion 403 is assumed to be able to precisely perform detection with no error throughout an entire frequency band. The other of the case examples is detection characteristics of the value of the transmission force $F_{1\_2}$ according to Embodiment 3. It is understood that the characteristics of FIG. 23 is equal to that shown in FIG. 9 of Embodiment 1.

Figure 24:
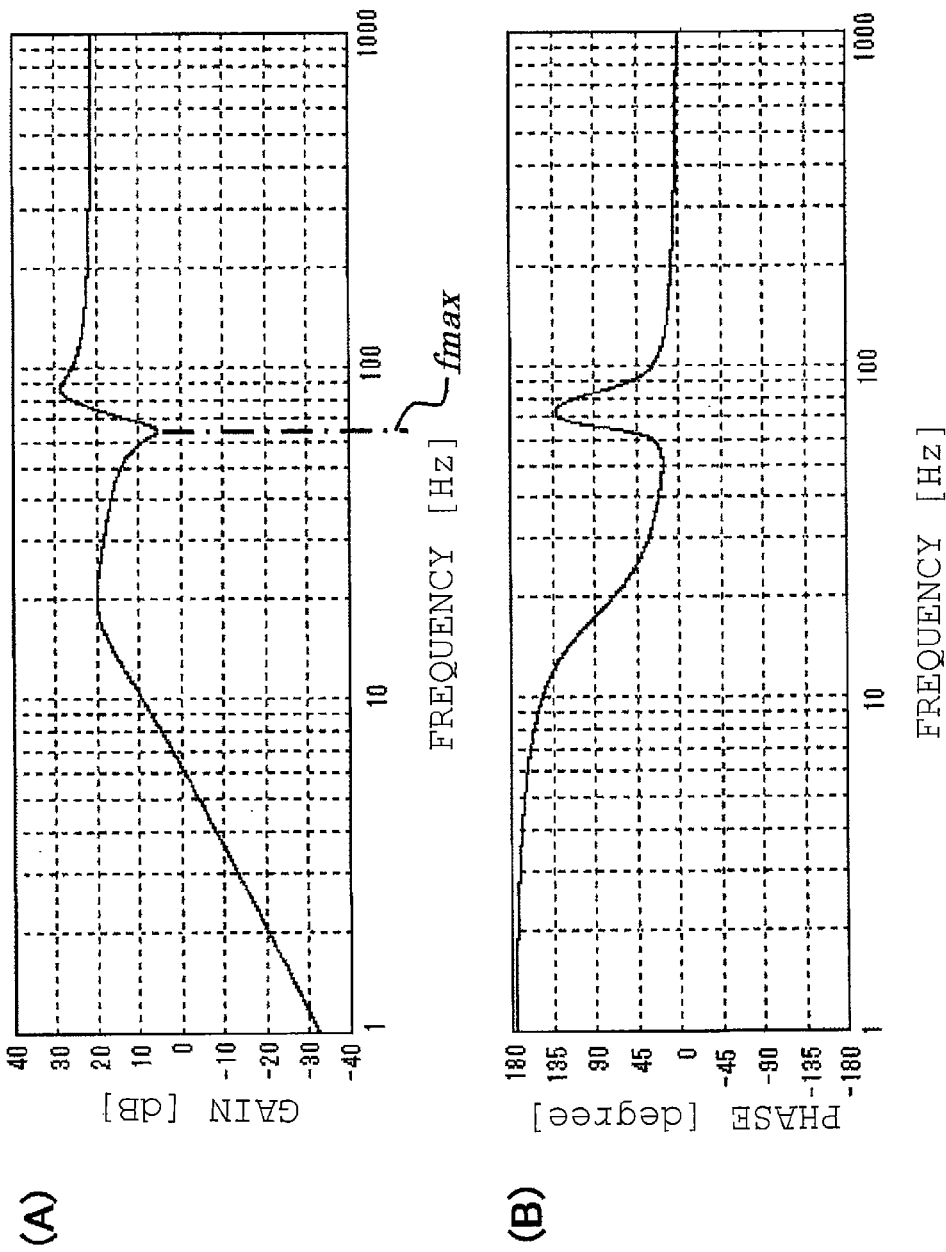
FIG. 24 shows characteristic diagrams illustrating frequency characteristics of an acceleration of a main frame portion in response to a disturbance to the vibration damping device according to Embodiment 3 of the present invention.

FIG. 24 shows diagrams illustrating analysis result of the frequency characteristics of the acceleration of the main frame portion 100 with respect to the force $F_1$ [N]. In FIG. 24(A), a horizontal axis indicates the frequency [Hz], and a vertical axis indicates the gain [dB]. In FIG. 24(B), a horizontal axis indicates the frequency [Hz], and a vertical axis indicates the phase [degree]. The detection characteristics of the transmission force detecting portion 403 is according to Embodiment 3 shown in FIG. 23, and the value of the amplification coefficient $\alpha$ of the amplifier 500 is set to 9. The fourth F1 [N] is disturbance input. This is equal to the characteristics of FIG. 10 described in Embodiment 1, and it is understood that the vibration damping device 903 effectively functions. Therefore, detailed functions and effects are the same as those of FIG. 10 described in Embodiment 1.

In this regard, a means to detect the acceleration of the main frame 100 according to Embodiment can be implemented by an acceleration sensor which is generally put to practice use.

As described above, the transmission force detection portion 403 has a simple and compact structure, and also has high detection accuracy. The vibration damping device 903 is configured so that the auxiliary mass driving portion 360 drives the small and lightweight auxiliary mass 300 based on the detection signal detected by the transmission force detecting portion 403. Therefore, the vibration damping device 903 is inexpensive, compact and lightweight, and can achieve high vibration damping performance.

Embodiment 4

Figure 25:
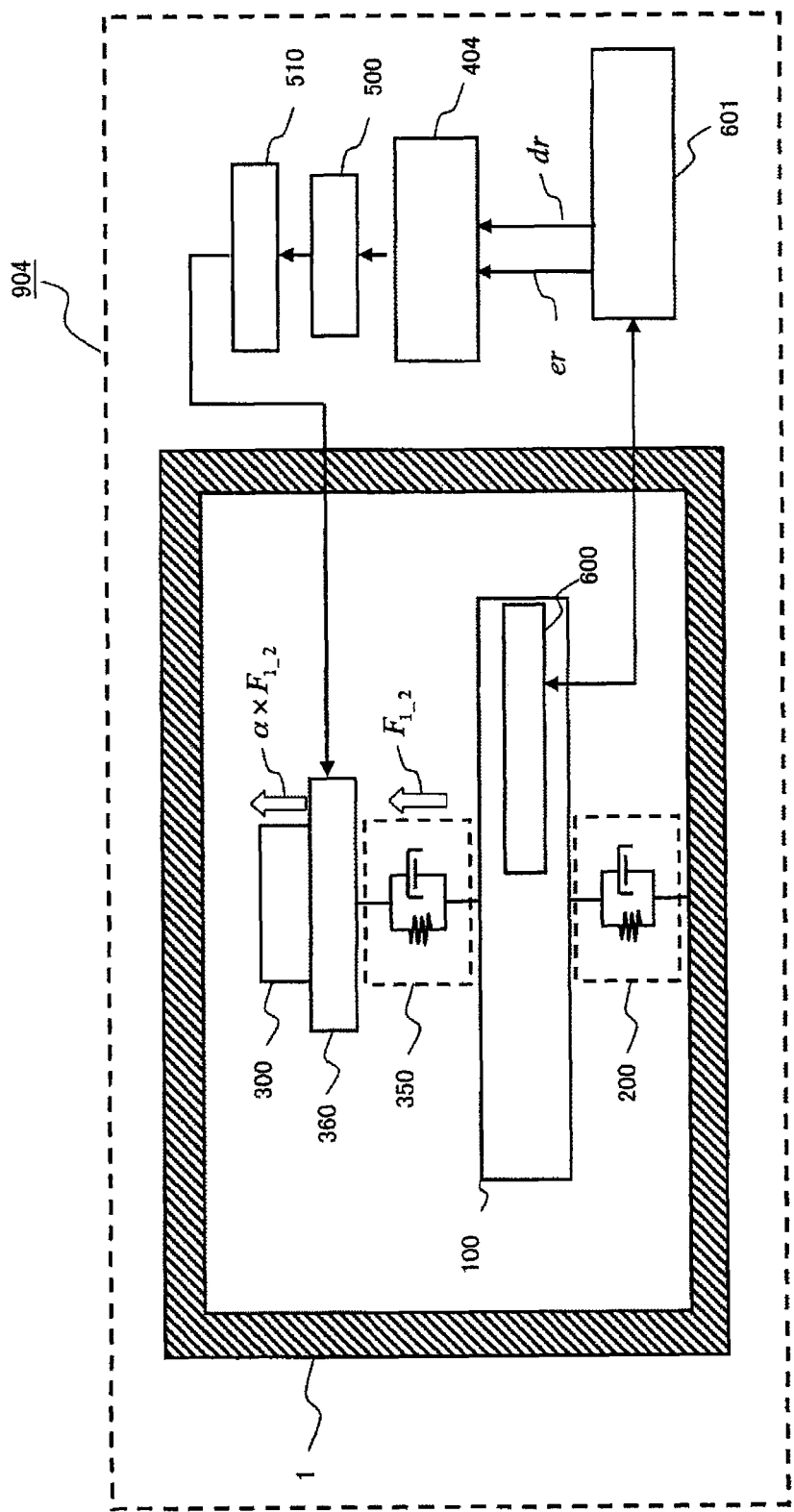
FIG. 25 is a model diagram showing a vibration damping device according to Embodiment 4 of the present invention.

A transmission force detecting portion 404 according to Embodiment 4 is constituted by a means to estimate disturbance using the information pickup 600 and a position follow-up controller 601. The information pickup 600 is a part of the main frame portion 100. The position follow-up controller 601 functions as a follow-up controller of the information pickup 600. FIG. 25 is a model diagram of the vibration damping device 904 using the auxiliary mass 300 that actively operates according to Embodiment 4. In FIG. 25, elements which are the same as those of the vibration damping device 900 described with reference to FIG. 1 are assigned the same reference numerals, and descriptions thereof will be omitted.

In the case of an optical disc device, the information pickup 600 has a function to perform focusing operation and tracking operation of an objective lens with respect to an information track formed on an information recording surface of an optical disc. The position follow-up controller 601 of the information pickup 600 performs a position follow-up control for moving a position of the information pickup 600 to follow a position of the information track of the rotating optical disc.

The above described information pickup 600 can detect a value of a force caused by disturbance applied to the information pickup 600, without using a special sensor. For example, a disturbance estimator described in Japanese Patent Publication No. 3949609 (Pages 3-11 and FIGS. 1-5) estimates the value of the force caused by disturbance applied to the information pickup 600 based on two signals er and dr, and does not use a special sensor. The signal er is a deviation signal of the position follow-up controller 601. The signal dr is a driving signal of the position follow-up controller of the information pickup 600. The transmission force $F_{1\_2}$ is the force transmitted from the main frame portion 100 to the auxiliary mass 300. $\alpha \times F_{1\_2}$ is the force generated by the auxiliary mass driving portion 360 to the auxiliary mass 100. $\alpha$ is an amplification coefficient.

The disturbance estimator without using a special sensor is constituted by the disturbance estimator having an internal model of the dynamic characteristics of the information pickup 600. An estimate value of the disturbance estimator without using a special sensor is a signal proportional to the acceleration of the main frame portion 100 described in Embodiment 3. This is because the force applied to the information pickup 600 is the force caused by disturbance applied to the main frame portion 100. Therefore, as in Embodiment 3, the transmission force detecting portion 404 can obtain the estimate value of the transmission force $F_{1\_2}$ by second-order integration of the estimate value of the force caused by the disturbance estimated by the disturbance estimator without using a special sensor. A means to perform the second-order integration is the same as that of Embodiment 3.

Figure 26:
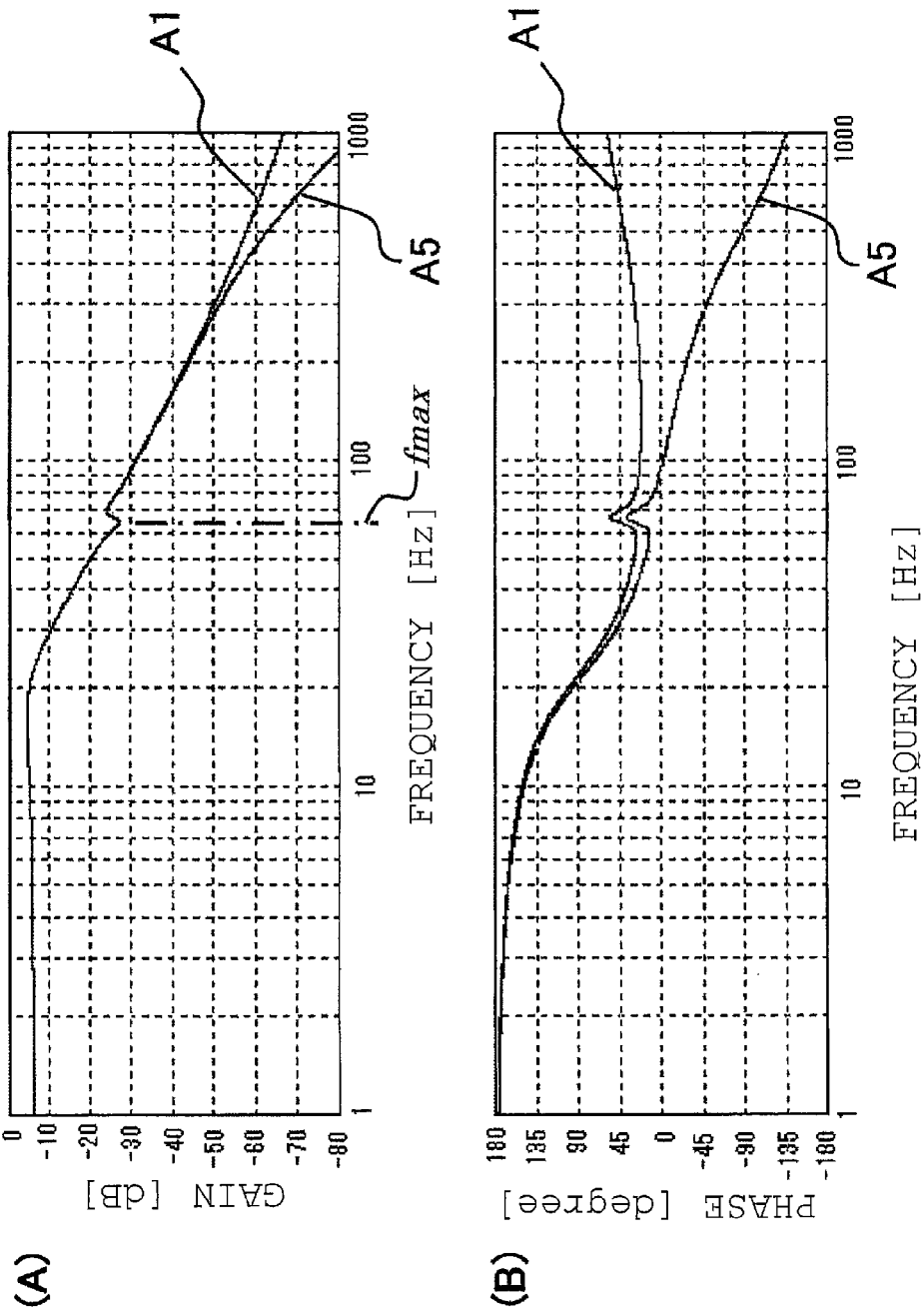
FIG. 26 shows characteristic diagrams illustrating detection characteristics of a transmission force transmitted to an auxiliary mass in response to a disturbance to the vibration damping device according to Embodiment 4 of the present invention.

FIG. 26 shows diagrams illustrating detection characteristics of the transmission force $F_{1\_2}$ with respect to the force $F_1$ [N]. In FIG. 26(A), a horizontal axis represents the frequency [Hz], and a vertical axis represents the gain [dB]. In FIG. 26(B), a horizontal axis represents the frequency [Hz], and a vertical axis represents the phase [degree]. In FIG. 26, a curve A1 shows detection characteristics of the value of the transmission force $F_{1\_2}$ under an ideal condition. A curve A5 shows detection characteristics of the value of the transmission force $F_{1\_2}$ based on an estimate disturbance value outputted by the disturbance estimator of the information pickup 600. The force $F_1$ [N] is disturbance input to the transmission force detecting portion 404 shown in FIG. 25. In FIG. 26, two case examples are plotted. One of the case examples is detection characteristics under the ideal condition where the transmission force detecting portion 404 is assumed to be able to precisely perform detection with no error throughout an entire frequency band. The other of the case examples is detection characteristics of the value of het transmission force $F_{1\_2}$ based on Embodiment 4. The characteristics of FIG. 26 is the detection characteristics of Embodiment 3 shown in FIG. 23 added with disturbance detection characteristics of the disturbance estimator without using a special sensor. The detection characteristics of the disturbance estimator without using a special sensor is determined by pole placement. In this analysis example, the disturbance estimator is of a minimum-dimension type, and the pole location is a second-order Butterworth pole location with a cutoff frequency of 600 Hz.

The characteristics under the ideal condition and the detection characteristics of Embodiment 4 are compared. The characteristics under the ideal condition has a slight phase lead with respect to the detection characteristics of Embodiment 4 at a high frequency band higher than or equal to 100 Hz. However, it is found that the characteristics under the ideal condition and the detection characteristics of Embodiment 4 are almost the same at a frequency band lower than or equal to the maximum disc rotation frequency $f_{max}$ [Hz]. The frequency band lower than or equal to the maximum disc rotation frequency $f_{max}$ [Hz] is a frequency band where control is intended to be made.

Figure 27:
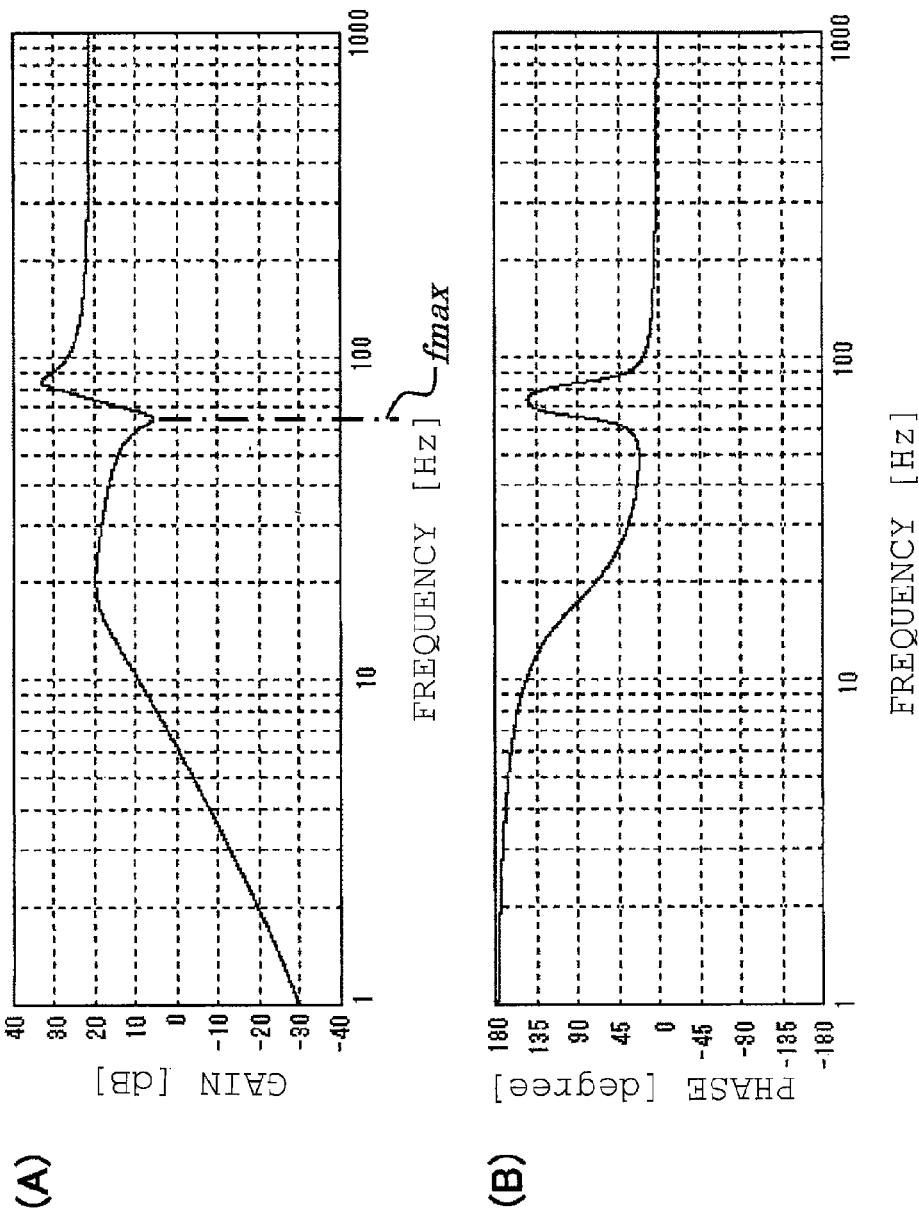
FIG. 27 show characteristic diagram showing frequency characteristics of an acceleration of a main frame portion in response to a disturbance to the vibration damping device according to Embodiment 4 of the present invention.

FIG. 27 shows analysis result of the frequency characteristics of the acceleration of the main frame portion 100 with respect to the force $F_1$ [N]. In FIG. 27(A), a horizontal axis represents the frequency [Hz], and a vertical axis represents the gain [dB]. In FIG. 27(B), a horizontal axis represents the frequency [Hz], and a vertical axis represents the phase [degree]. The detection characteristics of the transmission force detecting portion 404 is according to Embodiment 4 shown in FIG. 26, and the value of the amplification coefficient $\alpha$ of the amplifier 500 is set to 9. The fourth F1 [N] is disturbance input.

As compared with the characteristics of Embodiment 3 shown in FIG. 24, the characteristics of the transmission force detecting portion 404 shows higher sensitivity at 80 to 90 Hz, but is almost the same in other frequency bands. Therefore, it is understood that the vibration damping device 904 effectively functions. Therefore, detailed functions and effects are the same as those of FIG. 10 having been described in Embodiment 1.

As described above, the transmission force detection portion 404 has a simple and compact structure, and also has high detection accuracy. The vibration damping device 904 is configured so that the auxiliary mass driving portion 360 drives the small and lightweight auxiliary mass 300 based on the detection signal detected by the transmission force detecting portion 404. Therefore, the vibration damping device 904 is inexpensive, compact and lightweight, and can achieve high vibration damping performance.

Embodiment 5

The vibration damping device 910 of the above described conventional art and the vibration damping devices 900, 901, 902, 903 and 904 of Embodiments function to cancel the effect of disturbance at the maximum disc rotation frequency $f_{max}$ [Hz]. However, as shown in FIGS. 48 and 51, there is a problem that unnecessary sensitivity peaks appear on a low-frequency side and a high-frequency side with respect to the maximum disc rotation frequency $f_{max}$. In Embodiment 5, description will be made to a method for suppressing the above described two unnecessary sensitivity peaks while maintaining the effect of cancelling the disturbance at the maximum disc rotation frequency $f_{max}$ of the previously described embodiments.

Figure 28:
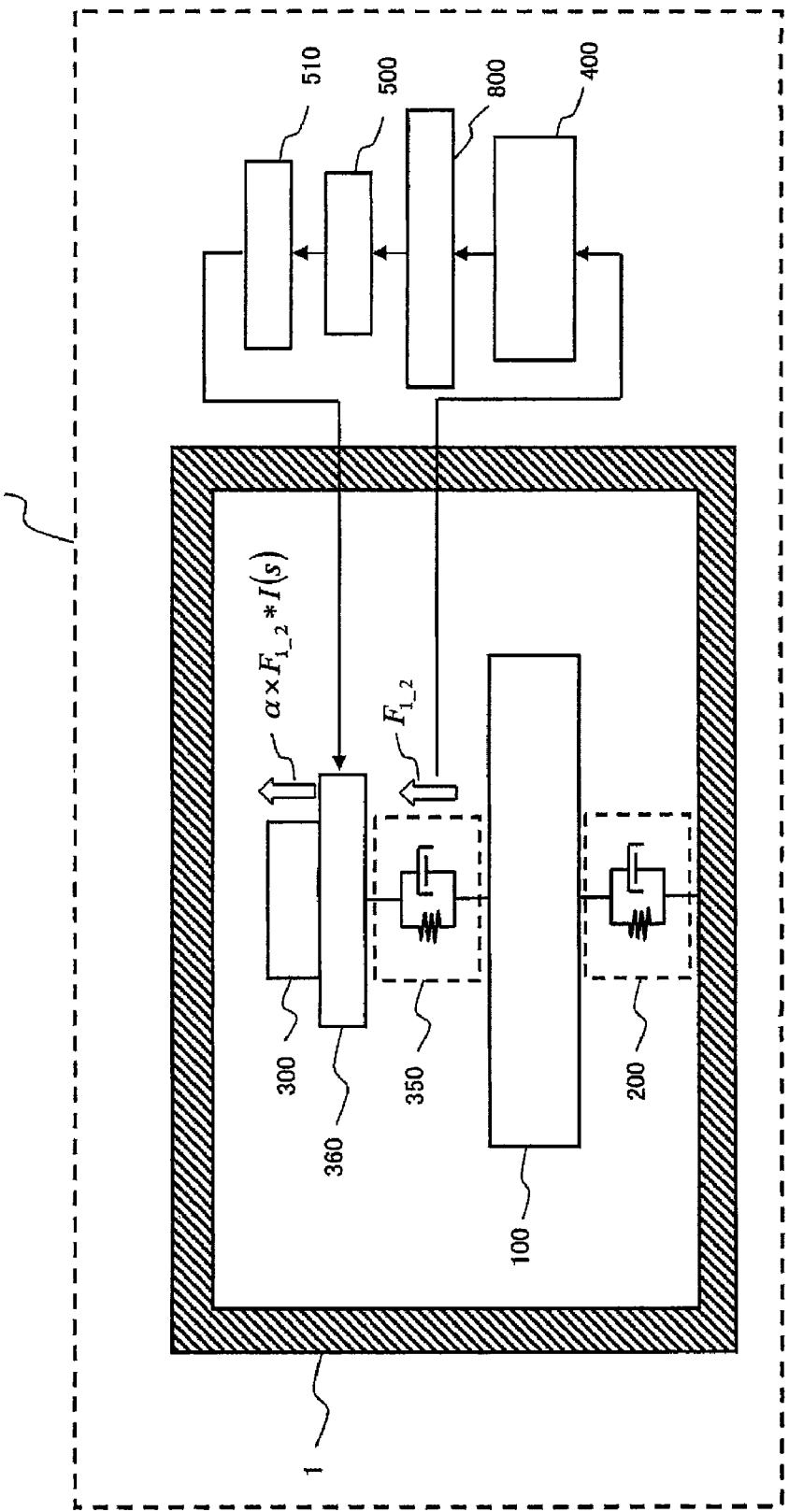
FIG. 28 is a model diagram showing a vibration damping device according to Embodiment 5 of the present invention.

Embodiment 5 is an example in which a phase compensator 800 is applied to the vibration damping device 900 of FIG. 1 in Embodiment 1. FIG. 28 is a model diagram showing the vibration damping device 905 according to Embodiment 5 using the auxiliary mass 300 that actively operates. In FIG. 28, elements which are the same as those of vibration damping device 900 described with reference to FIG. 1 are assigned the same reference numerals, and description thereof will be omitted. The transmission force $F_{1\_2}$ is the force transmitted from the main frame portion 100 to the auxiliary mass 300. $\alpha \times F_{1\_2}$ is the force generated by the auxiliary mass driving portion 360 to the auxiliary mass 100. $\alpha$ is amplification coefficient.

The vibration damping device 905 according to Embodiment 5 is characterized by actively operating the auxiliary mass 300. The vibration damping device 905 can enhance dynamic characteristics at arbitrary frequency band using the phase compensator. Of the above described two unnecessary sensitivity peaks, the sensitivity peak on the lower frequency side is generated at the resonant frequency. This frequency on the low-frequency side is defined as $f_1$ [Hz]. The sensitivity peak on the low-frequency side can be enhanced by delaying a phase of the output value of the transmission force detecting portion 400 at a frequency band including the frequency $f_1$. Further, of the two unnecessary sensitivity peaks, the sensitivity peak on the high-frequency side can be enhanced by advancing the phase at a frequency band higher than or equal to the resonance frequency $f_0$ (in Embodiment 5, the maximum disc rotation frequency $f_{max}$). The resonance frequency $f_0$ (in Embodiment 5, the maximum disc rotation frequency $f_{max}$) is the resonant frequency of the resonance system constituted by the auxiliary mass 300 and the cushioning member 350. Moreover, the resonance frequency $f_0$ is the output of the transmission force detecting portion 400.

Here, a specific example of the phase compensator 800 will be described. A means to change the phase of the output value of the transmission force detecting portion 405 at a predetermined frequency band is implemented by the phase compensator 800 using an analog circuit, a digital filter and the like.

Figure 29:
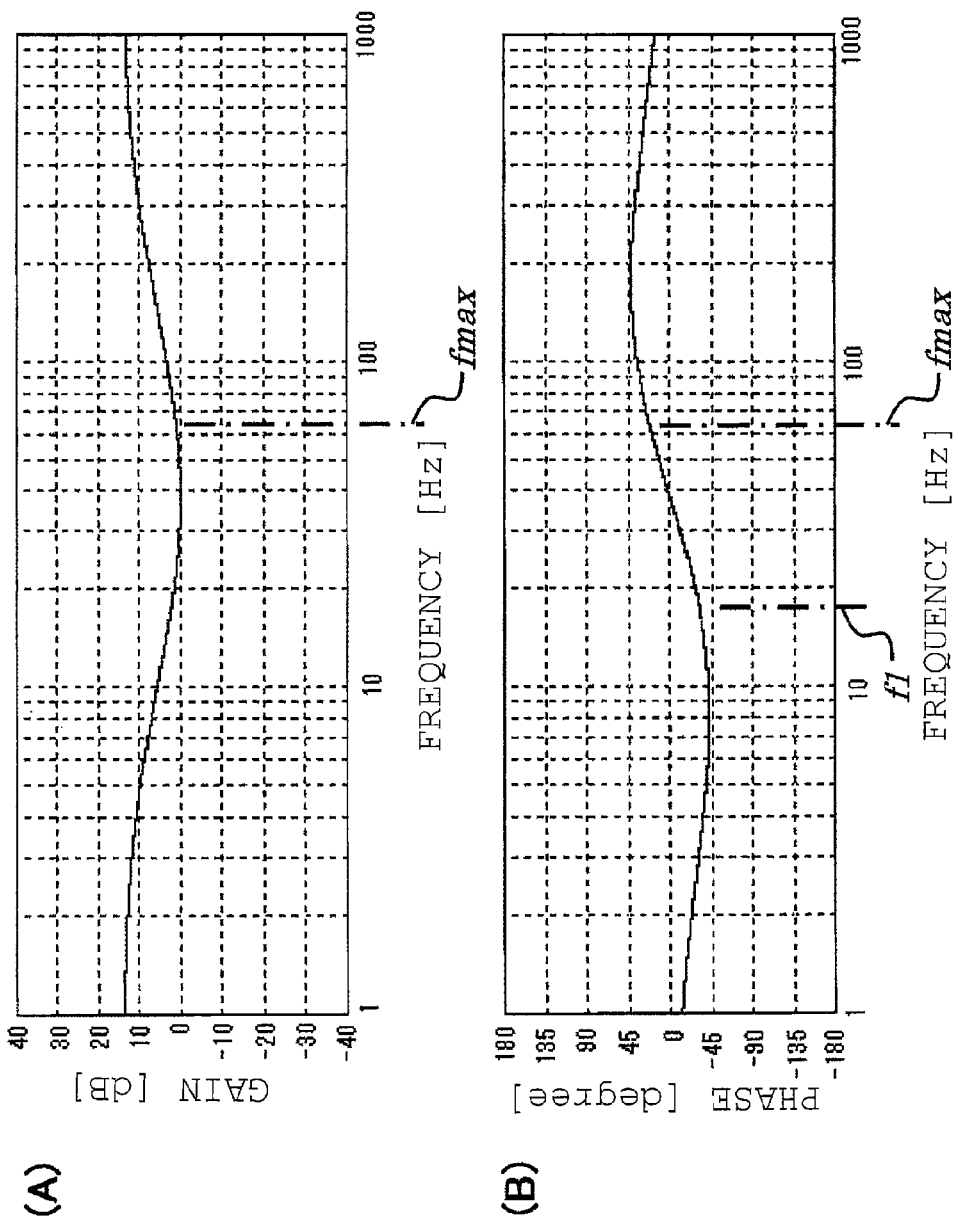
FIG. 29 shows characteristic diagrams illustrating frequency characteristics of a phase compensation portion of the vibration damping device according to Embodiment 5 of the present invention.

FIG. 29 shows diagrams illustrating frequency characteristics of the phase compensator 800. In FIG. 29(A), a horizontal axis represents the frequency [Hz], and a vertical axis represents the gain [dB]. In FIG. 29(B), a horizontal axis represents the frequency [Hz], and a vertical axis represents the phase [degree]. The phase compensator 800 has a function to delay the phase at low frequency band including the resonant frequency $f_1$ on the low-frequency side, and to advance the phase at the frequency higher than or equal to the maximum disc rotation frequency $f_{max}$. The resonant frequency $f_1$ is the resonant frequency on the low-frequency side of the resonance system constituted by the main frame portion 100 and the cushioning support member 200. The maximum disc rotation frequency $f_{max}$ is the resonant frequency of the resonance system constituted by the auxiliary mass 300 and the cushioning member 350.

Figure 30:
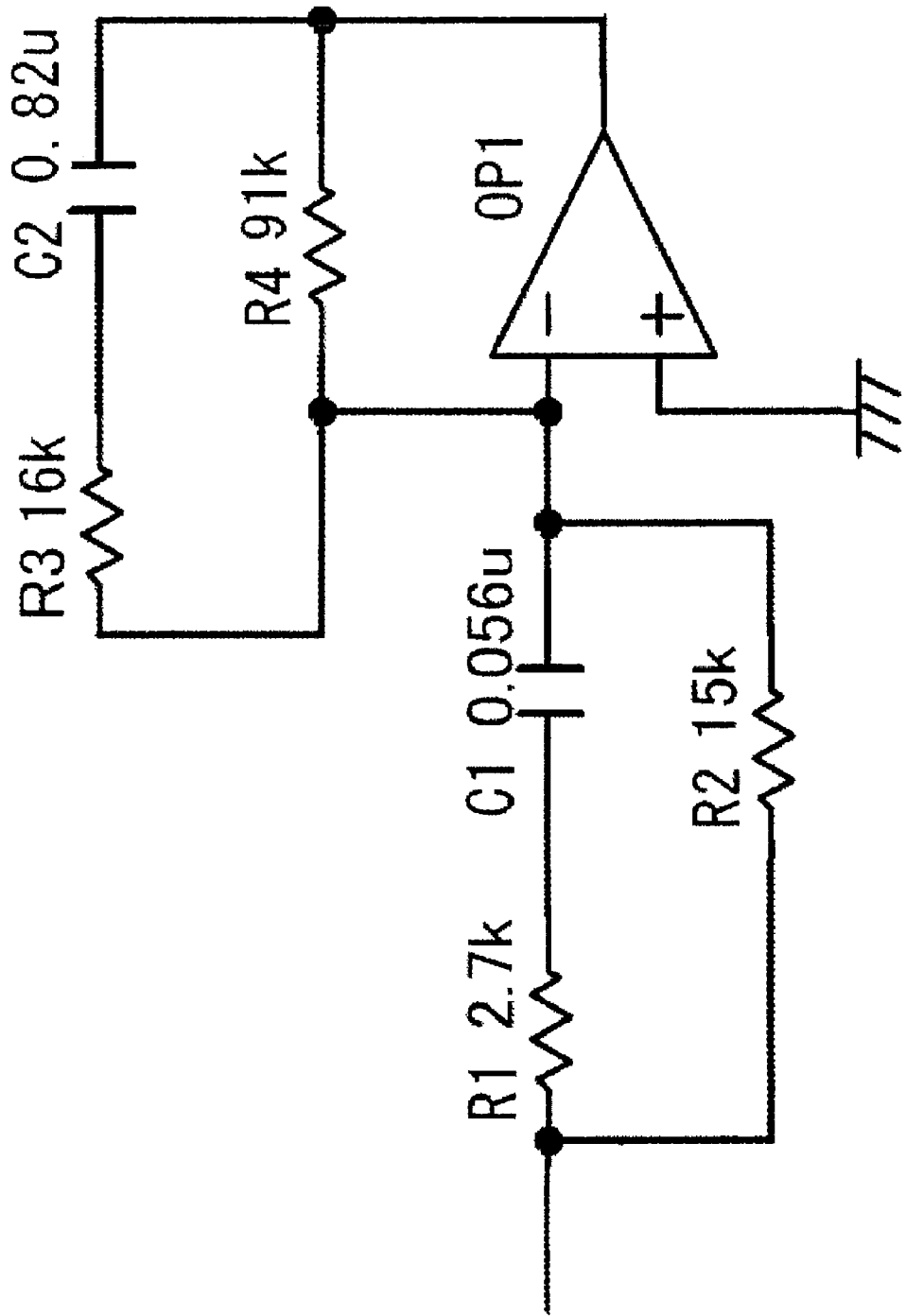
FIG. 30 is a circuit diagram showing the phase compensation portion of the vibration damping device according to Embodiment 5 of the present invention.

FIG. 30 shows an analog circuit using an operational amplifier as a specific example of the phase compensator 800 achieving the characteristics of FIG. 29. In FIG. 30, a resistance $R_1$ are a condenser $C_1$ are connected in series. A resistance $R_2$ is connected in parallel with the resistance $R_1$ and the condenser $C_1$. The other end of the condenser $C_1$ is connected to a negative-side input terminal of the operation amplifier $OP_1$. A positive-side input terminal of the operation amplifier $OP_1$ is grounded. A resistance $R_3$ and a condenser $C_2$ connected in series. A resistance $R_4$ is connected in parallel with the resistance $R_3$ and the condenser $C_2$. A terminal of the resistance $R_4$ on the resistance $R_3$ side is connected to the negative-side input terminal of the operation amplifier $OP_1$. A terminal of the resistance $R_4$ on the condenser $C_2$ side is connected to the output terminal of the operation amplifier $OP_1$.

Figure 31:
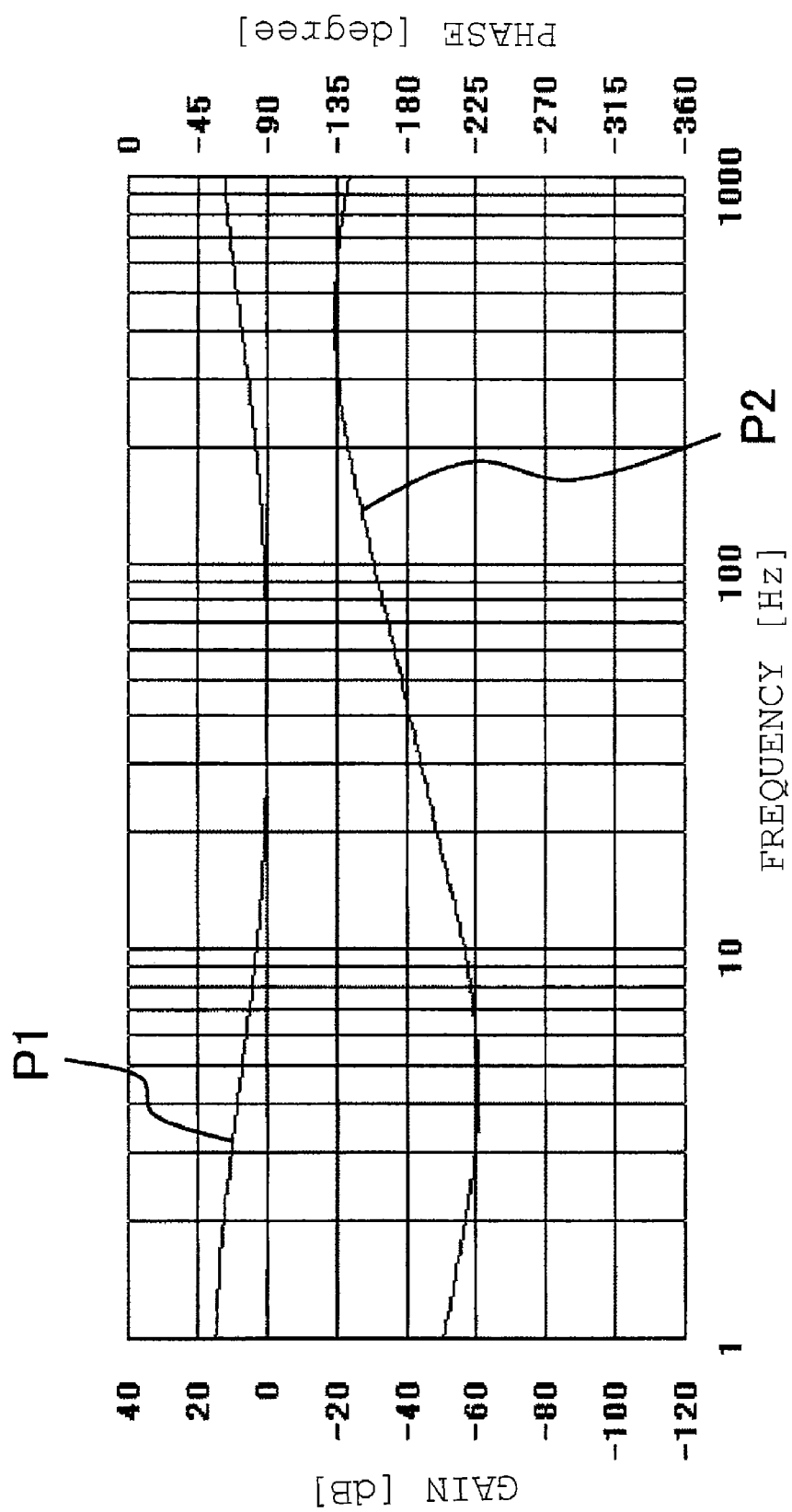
FIG. 31 is a characteristic diagram showing frequency characteristics of the phase compensation portion of the vibration damping device according to Embodiment 5 of the present invention.

The resistances $R_1$ and $R_2$ and the condenser $C_1$ are parameters for advancing the phase at the frequency band higher than or equal to the maximum disc rotation frequency $f_{max}$. The resistances $R_3$ and $R_4$ and the condenser $C_2$ are parameters for delaying the phase at the lower frequency band including the above described resonance frequency $f_1$ on the lower frequency side. The resonant frequency $f_1$ is the resonant frequency on the low-frequency side of the resonance system constituted by the main frame portion 100 and the cushioning member 200. When the values of the respective resistances and the values of the condensers are set to the values shown in FIG. 30, the phase compensator 800 exhibits the frequency characteristics shown in FIG. 31, and can provide almost the same characteristics as that of FIG. 29. That is, the resistance $R_1$ is set to 2.7 kΩ. The resistance $R_2$ is set to 15 kΩ. The resistance $R_3$ is set to 16 kΩ. The resistance $R_4$ is set to 91 kΩ. The condenser $C_1$ is set to 0.056 μF. The condenser $C_2$ is set to 0.82 μF. In FIG. 31, a horizontal axis represents the frequency [Hz], and vertical axes represent the gain [dB] and the phase [degree]. In FIG. 31, a curve P1 shows gain characteristics, and a curve P2 shows phase characteristics.

Figure 32:
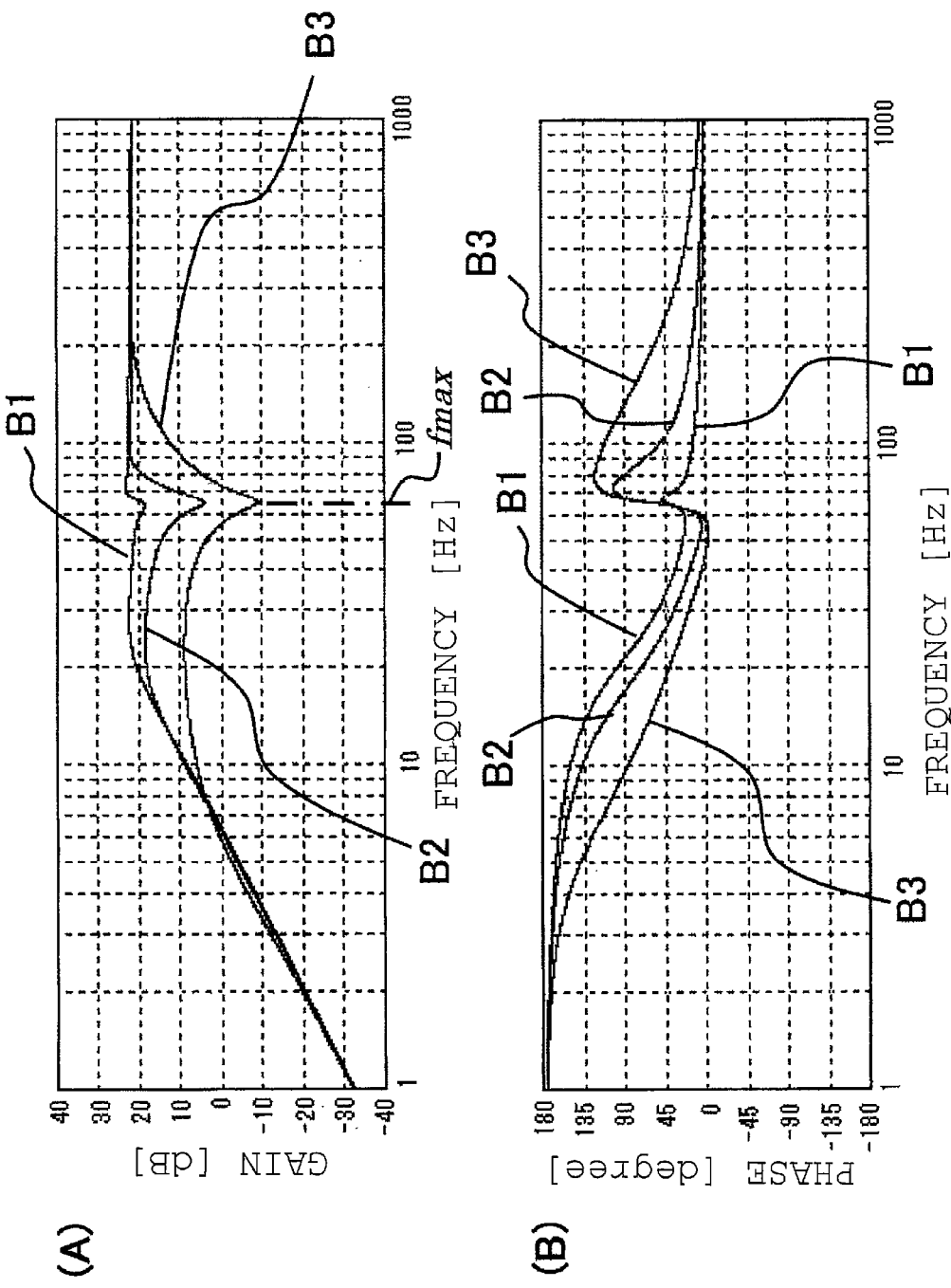
FIG. 32 shows characteristic diagrams illustrating frequency characteristics of an acceleration of a main frame in response to a disturbance to the vibration damping device according to Embodiment 5 of the present invention.

FIG. 32 shows the analysis result of the frequency characteristics of the acceleration of the main frame portion 100 with respect to the force $F_1$ [N]. In FIG. 32(A), a horizontal axis represents the frequency [Hz], and a vertical axis represents the gain [dB]. In FIG. 32(B), a horizontal axis represents the frequency [Hz], and a vertical axis represents the phase [degree]. In FIG. 32, a curve B1 is a curve when $\alpha$ is set to 1. A curve B2 is a curve when $\alpha$ is set to 9. A curve B3 is a curve when $\alpha$ is set to 49. The mass $m_2$ of the auxiliary mass 300 is 5 g. The transmission force detecting portion 400 and the amplifier 500 are under the same condition described in Embodiment 1. Further, the phase compensator 800 of the frequency characteristics shown in FIG. 29 is inserted between the transmission force detecting portion 400 and the amplifier 500. The value of the amplification coefficient $\alpha$ of the amplifier 500 is set to 1, 9 and 49. In this regard, the value of the amplification coefficient $\alpha$ is so set that the value of ($\alpha$+1) equals to 2, 10 and 50. That is, the setting is such that corresponding mass in the case of a passive type becomes 10 [g], 50[g] and 250[g]. The passive type is a configuration in which the auxiliary mass 300 does not actively operate. The values 1, 9 and 49 of the amplification coefficient $\alpha$ are set so as to equal to the magnification of the mass $m_2$ of the auxiliary mass 300 shown in FIG. 48. That is, the case where the amplification coefficient $\alpha$ is 1 corresponds to the case where the mass $m_2$ of the auxiliary mass 300 becomes 0.2 times. The case where the amplification coefficient $\alpha$ is 9 corresponds to the case where the mass $m_2$ of the auxiliary mass 300 becomes 1 time. The case where the amplification coefficient $\alpha$ is 49 corresponds to the case where the mass $m_2$ of the auxiliary mass 300 becomes 5 times.

When FIG. 48 and FIG. 32 are compared, it is found that two unnecessary sensitive peaks on both sides of the maximum disc rotation frequency $f_{max}$ of FIG. 48 are suppressed to almost zero in FIG. 32. Meanwhile, the effect of reducing sensitivity at the frequency band in the vicinity of the maximum disc rotation frequency $f_{max}$ is not degraded. Almost the same damping characteristics effect as that of FIG. 48 is maintained. As shown in FIG. 32, this characteristics is obtained irrespective of the amplification coefficient $\alpha$.

In Embodiment 5, the sensitivity peak on the high-frequency side is enhanced by advancing the phase at the frequency band higher than or equal to the resonant frequency $f_0$ (the maximum disc rotation frequency $f_{max}$ in Embodiment 5). However, it is also possible to enhance the sensitivity peak on the high-frequency side by advancing the phase at the frequency band that does not contain the resonance frequency $f_0$. The frequency band that does not contain the resonant frequency $f_0$ is the frequency band higher than the resonant frequency $f_0$. Moreover, the resonant frequency $f_0$ (the maximum disc rotation frequency $f_{max}$ in Embodiment 5) is the resonant frequency of the resonance system constituted by the auxiliary mass 300 and the cushioning member 350.

The vibration damping device 905 according to Embodiment 5 is configured to compensate the phase of the output of the transmission force detecting portion 405 using the phase compensator 800. The phase compensator 800 can suppress unnecessary increase of sensitivity at the predetermined frequency band. Moreover, the transmission force detecting portion 400 has high detection accuracy, has a simple structure, and is compact. The auxiliary mass driving portion 360 drives the small and lightweight auxiliary mass 300 based on the detecting signal detected by the transmission force detecting portion 400. With such a configuration, the vibration damping device 905 is inexpensive, compact and lightweight, and can achieve high vibration damping performance.

Embodiment 6

Figure 33:
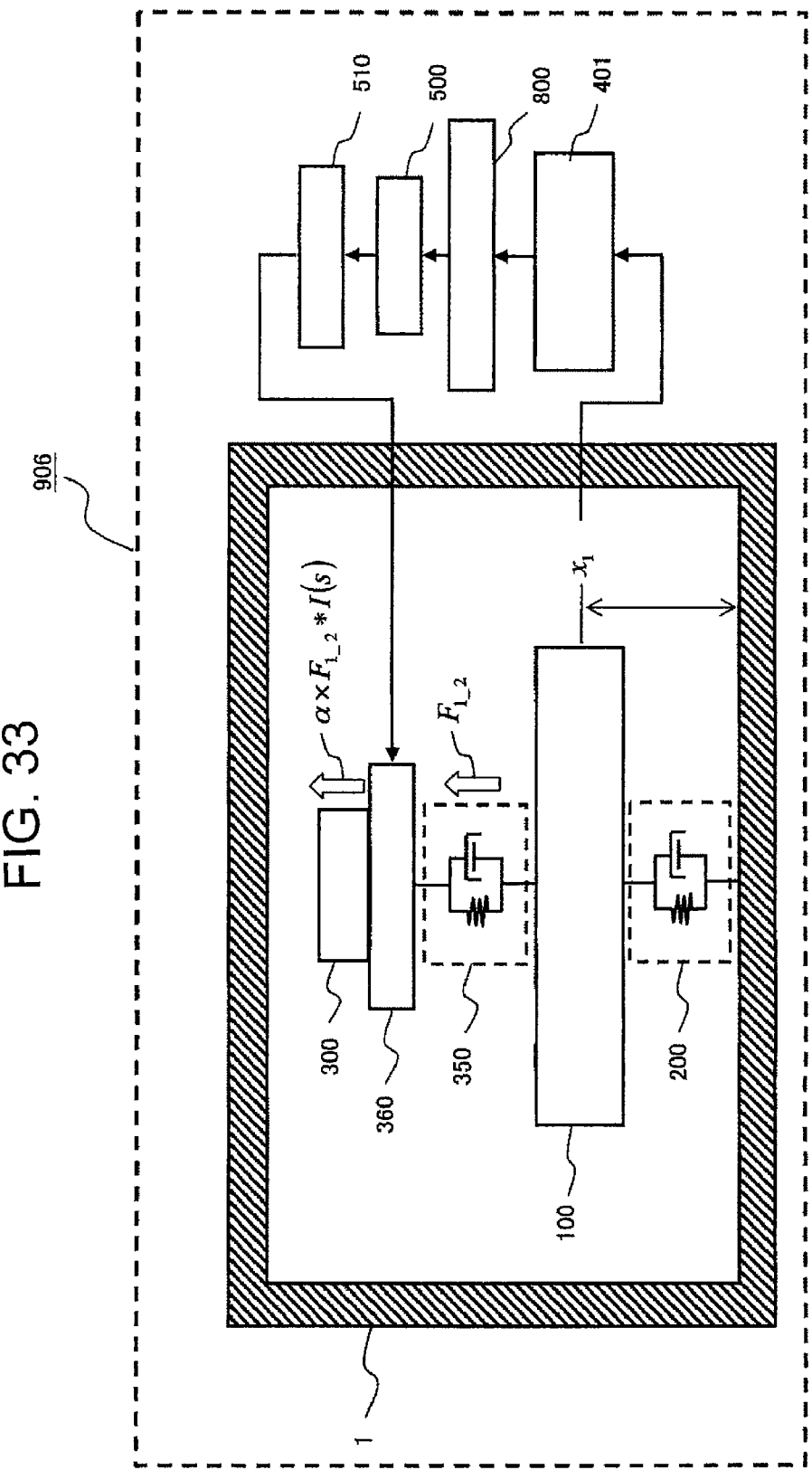
FIG. 33 is a model diagram showing a vibration damping device according to Embodiment 6 of the present invention.

A vibration damping device 906 according to Embodiment 6 is configured so that the phase compensator 800 described in Embodiment 5 is applied to the vibration damping device 901 described with reference to FIG. 8 of Embodiment 1. FIG. 33 is a model diagram showing the vibration damping device 906 according to Embodiment 6 using the auxiliary mass 300 that actively operates. In FIG. 33, elements which are the same as those of the vibration damping device 901 described with reference to FIG. 8 are assigned the same reference numerals, and description thereof will be omitted. The position $x_1$ is the position of the mass point $m_1$ with reference to the casing 1 in the direction of vibration when the main frame portion 100 is defined as the mass point $m_1$. The transmission force $F_{1\_2}$ is the force generated by the auxiliary mass driving portion 360 to the auxiliary mass 100. α is the amplification coefficient.

The phase compensator 800 is inserted between the transmission force detecting portion 401 and the amplifier 500. The phase compensator 800 has a function to compensate the phase of the detection signal of the transmission force detecting portion 401. The function to compensate the phase is the function to provide the characteristics described in Embodiment 5. The detection signal of the transmission force detecting portion 401 is the value of the transmission force $F_{1\_2}$.

Figure 34:
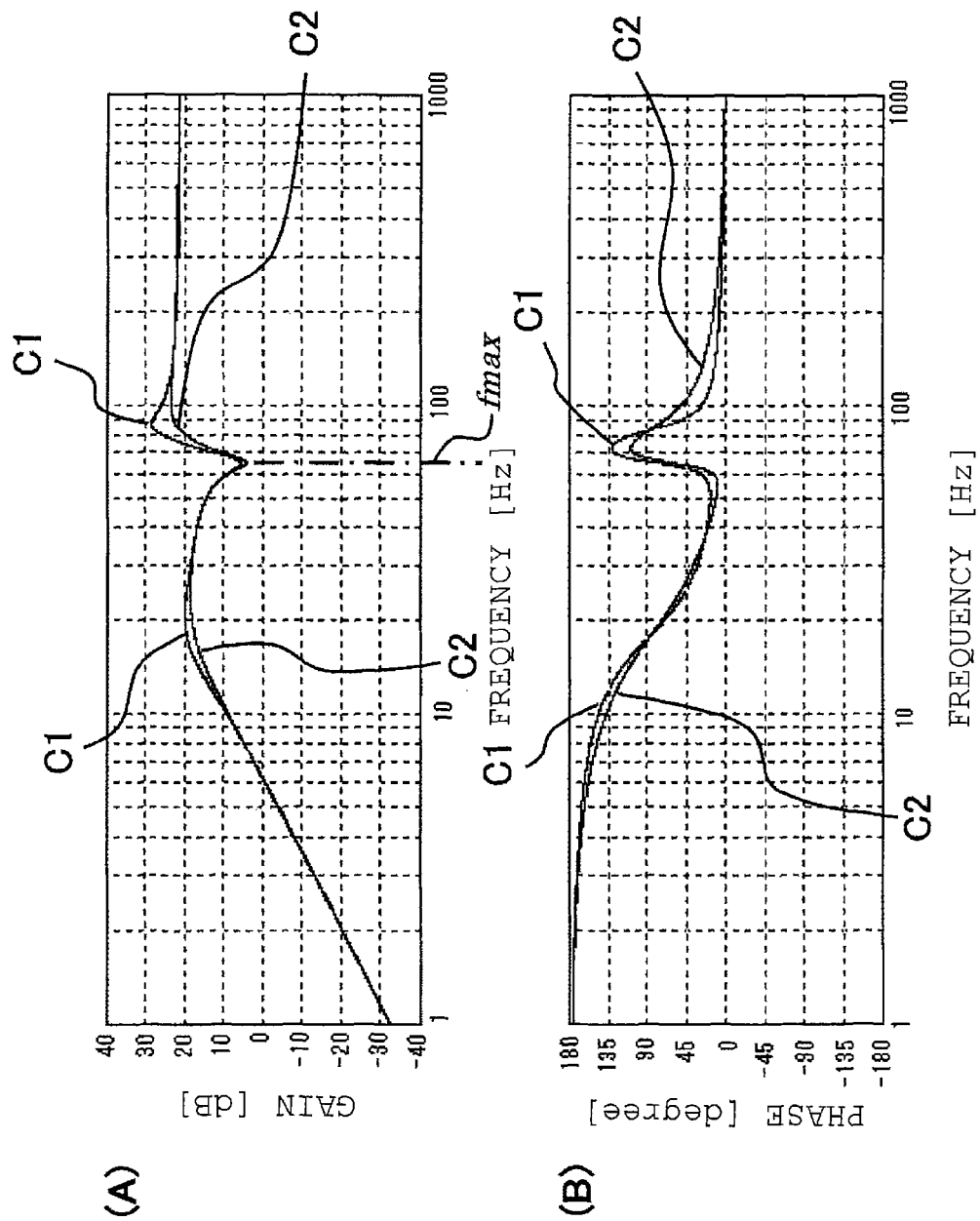
FIG. 34 shows characteristic diagrams illustrating frequency characteristics of an acceleration of a main frame in response to a disturbance to the vibration damping device according to Embodiment 6 of the present invention.

FIG. 34 shows diagrams illustrating analysis result of the frequency characteristics of the acceleration $d^2(x_1)/dt^2$ of the main frame portion 100 with respect to the force $F_1$ [N] when the phase compensator 800 according to Embodiment 6 is applied. In FIG. 34(A), a horizontal axis represents the frequency [Hz], and a vertical axis represents the gain [dB]. In FIG. 34(B), a horizontal axis represents the frequency [Hz], and a vertical axis represents the phase [degree]. In FIG. 34, a curve C1 shows the characteristics when the phase compensator 800 is not provided. A curve C2 shows the characteristics when the phase compensator 800 is provided. The mass $m_2$ of the auxiliary mass 300 is 5 g. The amplification coefficient α is 9. The force F1 [N] is disturbance input shown in FIG. 10 of Embodiment 1. In this regard, the frequency characteristics of the phase compensator 800 is set to the characteristics shown in FIG. 29.

In FIG. 34, two case examples are plotted. One of the case examples is the characteristics shown in FIG. 10. The other of the case examples is the characteristics when the phase compensator 800 of Embodiment 6 is added to the system shown in FIG. 10. In the frequency characteristics of the vibration damping device with no phase compensator 800, gain peaks exist at the frequency band (in the vicinity of 20 Hz) in the vicinity of the resonant frequency of the resonance system constituted by the main frame portion 100 and the cushioning support member 200 and the frequency band between 80 to 90 Hz. When the phase compensator 800 according to Embodiment 6 is applied, these two gain peaks can be effectively suppressed.

The vibration damping device 906 according to Embodiment 6 is configured to compensate the phase of the output of the transmission force detecting portion 401 using the phase detector 800. The phase detector 800 can suppress unnecessary increase of sensitivity at the predetermined frequency band. The transmission force detection portion 401 has high detection accuracy, has simple structure, and is compact. The auxiliary mass driving portion 360 drives the small and lightweight auxiliary mass 300 based on the detection signal detected by the transmission force detecting portion 401. With such a configuration, the vibration damping device 906 is inexpensive, compact and lightweight, and can achieve high vibration damping performance.

Embodiment 7

Figure 35:
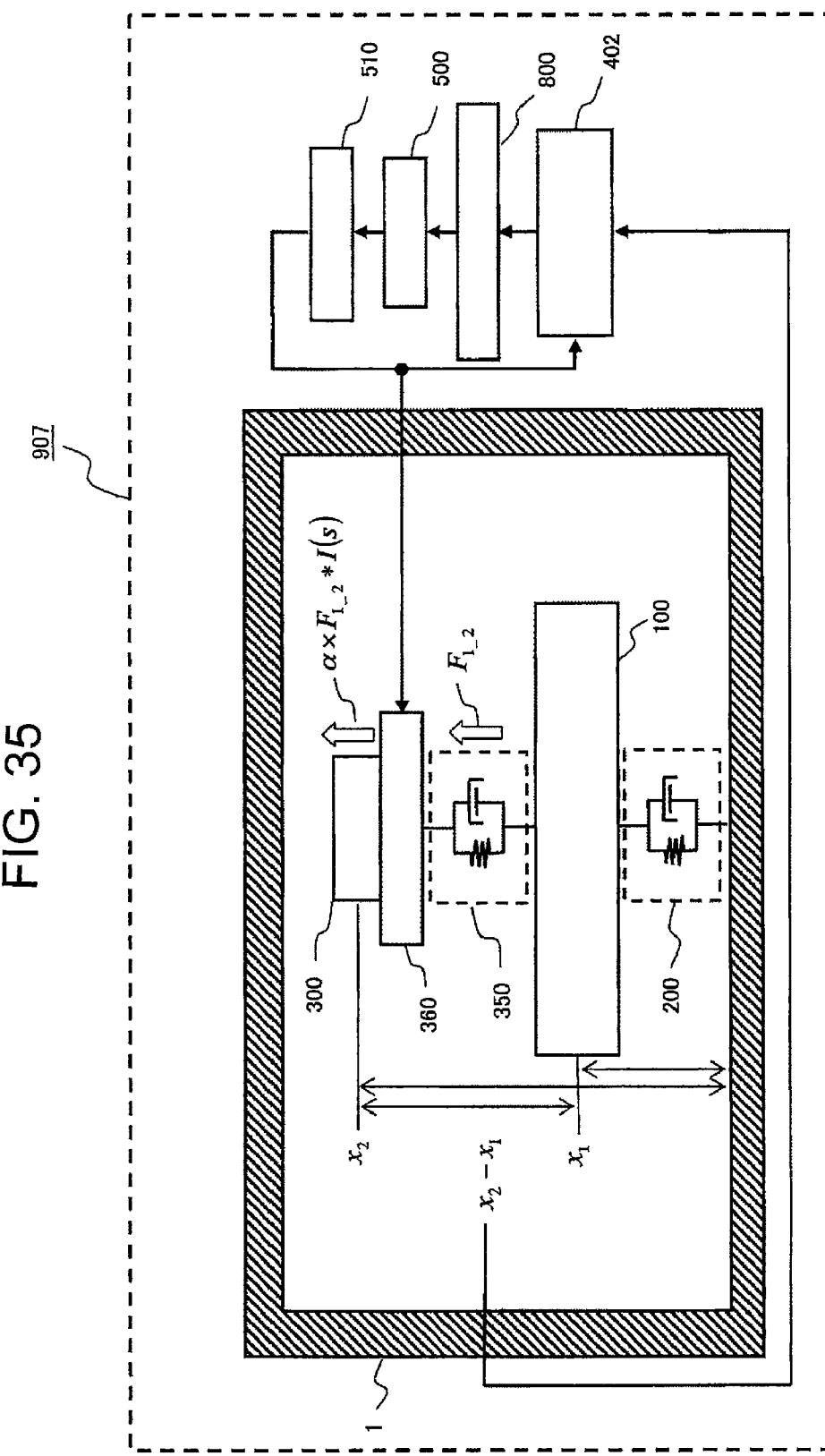
FIG. 35 is a model diagram showing a vibration damping device according to Embodiment 7 of the present invention.

A vibration damping device 907 according to Embodiment 7 is configured so that the phase compensator 800 described in Embodiment 5 is applied to the vibration damping device 902 described with reference to FIG. 14 of Embodiment 2. FIG. 35 is a model diagram showing the vibration damping device 907 according to Embodiment 7 using the auxiliary mass 300 that actively operates. In FIG. 35, elements which are the same as those of the vibration damping device 902 described with reference to FIG. 14 are assigned the same reference numerals, and description thereof will be omitted. The position $x_1$ is the position of the mass point $m_1$ with reference to the casing 1 in the direction of vibration when the main frame portion 100 is defined as the mass point $m_1$. The position $x_2$ is the position of the mass point $m_2$ with reference to the casing 1 in the direction of vibration when the auxiliary mass 300 is defined as the mass point $m_2$. The position $(x_1-x_2)$ is the relative position of the auxiliary mass 300 and the main frame portion 100 in the direction of vibration. The transmission force $F_{1\_2}$ is the force transmitted from the main frame portion 100 to the auxiliary mass 300. $\alpha \times F_{1\_2}$ is the force generated by the auxiliary mass driving portion 360 to the auxiliary mass 100. α is the amplification coefficient. α is the amplification coefficient.

The phase compensator 800 is inserted between the transmission force detecting portion 402 and the amplifier 500. The phase compensator 800 has a function to provide the characteristics described in Embodiment 5 with respect to the detection signal of the transmission force detecting portion 402. The detection signal of the transmission force detecting portion 402 is the value of the transmission force $F_{1\_2}$.

Figure 36:
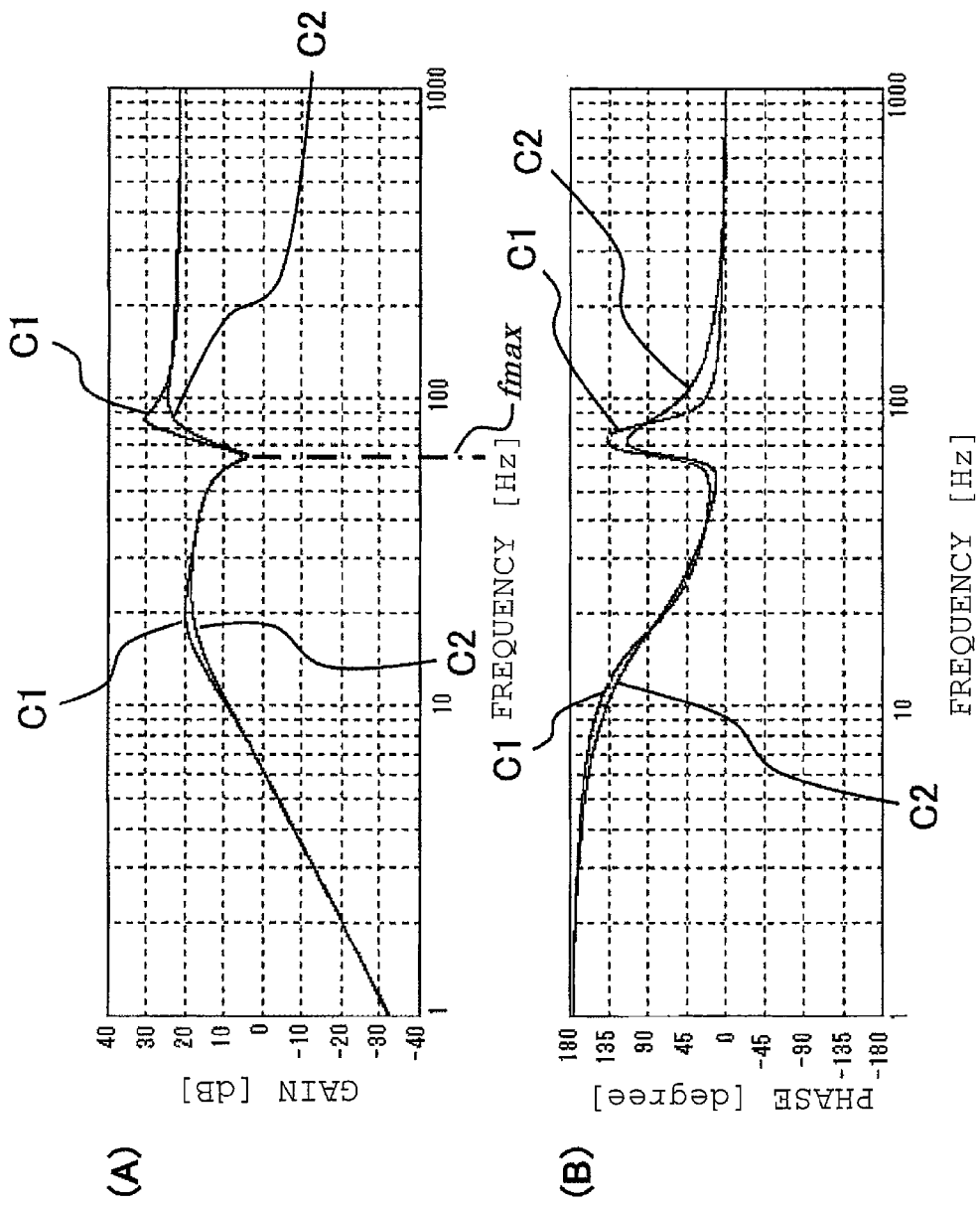
FIG. 36 shows characteristic diagrams illustrating frequency characteristics of an acceleration of a main frame in response to a disturbance to the vibration damping device according to Embodiment 7 of the present invention.

FIG. 36 shows diagrams illustrating analysis result of the frequency characteristics of the acceleration of the main frame portion 100 with respect to the force $F_1$ [N] when the phase compensator 800 according to Embodiment 7 is applied. In FIG. 36(A), a horizontal axis represents the frequency [Hz], and a vertical axis represents the gain [dB]. In FIG. 36(B), a horizontal axis represents the frequency [Hz], and a vertical axis represents the phase [degree]. In FIG. 36, a curve C1 shows the characteristics when the phase compensator 800 is not provided. A curve C2 shows the characteristics when the phase compensator 800 is provided. The force F1 [N] is disturbance input shown in FIG. 19 of Embodiment 2. In this regard, the frequency characteristics of the phase compensator 800 is set to the characteristics shown in FIG. 29.

In FIG. 36, two case examples are plotted. One of the case examples is the characteristics shown in FIG. 19. The other of the case examples is the characteristics when the phase compensator 800 of Embodiment 7 is added to the system shown in FIG. 19. In the frequency characteristics of the vibration damping device with no phase compensator 800, gain peaks exist at the frequency band (in the vicinity of 20 Hz) in the vicinity of the resonant frequency of the resonance system constituted by the main frame portion 100 and the cushioning support member 200 and the frequency band between 80 to 90 Hz. When the phase compensator 800 according to Embodiment 7 is applied, these two gain peaks can be effectively suppressed.

The vibration damping device 907 according to Embodiment 7 is configured to compensate the phase of the output of the transmission force detecting portion 402 using the phase detector 800. The phase detector 800 can suppress unnecessary increase of sensitivity at the predetermined frequency band. The transmission force detection portion 402 has high detection accuracy, has simple structure, and is compact. The auxiliary mass driving portion 360 drives the small and lightweight auxiliary mass 300 based on the detection signal detected by the transmission force detecting portion 402. With such a configuration, the vibration damping device 907 is inexpensive, compact and lightweight, and can achieve high vibration damping performance.

Embodiment 8

Figure 37:
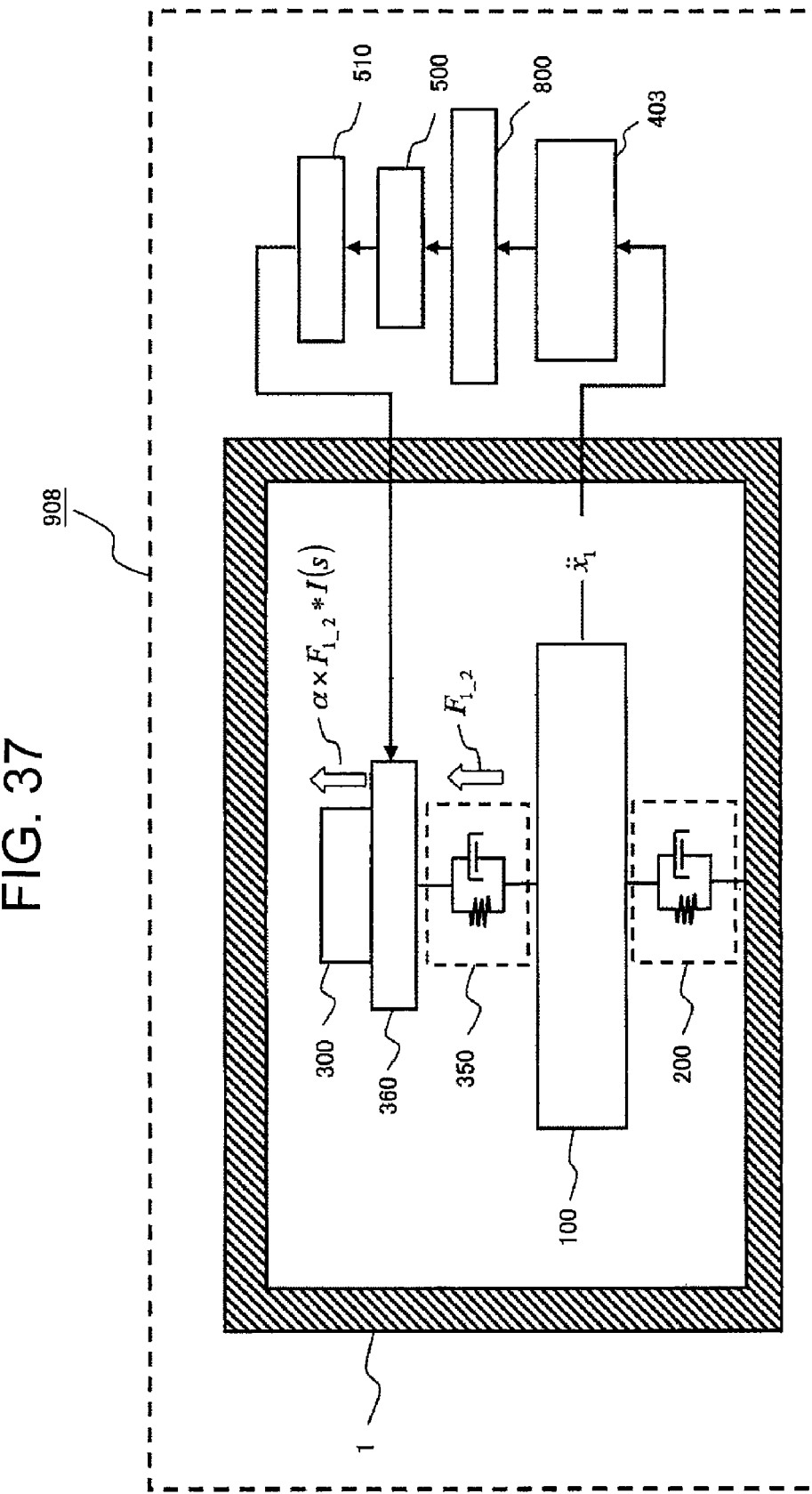
FIG. 37 is a model diagram showing a vibration damping device according to Embodiment 8 of the present invention.

A vibration damping device 908 according to Embodiment 8 is configured so that the phase compensator 800 described in Embodiment 5 is applied to the vibration damping device 903 described with reference to FIG. 21 of Embodiment 3. FIG. 37 is a model diagram showing the vibration damping device 908 according to Embodiment 8 using the auxiliary mass 300 that actively operates. In FIG. 37, elements which are the same as those of the vibration damping device 903 described with reference to FIG. 21 are assigned the same reference numerals, and description thereof will be omitted. The transmission force $F_{1\_2}$ is the force transmitted from the main frame portion 100 to the auxiliary mass 300. $\alpha \times F_{1\_2}$ is the force generated by the auxiliary mass driving portion 360 to the auxiliary mass 300. $\alpha$ is the amplification coefficient.

The phase compensator 800 is inserted between the transmission force detecting portion 403 and the amplifier 500. The phase compensator 800 has a function to compensate the phase of the detection signal of the transmission force detection portion 403. The function to compensate the phase is the function to provide the characteristics described in Embodiment 5. The detection signal of the transmission force detecting portion 403 is the value of the transmission force $F_{1\_2}$.

Figure 38:
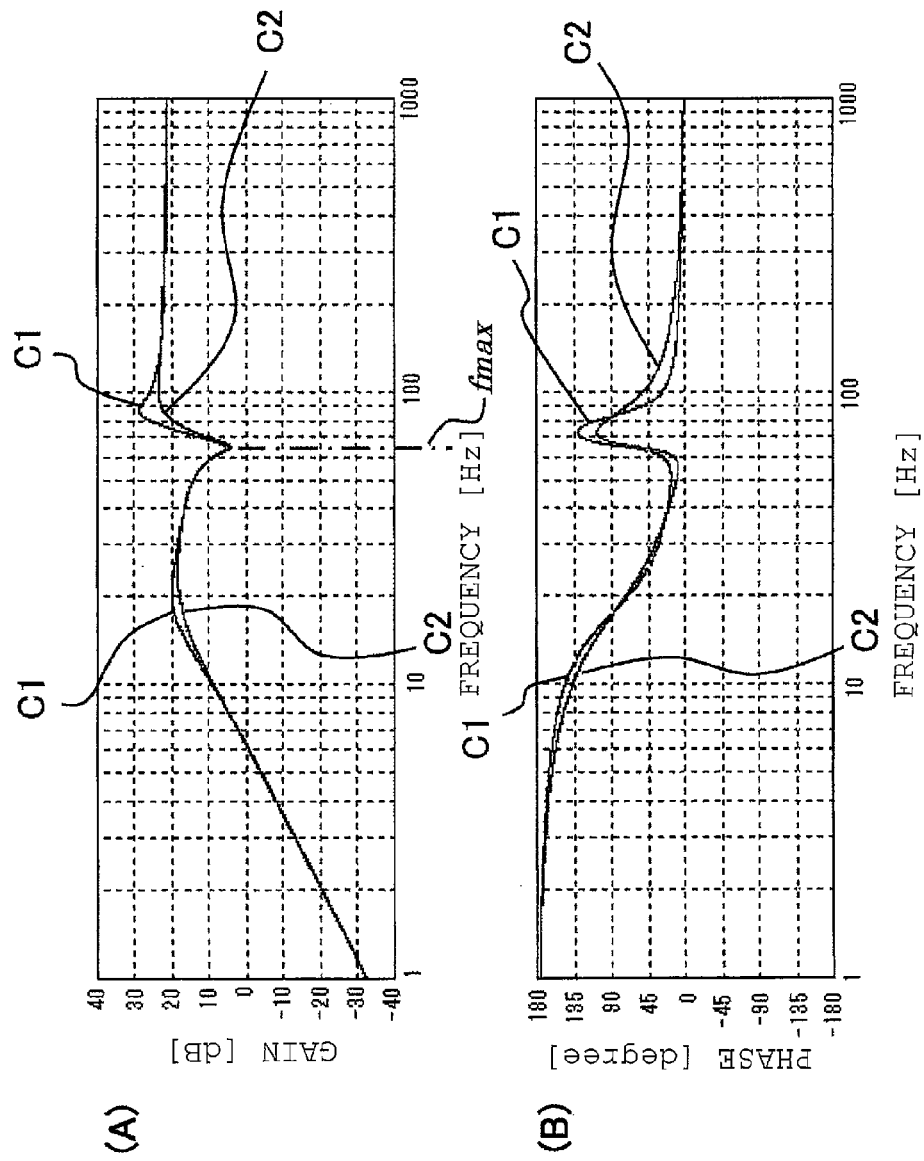
FIG. 38 shows characteristic diagrams illustrating frequency characteristics of an acceleration of a main frame in response to a disturbance to the vibration damping device according to Embodiment 8 of the present invention.

FIG. 38 shows diagrams illustrating analysis result of the frequency characteristics of the acceleration of the main frame portion 100 with respect to the force $F_1$ [N] when the phase compensator 800 according to Embodiment 8 is applied. In FIG. 38(A), a horizontal axis represents the frequency [Hz], and a vertical axis represents the gain [dB]. In FIG. 38(B), a horizontal axis represents the frequency [Hz], and a vertical axis represents the phase [degree]. In FIG. 38, a curve C1 shows the characteristics when the phase compensator 800 is not provided. A curve C2 shows the characteristics when the phase compensator 800 is provided. The force F1 [N] is disturbance input shown in FIG. 24 of Embodiment 3. In this regard, the frequency characteristics of the phase compensator 800 is set to the characteristics shown in FIG. 29.

In FIG. 38, two case examples are plotted. One of the case examples is the characteristics shown in FIG. 24. The other of the case examples is the characteristics when the phase compensator 800 of Embodiment 8 is added to the system shown in FIG. 24. In the frequency characteristics of the vibration damping device with no phase compensator 800, gain peaks exist at the frequency band (in the vicinity of 20 Hz) in the vicinity of the resonant frequency of the resonance system constituted by the main frame portion 100 and the cushioning support member 200 and the frequency band between 80 to 90 Hz. When the phase compensator 800 according to Embodiment 8 is applied, these two gain peaks can be effectively suppressed.

The vibration damping device 908 according to Embodiment 8 is configured to compensate the phase of the output of the transmission force detecting portion 401 using the phase detector 800. The phase detector 800 can suppress unnecessary increase of sensitivity at the predetermined frequency band. The transmission force detection portion 403 has high detection accuracy, has simple structure, and is compact. With such a configuration, the vibration damping device 908 is inexpensive, compact and lightweight, and can achieve high vibration damping performance. The auxiliary mass driving portion 360 drives the small and lightweight auxiliary mass 300 based on the detection signal detected by the transmission force detecting portion 403. With such a configuration, the vibration damping device 908 is inexpensive, compact and lightweight, and can achieve high vibration damping performance.

Embodiment 9

Figure 39:
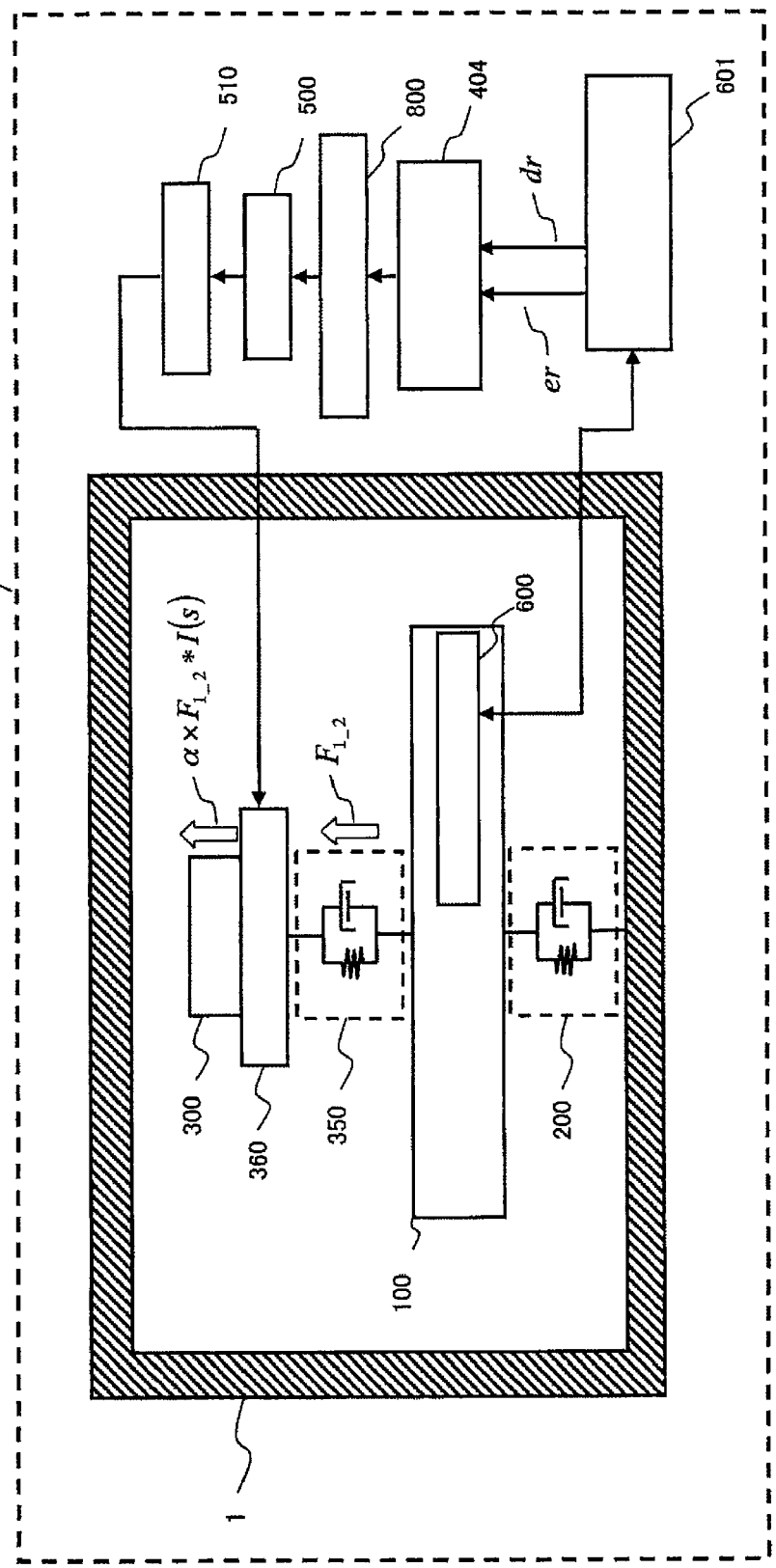
FIG. 39 is a model diagram showing a vibration damping device according to Embodiment 9 of the present invention.

A vibration damping device 909 according to Embodiment 9 is configured so that the phase compensator 800 described in Embodiment 5 is applied to the vibration damping device 904 described with reference to FIG. 25 of Embodiment 4. FIG. 34 is a model diagram showing the vibration damping device 909 according to Embodiment 9 using the auxiliary mass 300 that actively operates. In FIG. 39, elements which are the same as those of the vibration damping device 903 described with reference to FIG. 25 are assigned the same reference numerals, and description thereof will be omitted. The signal er is the deviation signal of the position follow-up controller 601 of the information pickup 600. The signal dr is the driving signal of the information pickup 600 of the position follow-up controller 601 of the information pickup 600. The transmission force $F_{1\_2}$ is the force transmitted from the main frame portion 100 to the auxiliary mass 300. $\alpha \times F_{1\_2}$ is the force generated by the auxiliary mass driving portion 360 to the auxiliary mass 300. $\alpha$ is the amplification coefficient.

The phase compensator 800 is inserted between the transmission force detecting portion 404 and the amplifier 500. The phase compensator 800 has a function to compensate the phase of the detection signal of the transmission force detection portion 404. The function to compensate the phase is the function to provide the characteristics described in Embodiment 5. The detection signal of the transmission force detecting portion 404 is the value of the transmission force $F_{1\_2}$.

Figure 40:
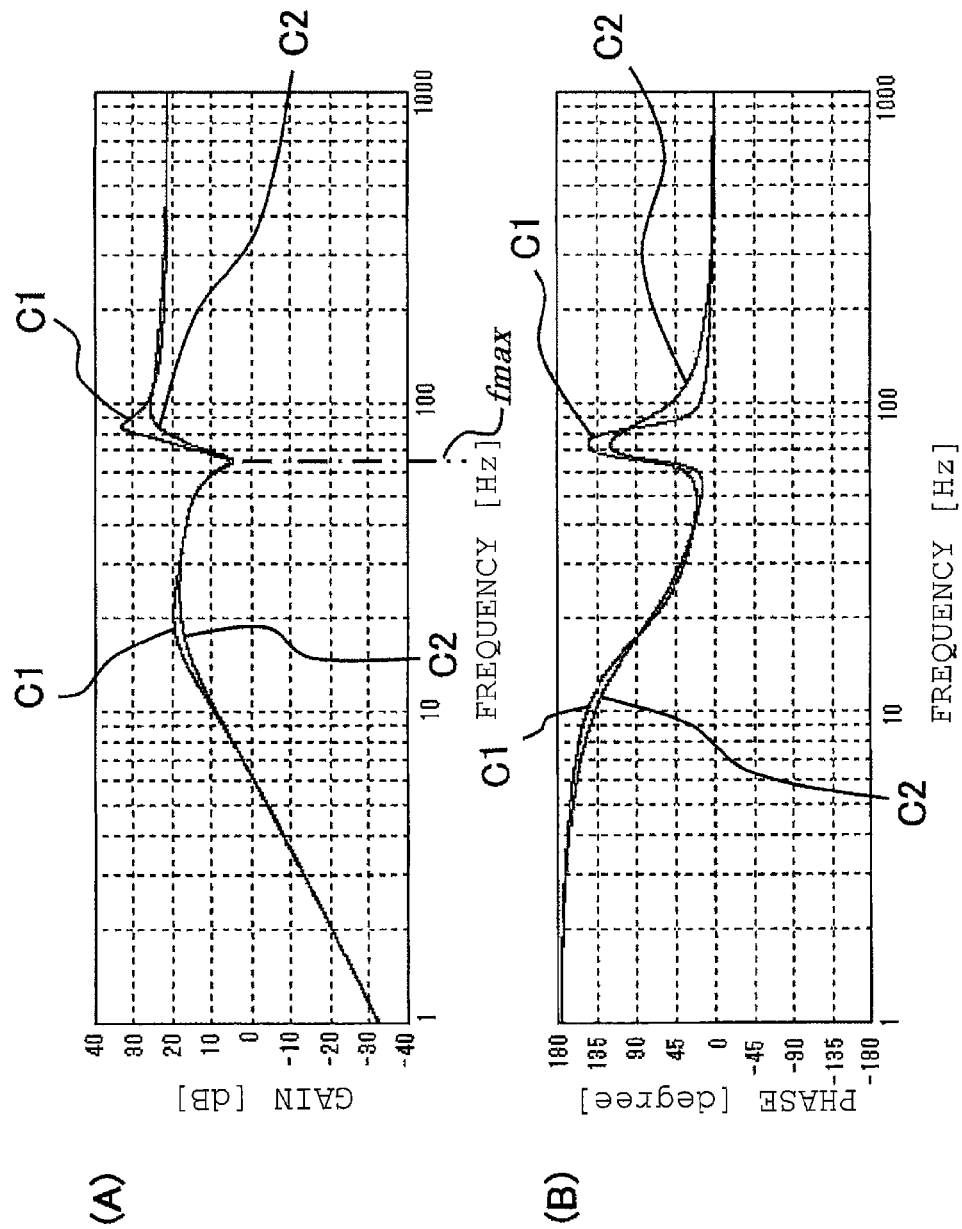
FIG. 40 shows characteristic diagrams illustrating frequency characteristics of an acceleration of a main frame in response to a disturbance to the vibration damping device according to Embodiment 9 of the present invention.

FIG. 40 shows diagrams illustrating analysis result of the frequency characteristics of the acceleration of the main frame portion 100 with respect to the force $F_1$ [N] when the phase compensator 800 according to Embodiment 9 is applied. In FIG. 40(A), a horizontal axis represents the frequency [Hz], and a vertical axis represents the gain [dB]. In FIG. 40(B), a horizontal axis represents the frequency [Hz], and a vertical axis represents the phase [degree]. In FIG. 40, a curve C1 shows the characteristics when the phase compensator 800 is not provided. A curve C2 shows the characteristics when the phase compensator 800 is provided. The force F1 [N] is disturbance input shown in FIG. 27 of Embodiment 4. In this regard, the frequency characteristics of the phase compensator 800 is set to the characteristics shown in FIG. 29.

In FIG. 40, two case examples are plotted. One of the case examples is the characteristics shown in FIG. 27. The other of the case examples is the characteristics when the phase compensator 800 of Embodiment 9 is added to the system shown in FIG. 27. In the frequency characteristics of the vibration damping device with no phase compensator 800, gain peaks exist at the frequency band (in the vicinity of 20 Hz) in the vicinity of the resonant frequency of the resonance system constituted by the main frame portion 100 and the cushioning support member 200 and the frequency band between 80 to 90 Hz. When the phase compensator 800 according to Embodiment 9 is applied, these two gain peaks can be effectively suppressed.

The vibration damping device 909 according to Embodiment 9 is configured to compensate the phase of the output of the transmission force detecting portion 404 using the phase detector 800. The phase detector 800 can suppress unnecessary increase of sensitivity at the predetermined frequency band. The transmission force detection portion 404 has high detection accuracy, has simple structure, and is compact. The auxiliary mass driving portion 360 drives the small and lightweight auxiliary mass 300 based on the detection signal detected by the transmission force detecting portion 404. With such a configuration, the vibration damping device 909 is inexpensive, compact and lightweight, and can achieve high vibration damping performance.

Embodiment 10

Figure 52:
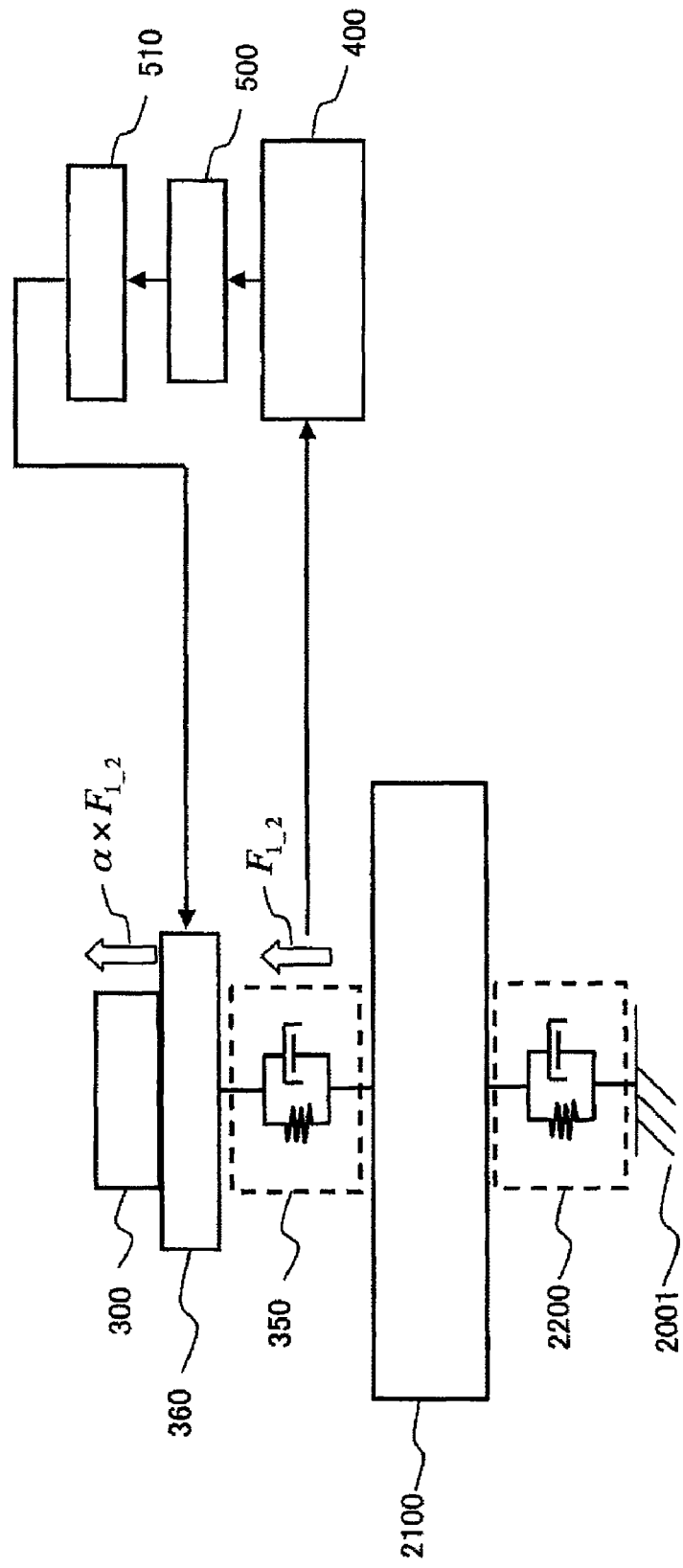
FIG. 52 is a model diagram showing a vibration damping device according to Embodiment 10 of the present invention.

The present invention is not limited to the above described embodiments, but can be effectively applied to a device in which periodic vibration occurs. As an example, description will be made to a case example in which the present invention is embodied to suppress vibration generated by an outdoor unit of an air-conditioner. FIG. 52 is a block diagram showing the outdoor unit of the air-conditioner to which the present invention is applied. In FIG. 52, elements which are the same as those of the vibration damping device 900 described in Embodiment 1 are assigned the same reference numerals, and description thereof will be omitted.

In FIG. 52, a ground 2001 corresponds to the casing 1 of the present invention. Further, the outdoor unit 2100 of the air-conditioner corresponds to the main frame portion 100 of the present invention. A cushioning support member 2200 corresponds to the cushioning support member 200 of the present invention. The transmission force $F_{1\_2}$ is the force transmitted from the outdoor unit 2100 of the air-conditioner to the auxiliary mass 300. $\alpha \times F_{1\_2}$ is the force generated by the auxiliary mass driving portion 360 to the auxiliary mass 100. $\alpha$ is the amplification coefficient. The outdoor unit 2100 of the air-conditioner is installed on the ground 2001 via the cushioning support member 2200. The cushioning support member 2200 prevents vibration generated by the outdoor unit of the air-conditioner from being transmitted to the ground 2001. In this way, the example shown in FIG. 52 in which the present invention is applied to the outdoor unit of the air-conditioner is equivalent to the embodiment of the present invention shown in FIG. 1, and therefore vibration damping effect can be similarly achieved.

In this regard, in this case example, the resonant frequency of the dynamic vibration absorber constituted by the auxiliary mass 350 and the cushioning member 300 is set to a most offending frequency, among frequencies of vibration generated by the outdoor unit of the air conditioner.

As described above, the present invention is not only applicable to the optical disc device, but is also applicable to various devices in which self-excited vibration occurs, and same vibration damping effect can be obtained.

DESCRIPTION OF REFERENCE MARKS

1 . . . casing, 100 . . . main frame portion, 121 . . . spindle motor, 129 . . . disc, 200, 2200 . . . cushioning support member, 300 . . . auxiliary mass, 350 . . . cushioning member, 360 . . . auxiliary mass driving portion, 367 . . . permanent magnet, 368 . . . yoke, 372 . . . permanent magnet, 373 . . . Hall element, 390 . . . movable magnetic circuit, 400, 401, 402, 403, 404 . . . transmission force detecting portion, 500 . . . amplifier, 510 . . . driver, 600 . . . information pickup, 800 . . . phase compensator, 900, 901, 902, 903, 904, 905, 906, 907, 908, 909 . . . vibration damping device, 2001 . . . ground, 2100 . . . outdoor unit of air-conditioner, $F_{1\_2}$ . . . transmission force, $f_{max}$ . . . maximum disc rotation frequency.

The invention claimed is:

1. A vibration damping device of a disc drive comprising:
a main frame portion having a vibration source;
a dynamic vibration absorber having an auxiliary mass and a cushioning portion and being supported by the main frame portion via the cushioning portion, wherein a resonant frequency of the dynamic vibration absorber is a frequency of vibration of the vibration source;
a casing that supports the main frame portion via a cushioning support member;
a transmission force detecting portion that detects a transmission force transmitted from the main frame portion to the auxiliary mass via the cushioning portion, and
an auxiliary mass driving portion that drives the auxiliary mass based on a result of detection by the transmission force detecting portion,
wherein the transmission force is defined by an equation where the followings are added:
a value of a viscosity coefficient of viscoelastic characteristics of the cushioning portion multiplied by a value of a speed of the main frame portion with reference to the casing, and
a value of an elastic coefficient of viscoelastic characteristics of the cushioning portion multiplied by an amount of displacement of the main frame portion with reference to the casing in vibration damping direction.

2. The vibration damping device according to claim 1, wherein the transmission force detecting portion detects the transmission force based on a position of the auxiliary mass with reference to the main frame portion in the vibration damping direction and a driving signal of the auxiliary mass driving portion.

3. The vibration damping device according to claim 2, wherein the cushioning portion includes a plate spring, and
wherein the transmission force detecting portion determines the position of the auxiliary mass with reference to the main frame portion based on an output value of a strain gauge bonded to the plate spring.

4. The vibration damping device according to claim 2, wherein the auxiliary mass driving portion is a piezoelectrically-driven type actuator using a bimorph, and
wherein the piezoelectrically-driven type actuator measures the position of the auxiliary mass with reference to the main frame portion.

5. The vibration damping device according to claim 2, wherein the transmission force detecting portion includes a disturbance estimation portion with an internal model having dynamic characteristics of the auxiliary mass, the cushioning portion and the auxiliary mass driving portion.

6. The vibration damping device according to claim 1, wherein the main frame portion includes a spindle motor for rotating a disc, and an information pickup for recording information on the disc or reproducing information recorded on the disc, and
wherein the transmission force detecting portion detects the transmission force using a deviation signal used in a positioning control of the information pickup and a driving signal of the information pickup.

7. The vibration damping device according to claim 6, wherein the transmission force detecting portion is constituted by a disturbance estimation portion with an internal model having dynamic characteristics of the information pickup.

8. The vibration damping device according to claim 7, wherein the transmission force detecting portion detects the transmission force based on a value obtained by second-order integration of an estimated disturbance value outputted by the disturbance estimation portion.

9. The vibration damping device according to claim 1, further comprising a phase compensation portion,
wherein the phase compensation portion has a function to suppress unnecessary gain peak that occurs between the transmission force detecting portion and the auxiliary mass driving portion at a predetermined frequency band.

10. The vibration damping device according to claim 9, wherein the phase compensation portion advances a phase at a frequency band higher than or equal to a resonant frequency of a resonance system constituted by the auxiliary mass and the cushioning portion.

11. The vibration damping device according to claim 9, wherein the phase compensation portion delays a phase at a frequency band lower than or equal to a resonant frequency of a resonance system constituted by the main frame portion and the cushioning support portion.

12. The vibration damping device according to claim 1, wherein the auxiliary mass includes a movable magnetic circuit constituted by a yoke and a magnet;
wherein the auxiliary mass driving portion includes a coil disposed between the yoke and the magnet and supported by the main frame portion, and
wherein the cushioning portion is constituted by a resilient body that swingably connects the yoke and the main frame portion.

13. The vibration damping device according to claim 12, wherein the cushioning portion is a plate spring.

14. The vibration damping device according to claim 1, wherein the auxiliary mass driving portion is a piezoelectrically-driven type actuator using a bimorph.

15. The vibration damping device according to claim 14, wherein the piezoelectrically-driven type actuator has a function of the cushioning portion.

16. The vibration damping device according to claim 1, wherein the transmission force detecting portion measures a change in relative position of a magnet having different magnetizing directions and a pair of magnetically sensitive elements sandwiching the magnet, using the magnet and the magnetically sensitive elements.

* * * * *